(12) United States Patent
Baptist et al.

(10) Patent No.: US 9,998,540 B2
(45) Date of Patent: *Jun. 12, 2018

(54) DISTRIBUTED STORAGE AND COMPUTING OF INTERIM DATA

(71) Applicant: International Business Machines Corporation, Armonk, NY (US)

(72) Inventors: Andrew Baptist, Mt. Pleasant, WI (US); Greg Dhuse, Chicago, IL (US); Wesley Leggette, Chicago, IL (US); Jason K. Resch, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/403,671

(22) Filed: Jan. 11, 2017

(65) Prior Publication Data

US 2017/0126808 A1    May 4, 2017

Related U.S. Application Data

(63) Continuation of application No. 13/917,058, filed on Jun. 13, 2013, now Pat. No. 9,584,359, which is a
(Continued)

(51) Int. Cl.
*G11C 29/42* (2006.01)
*H04L 29/08* (2006.01)
(Continued)

(52) U.S. Cl.
CPC ...... *H04L 67/1097* (2013.01); *G06F 11/1076* (2013.01); *H04L 67/10* (2013.01); *H04L 67/42* (2013.01); *G06F 2211/1028* (2013.01)

(58) Field of Classification Search
CPC ...... G06F 9/445; G06F 9/5033; G06F 9/5061; G06F 9/5066; G06F 2209/5017;
(Continued)

(56) References Cited

U.S. PATENT DOCUMENTS 4,092,732 A    5/1978   Ouchi
5,454,101 A    9/1995   Mackay et al.
(Continued)

FOREIGN PATENT DOCUMENTS

EP    1903750 A1    3/2008

OTHER PUBLICATIONS

Shamir; How to Share a Secret; Communications of the ACM; vol. 22, No. 11; Nov. 1979; pp. 612-613.
(Continued)

*Primary Examiner* — Guy Lamarre
(74) *Attorney, Agent, or Firm* — Garlick & Markison; Timothy W. Markison; Shayne X. Short

(57) ABSTRACT

A method begins by a set of distributed storage and task (DST) execution units receiving a set of partial tasks and data, where a partial task of the set of partial tasks includes a common task and a unique partial sub-task. The method continues with the set of DST execution units executing the common task on the data to produce a set of preliminary partial results. The method continues with a first DST execution unit of the set of DST execution units generating first interim data based on the at least some of the set of preliminary partial results. The method continues with the first DST execution unit executing a first unique partial sub-task on at least one of a first portion of the data and the first interim data to produce a first partial result.

20 Claims, 61 Drawing Sheets

Related U.S. Application Data continuation-in-part of application No. 13/707,428, filed on Dec. 6, 2012, now Pat. No. 9,298,548.

(60) Provisional application No. 61/679,007, filed on Aug. 2, 2012, provisional application No. 61/569,387, filed on Dec. 12, 2011.

(51) Int. Cl.
*H04L 29/06* (2006.01)
*G06F 11/10* (2006.01)
*G11C 29/54* (2006.01)

(58) Field of Classification Search
CPC ..... G06F 2209/5012; G06F 2211/1028; G06F 11/1076; H04L 29/08549; H04L 67/1097; H04L 67/10; H04L 67/327
USPC .......................... 714/764; 711/168; 709/215
See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,678,843 B2 | 1/2004 | Giulietti et al. |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 9,298,548 B2 * | 3/2016 | Leggette ............... H04L 67/10 |
| 9,584,359 B2 * | 2/2017 | Baptist ............ H04L 29/08549 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0033525 A1 | 2/2003 | Rajaram |
| 2003/0037261 A1 | 2/2003 | Meffert et al. |
| 2003/0065617 A1 | 4/2003 | Watkins et al. |
| 2003/0084020 A1 | 5/2003 | Shu |
| 2003/0163507 A1 | 8/2003 | Chang |
| 2004/0024963 A1 | 2/2004 | Talagala et al. |
| 2004/0030616 A1 | 2/2004 | Florance et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0113038 A1 | 5/2007 | Hobson et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0255960 A1 | 11/2007 | Hon et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0223349 A1 | 9/2010 | Thorson |
| 2011/0071988 A1 | 3/2011 | Resch |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
Communication pursuant to Article 94(3) EPC; EP Application No. 12856963.9; dated May 26, 2017; 9 pages.

* cited by examiner

DST allocation info 242 | data partition info 320: [x] data ID; No. of partitions; Addr. info for each partition; format conversion indication intermediate result info 324

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 &<br>1_5 | R1-1_1 - R1-1_z &<br>R1-5_1 - R1-5_z | 1_2, 2_2, 3_2, 4_2, & 5_2 | R1-6 | DST unit 2 | DST unit 2 | DST units 2-6 |
| 1_7 | after 1_2 &<br>1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

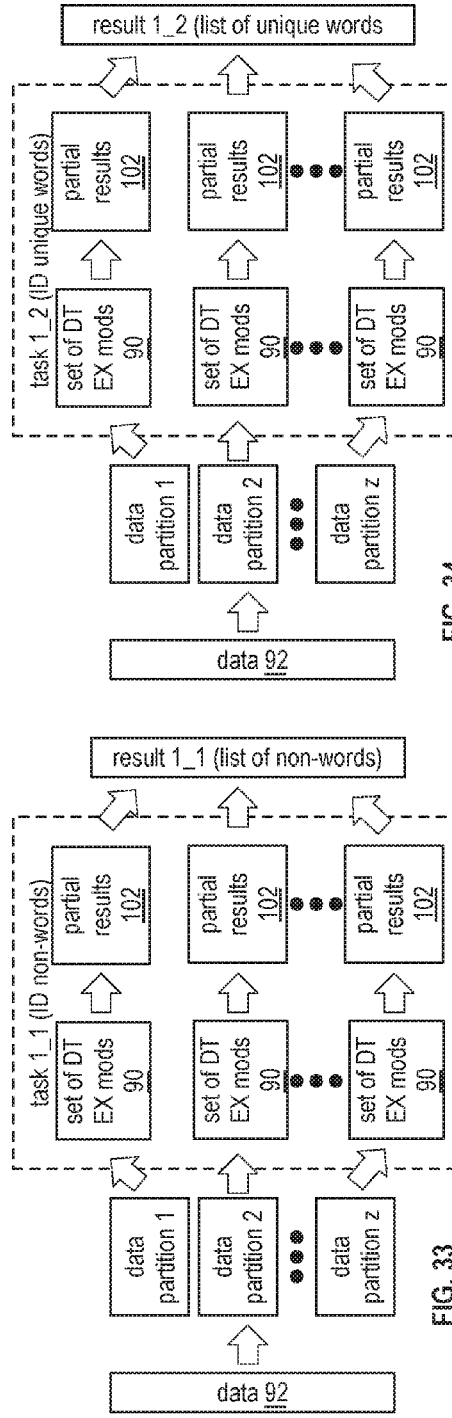
FIG. 33
FIG. 34
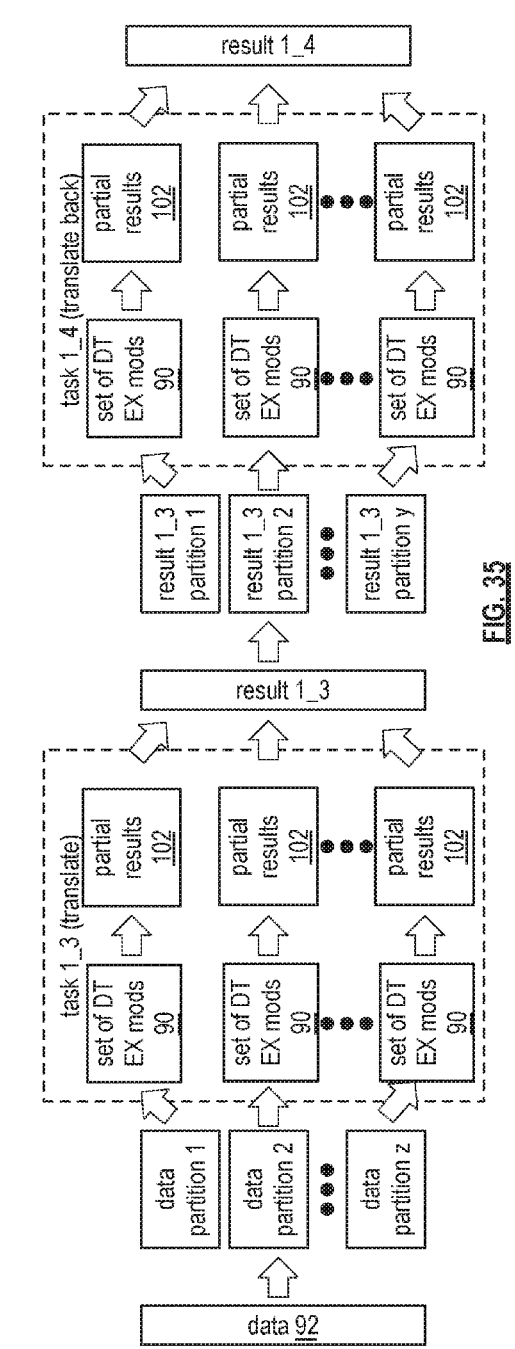
FIG. 35

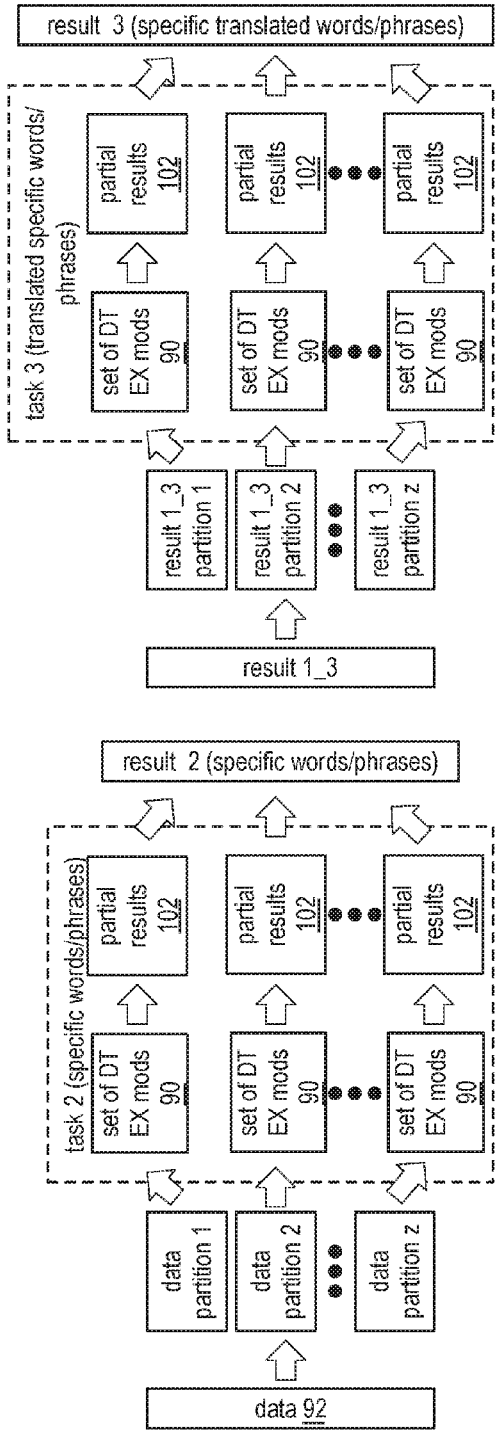
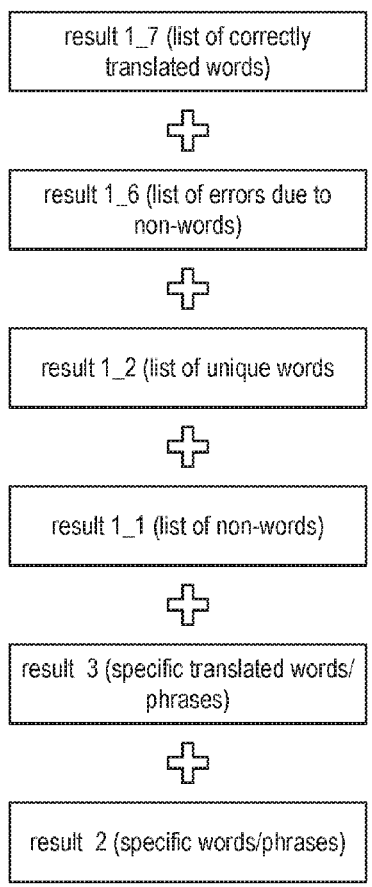
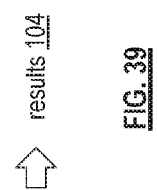

DISTRIBUTED STORAGE AND COMPUTING OF INTERIM DATA

CROSS REFERENCE TO RELATED PATENTS

The present U.S. Utility Patent Application also claims priority pursuant to 35 U.S.C. § 120, as a continuation, to U.S. Utility patent application Ser. No. 13/917,058, entitled "DISTRIBUTED STORAGE AND COMPUTING OF INTERIM DATA," filed Jun. 13, 2013, now issued as U.S. Pat. No. 9,584,359 B2 on Feb. 28, 2017, which claims priority pursuant to 35 U.S.C. § 119(e) to U.S. Provisional App. Ser. No. 61/679,007, entitled "TASK PROCESSING IN A DISTRIBUTED STORAGE AND TASK NETWORK," filed Aug. 2, 2012; the U.S. Utility patent application Ser. No. 13/917,058 also claims priority pursuant to 35 U.S.C. § 120, as a continuation-in-part (CIP), to U.S. Utility application Ser. No. 13/707,428, entitled "DISTRIBUTED COMPUTING IN A DISTRIBUTED STORAGE AND TASK NETWORK," filed Dec. 6, 2012, now issued as U.S. Pat. No. 9,298,548 B2 on Mar. 29, 2016, which claims priority pursuant to 35 U.S.C. § 119(e) to U.S. Provisional App. Ser. No. U.S. Provisional Application Ser. No. 61/569,387, entitled "DISTRIBUTED STORAGE AND TASK PROCESSING," filed Dec. 12, 2011; all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

DETAILED DESCRIPTION OF THE INVENTION

Figure 1:
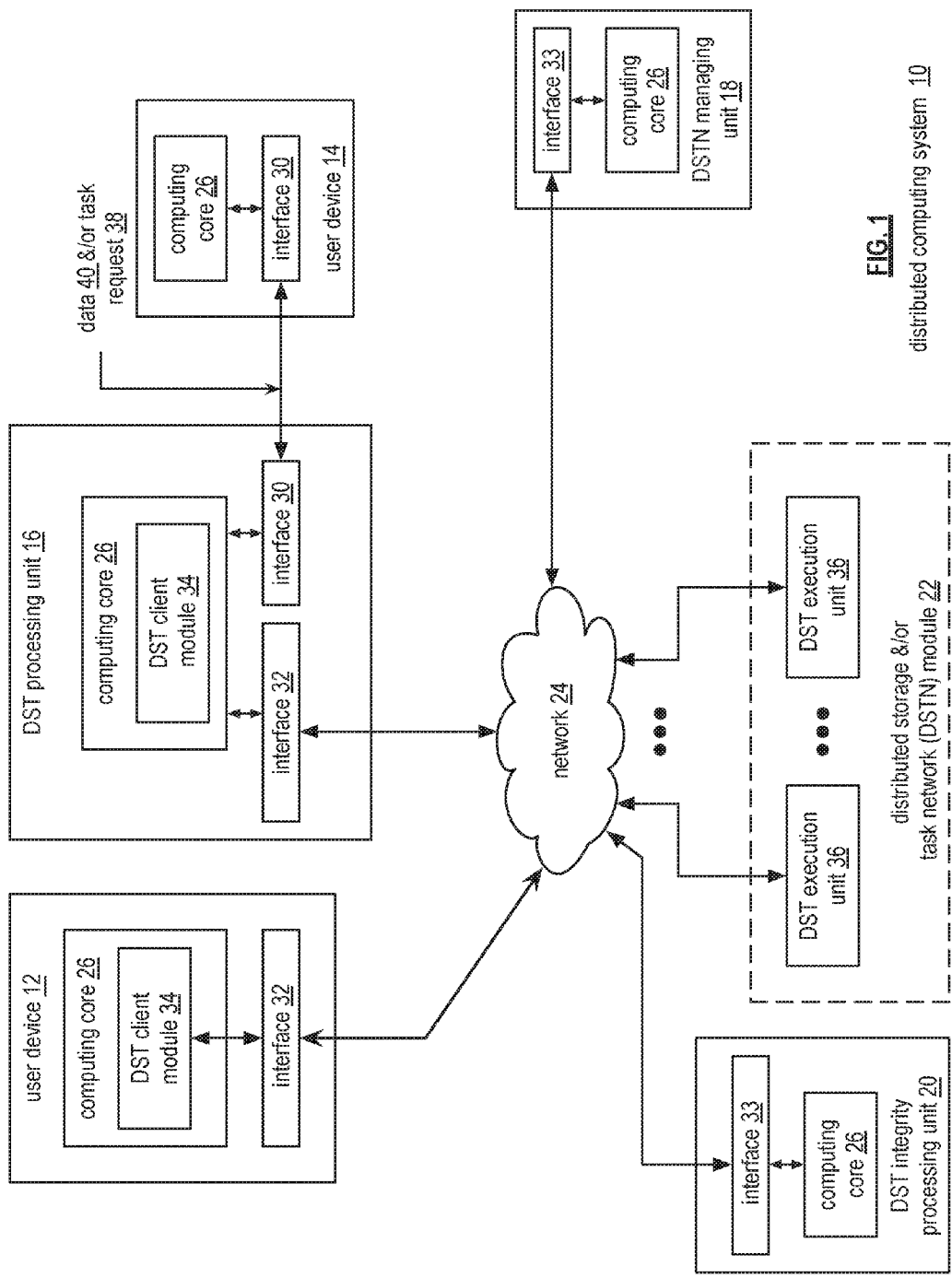
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general, and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
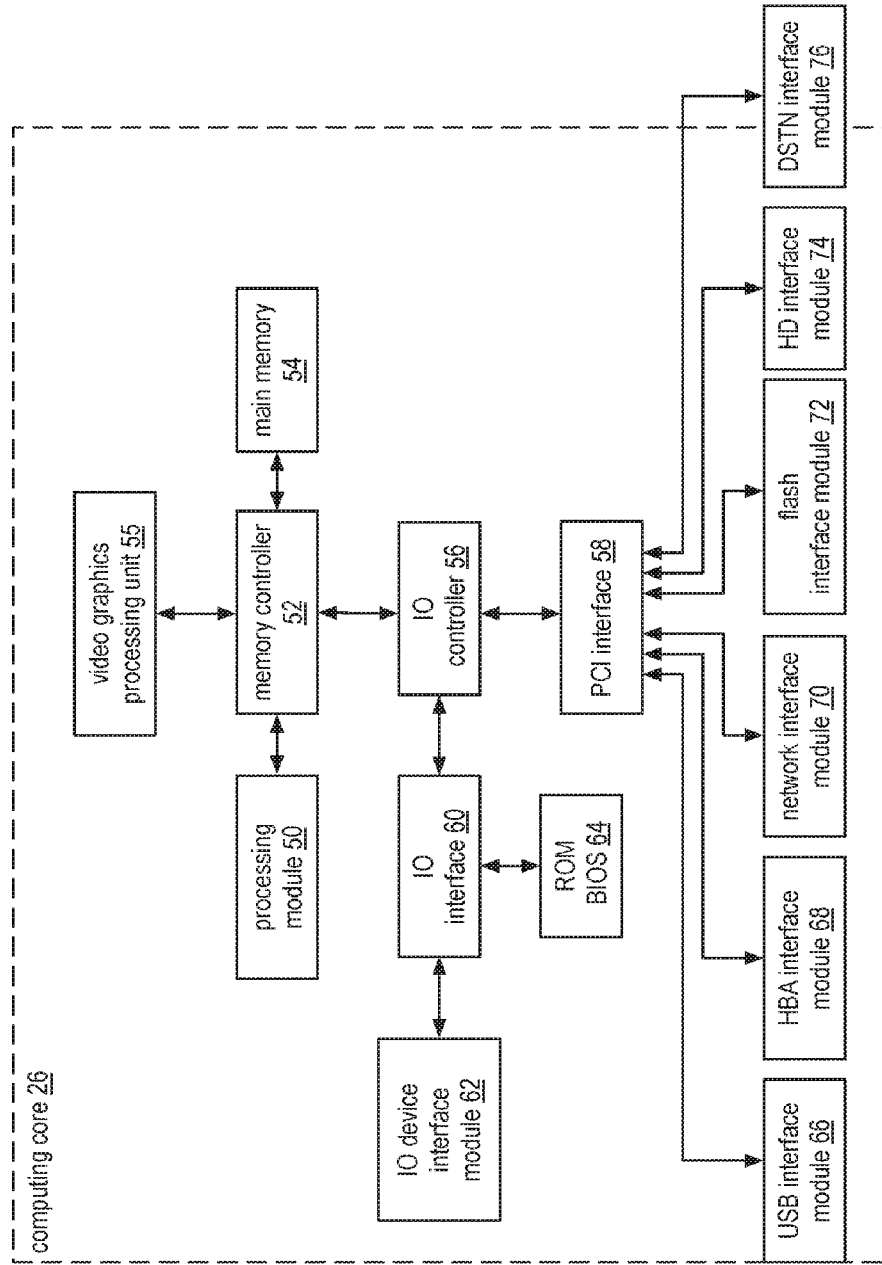
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
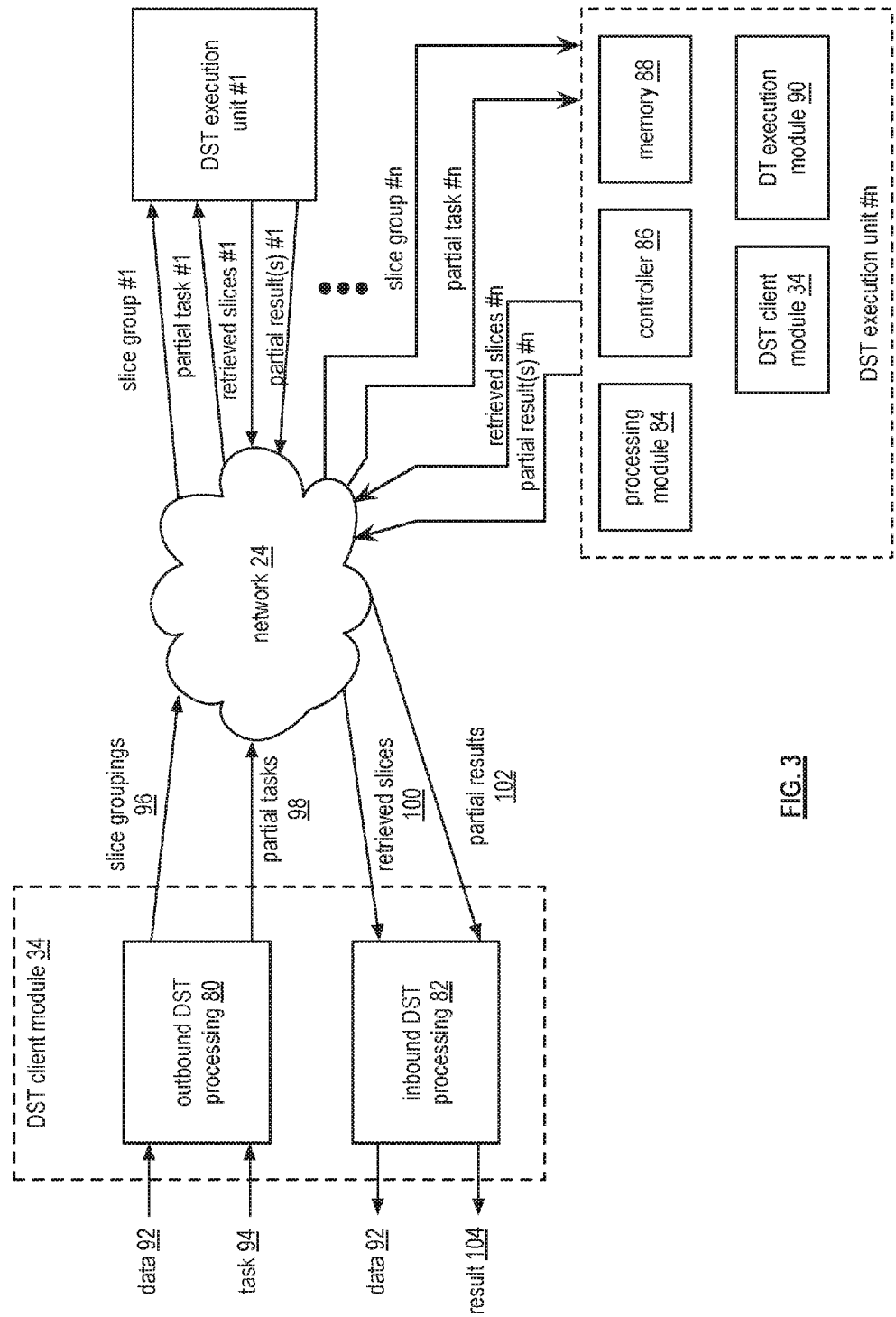
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-*n* that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-*n* includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
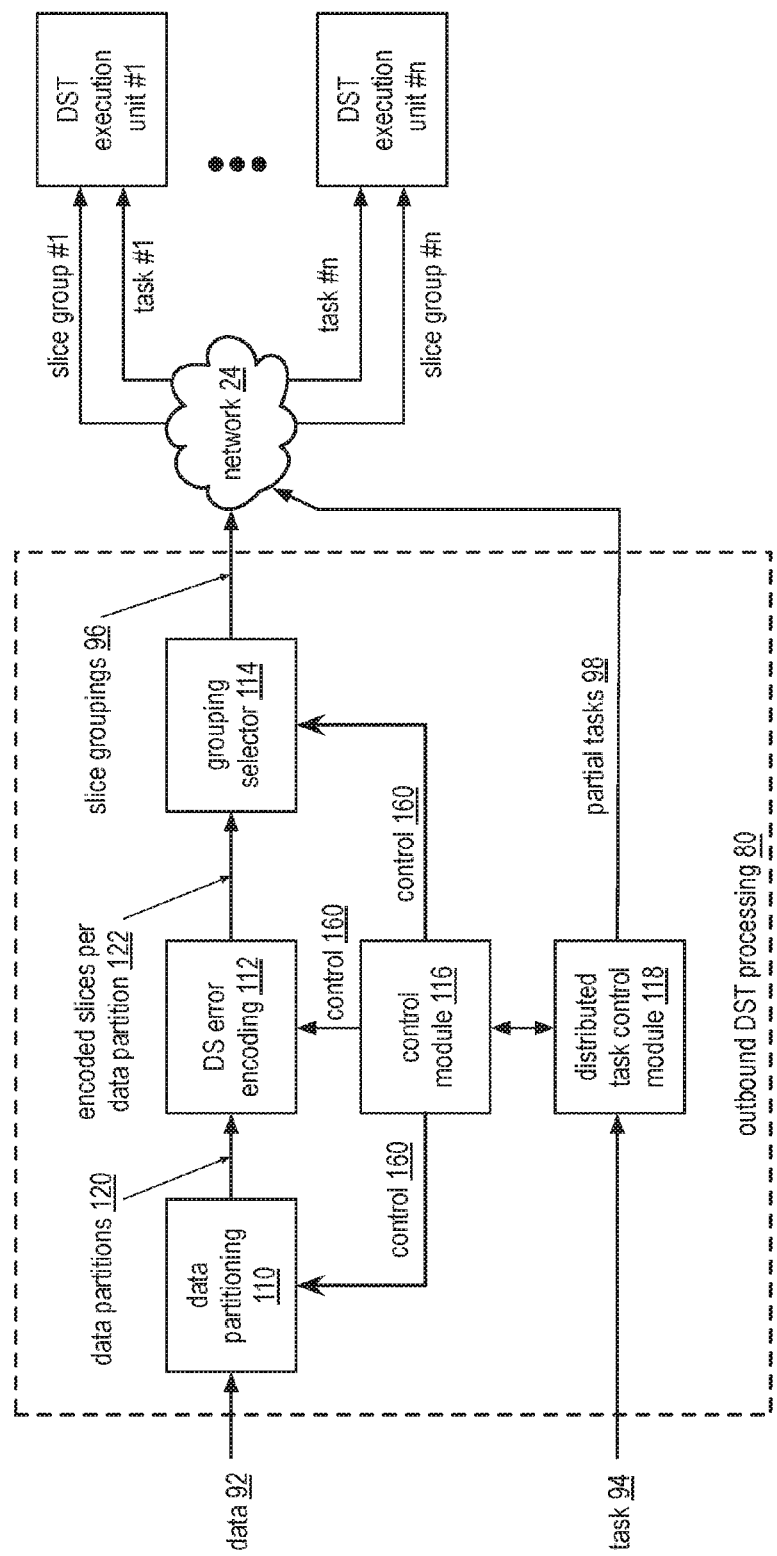
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
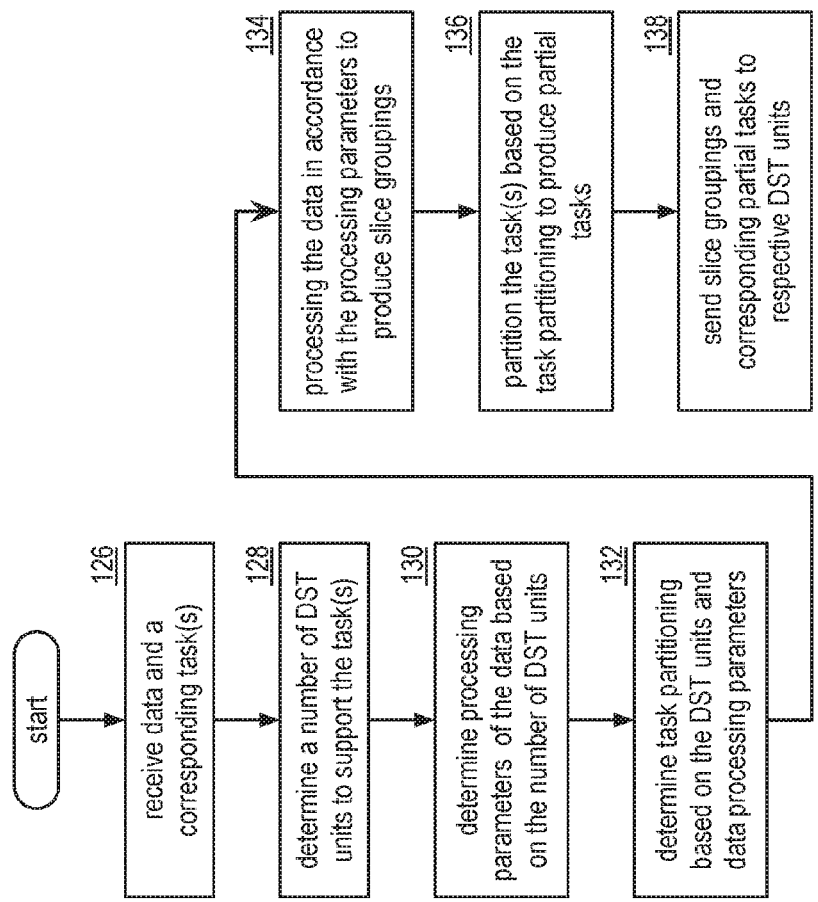
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
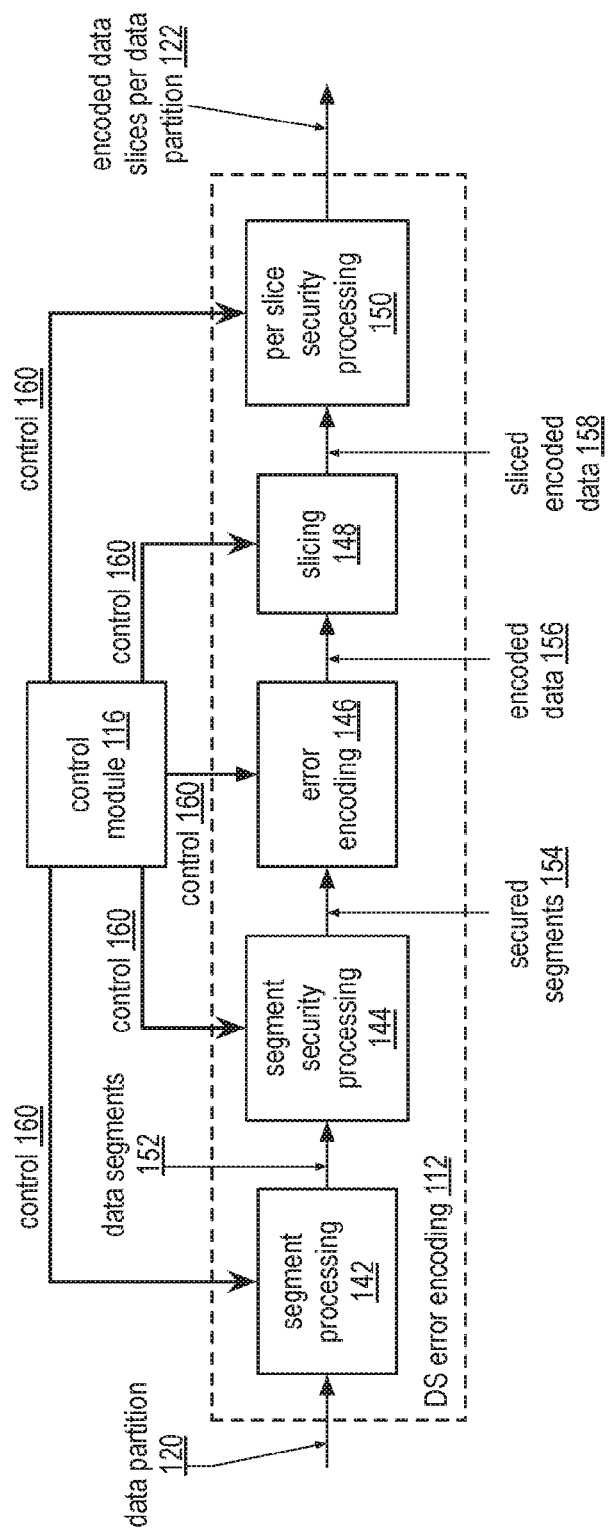
FIG. 6 is a schematic block diagram of an embodiment of a dispersed storage error encoding module in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
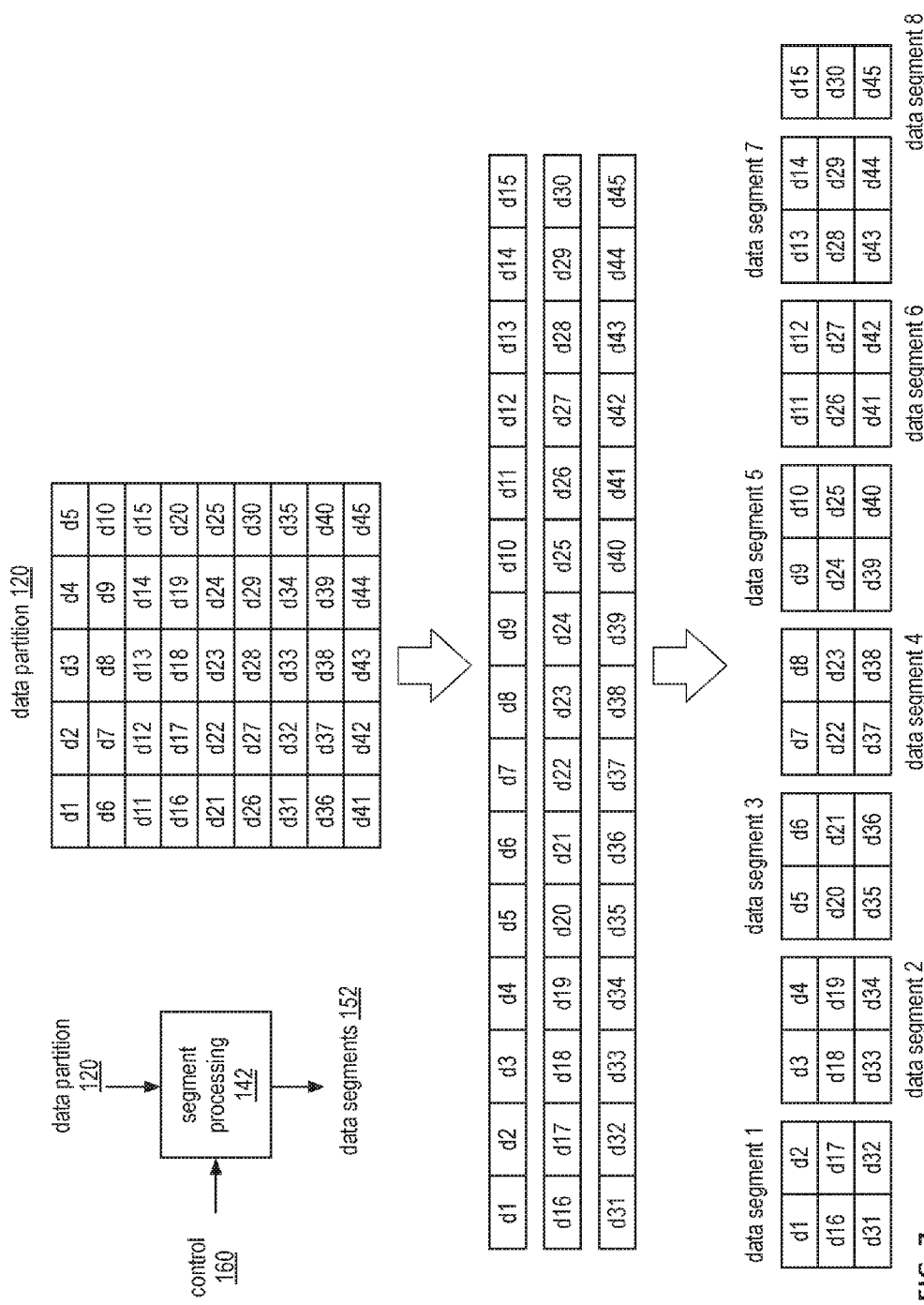
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
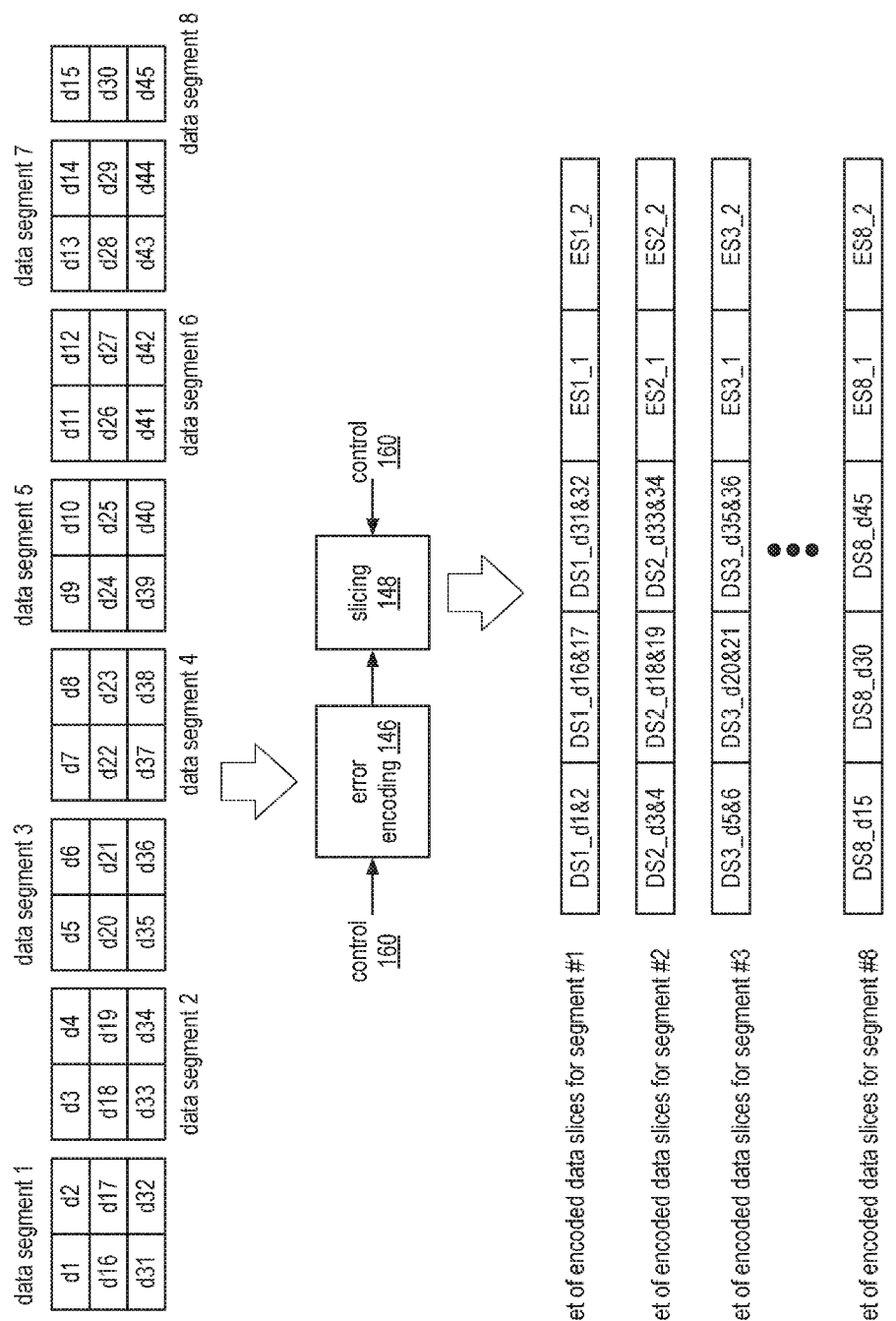
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first—third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first—third words of the second data segment.

Figure 9:
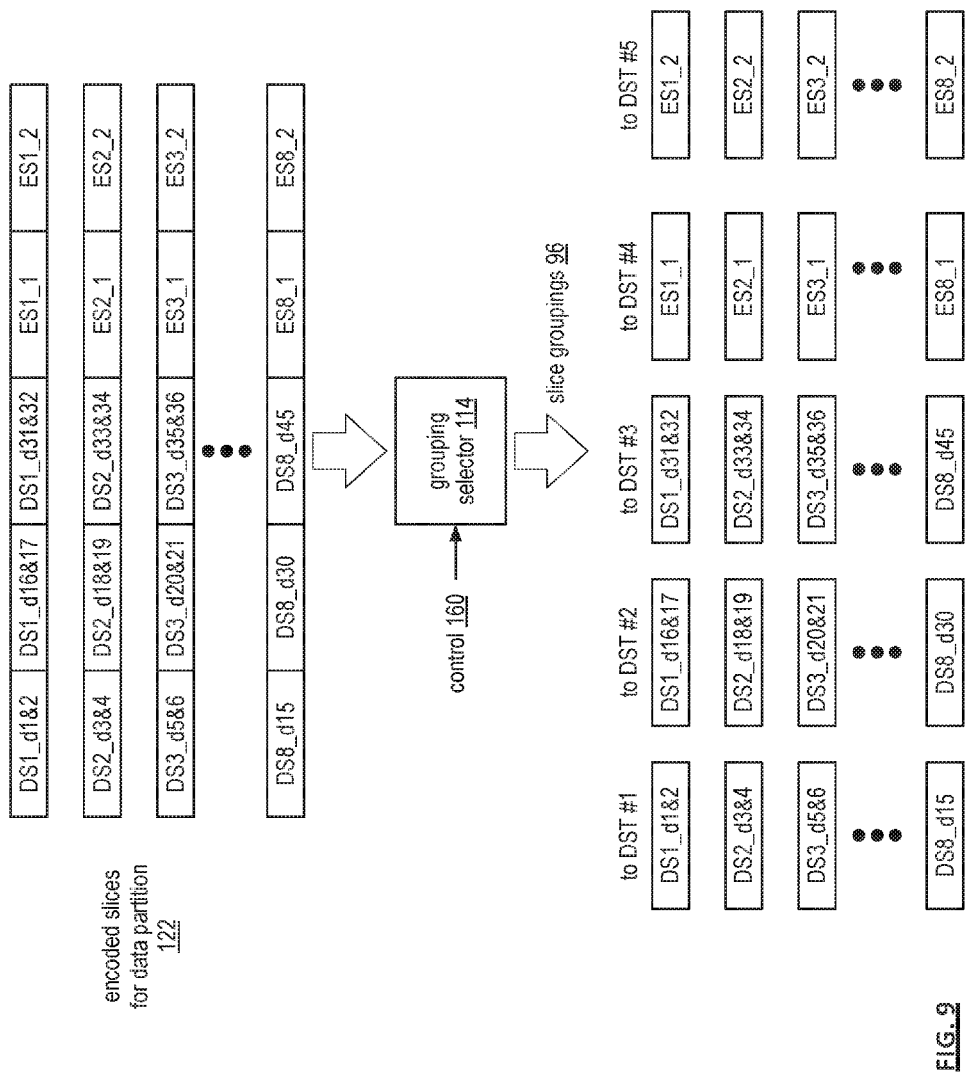
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
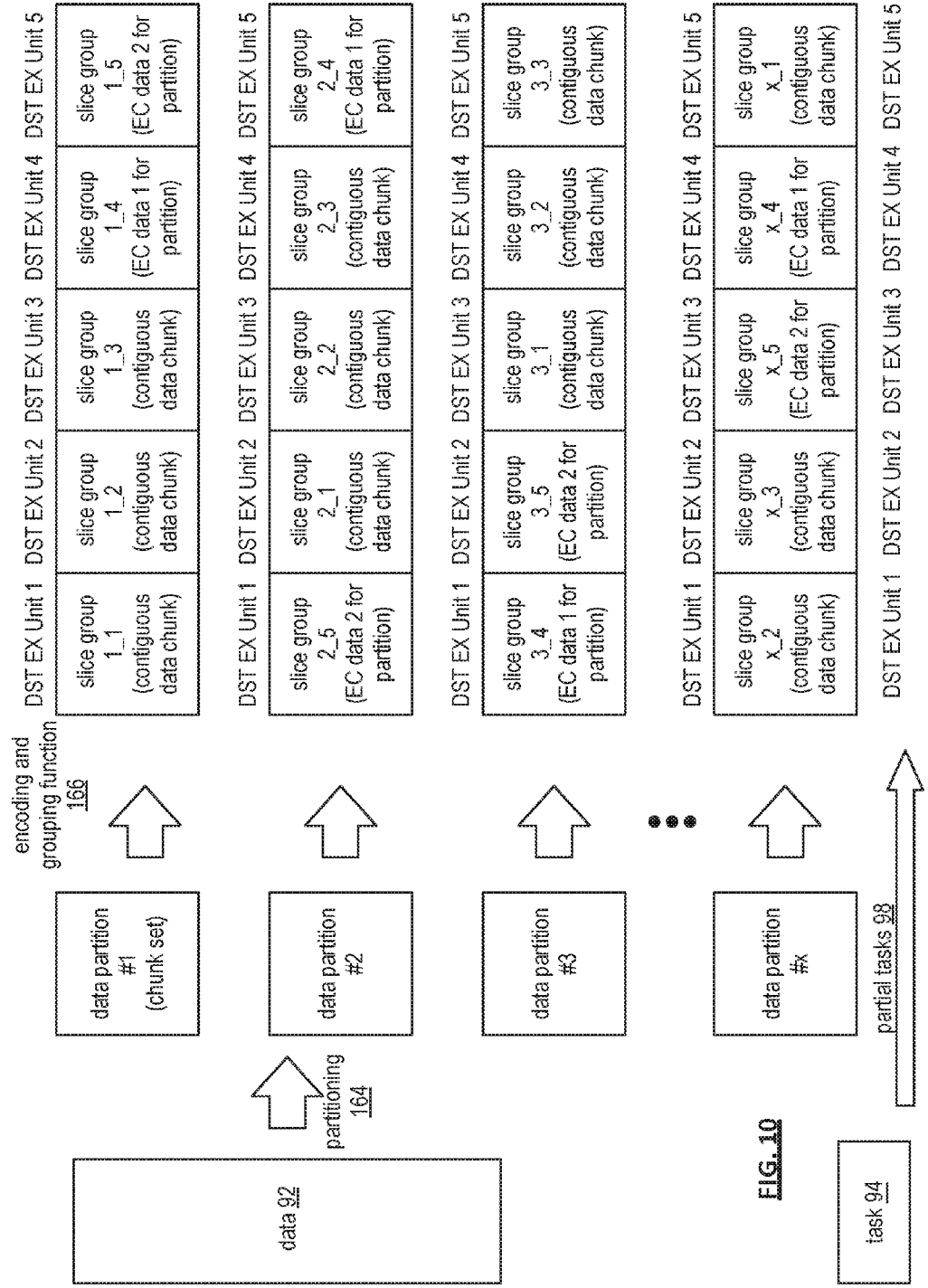
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-$x$, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
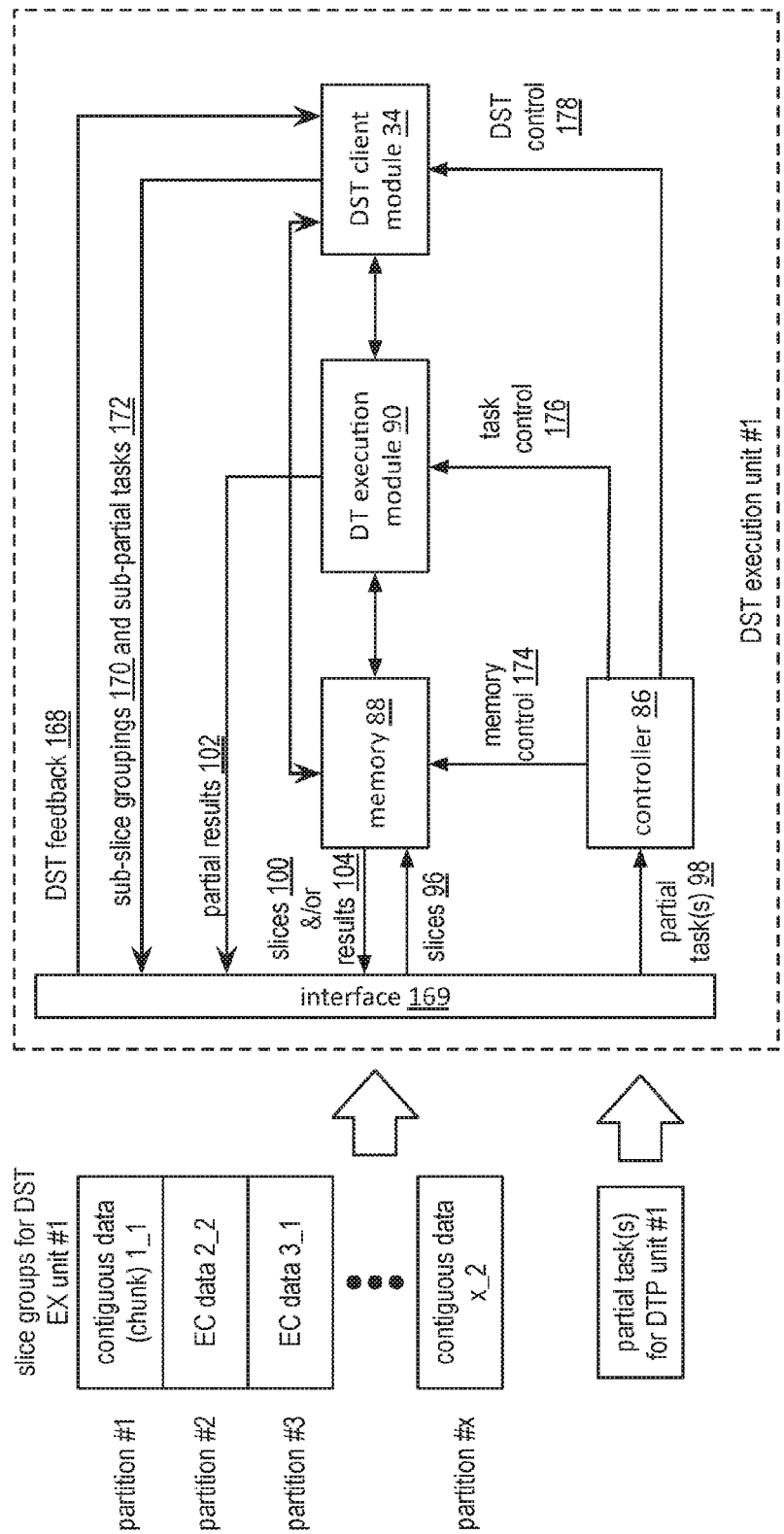
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
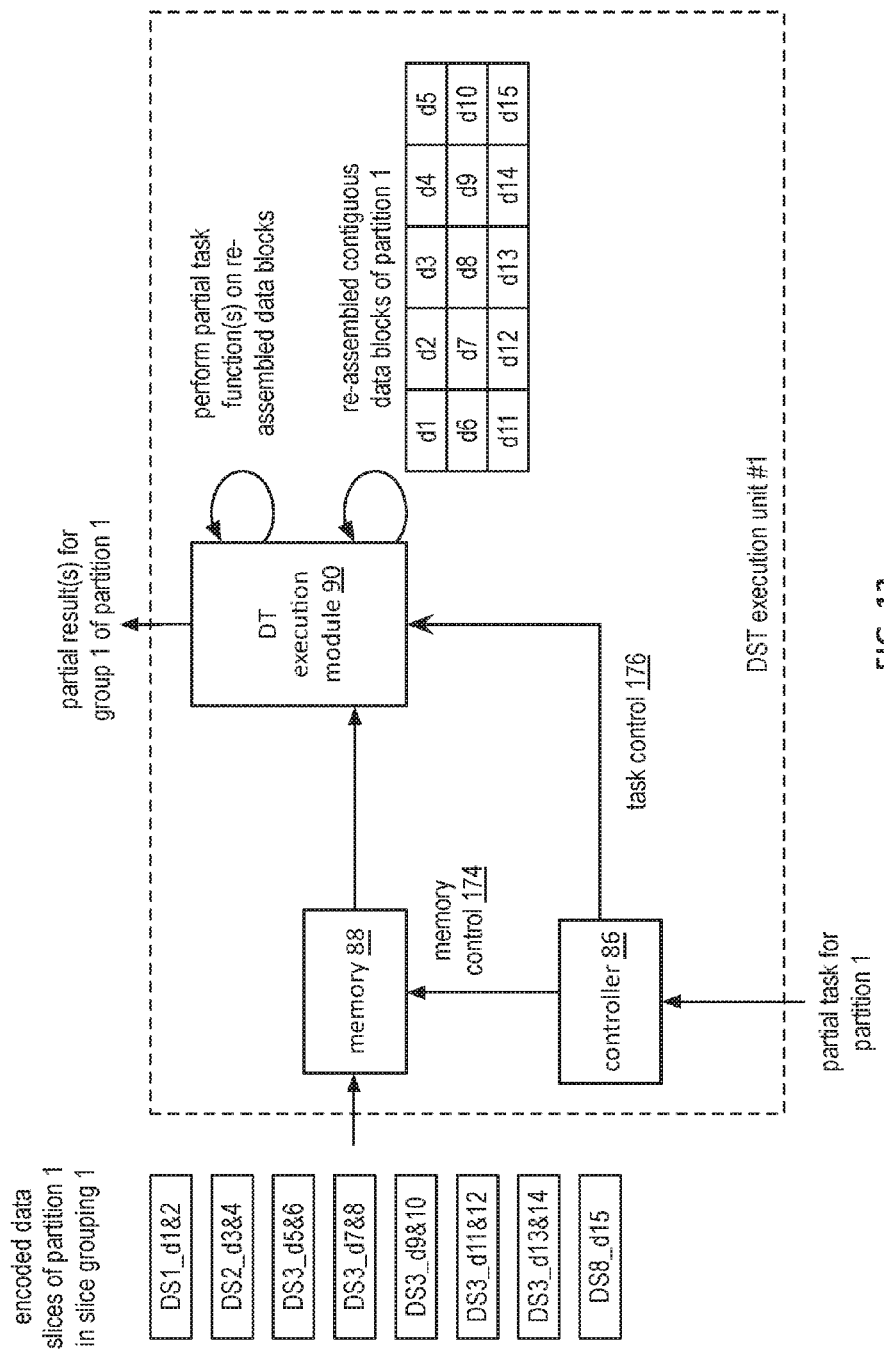
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
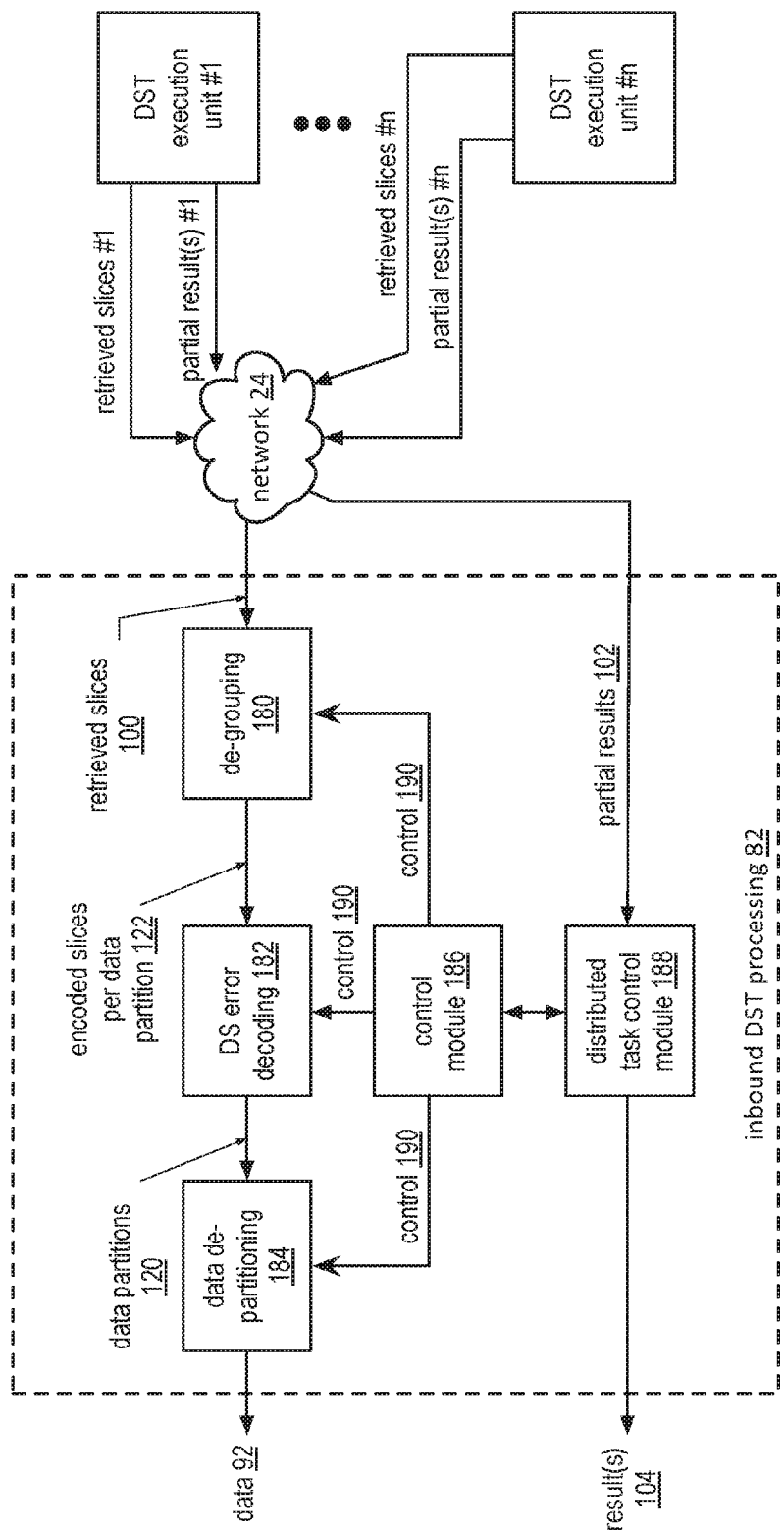
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
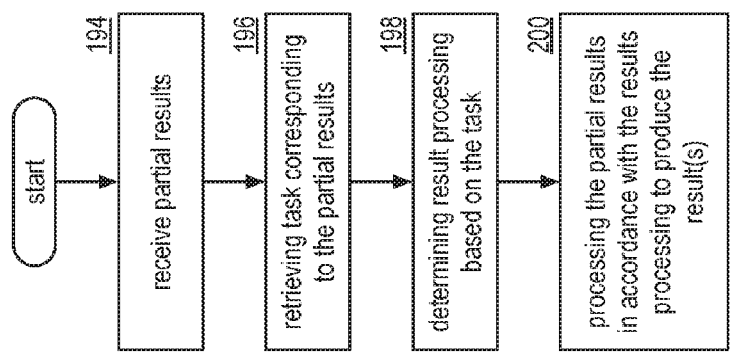
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
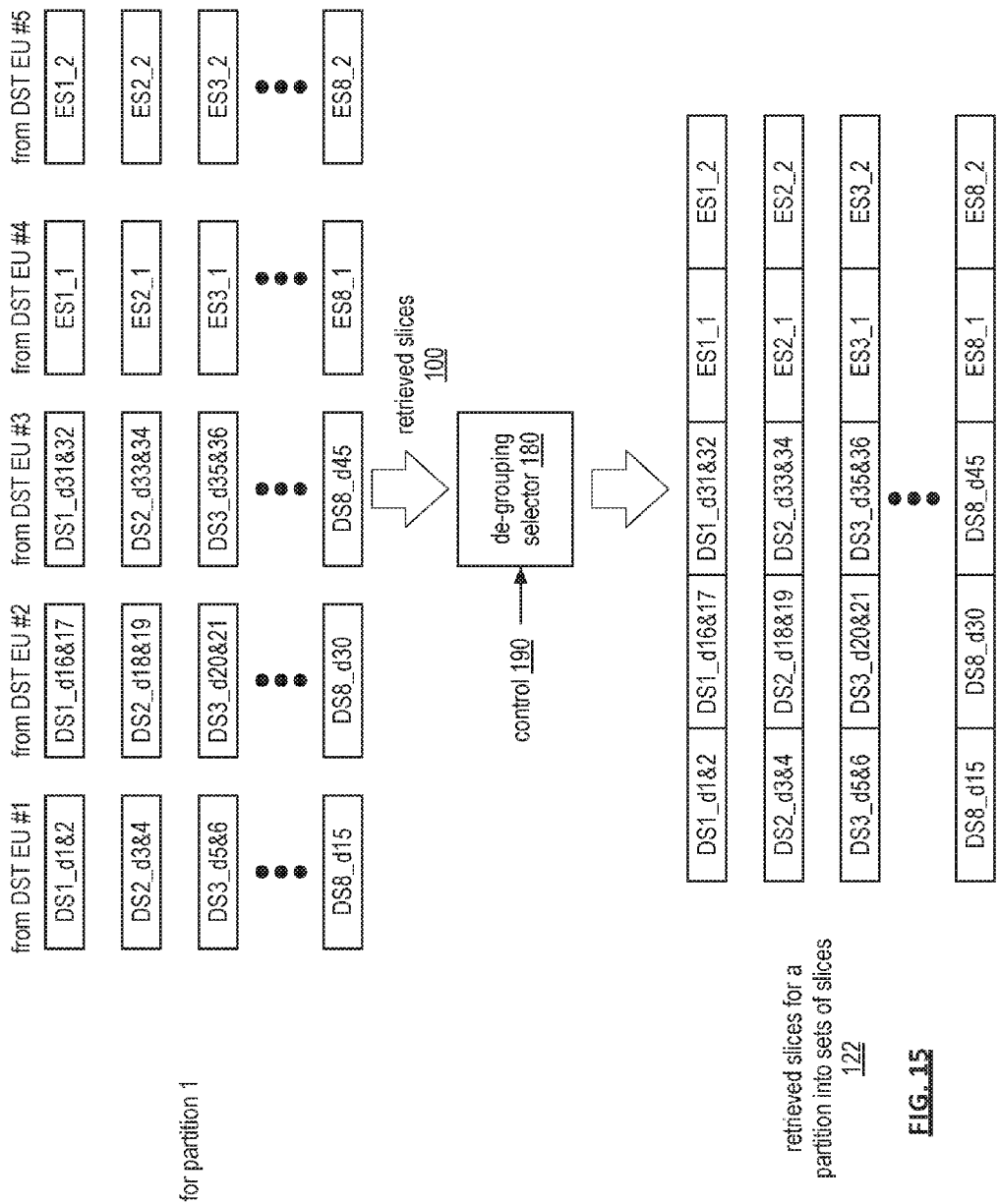
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
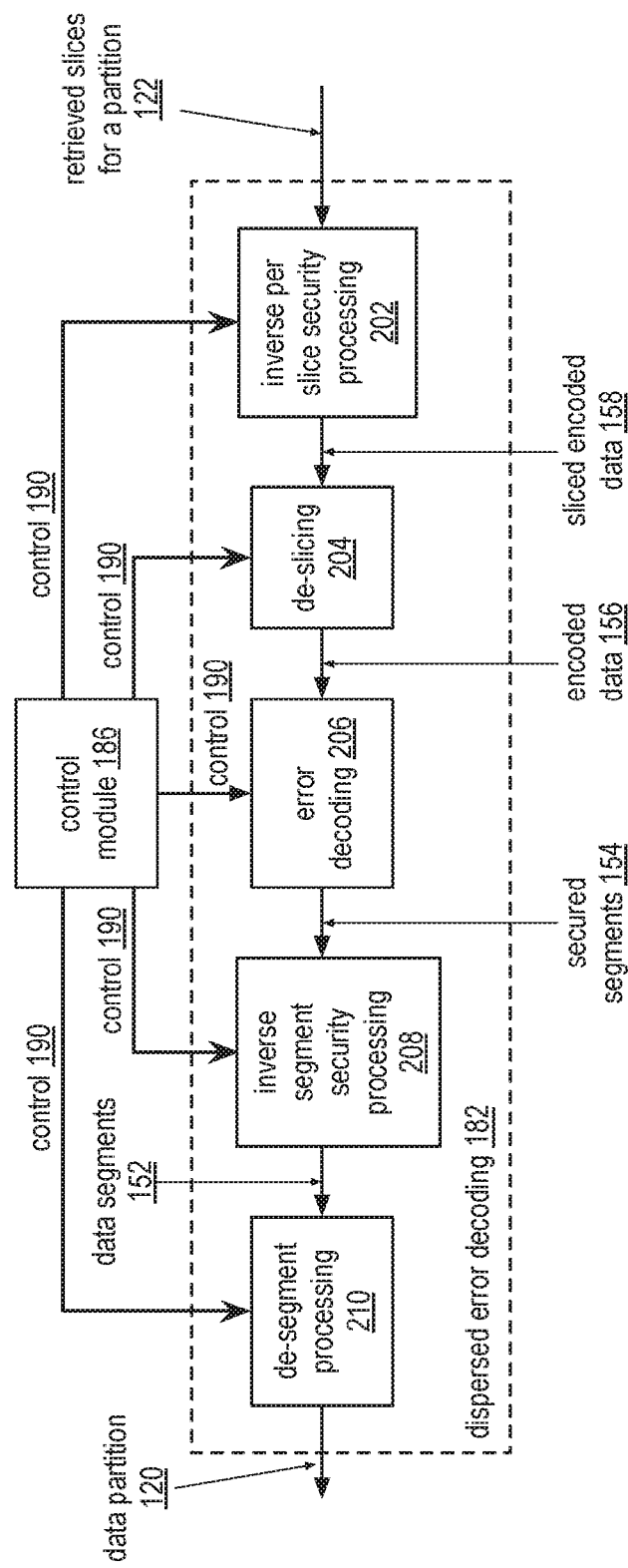
FIG. 16 is a schematic block diagram of an embodiment of a dispersed storage error decoding module in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
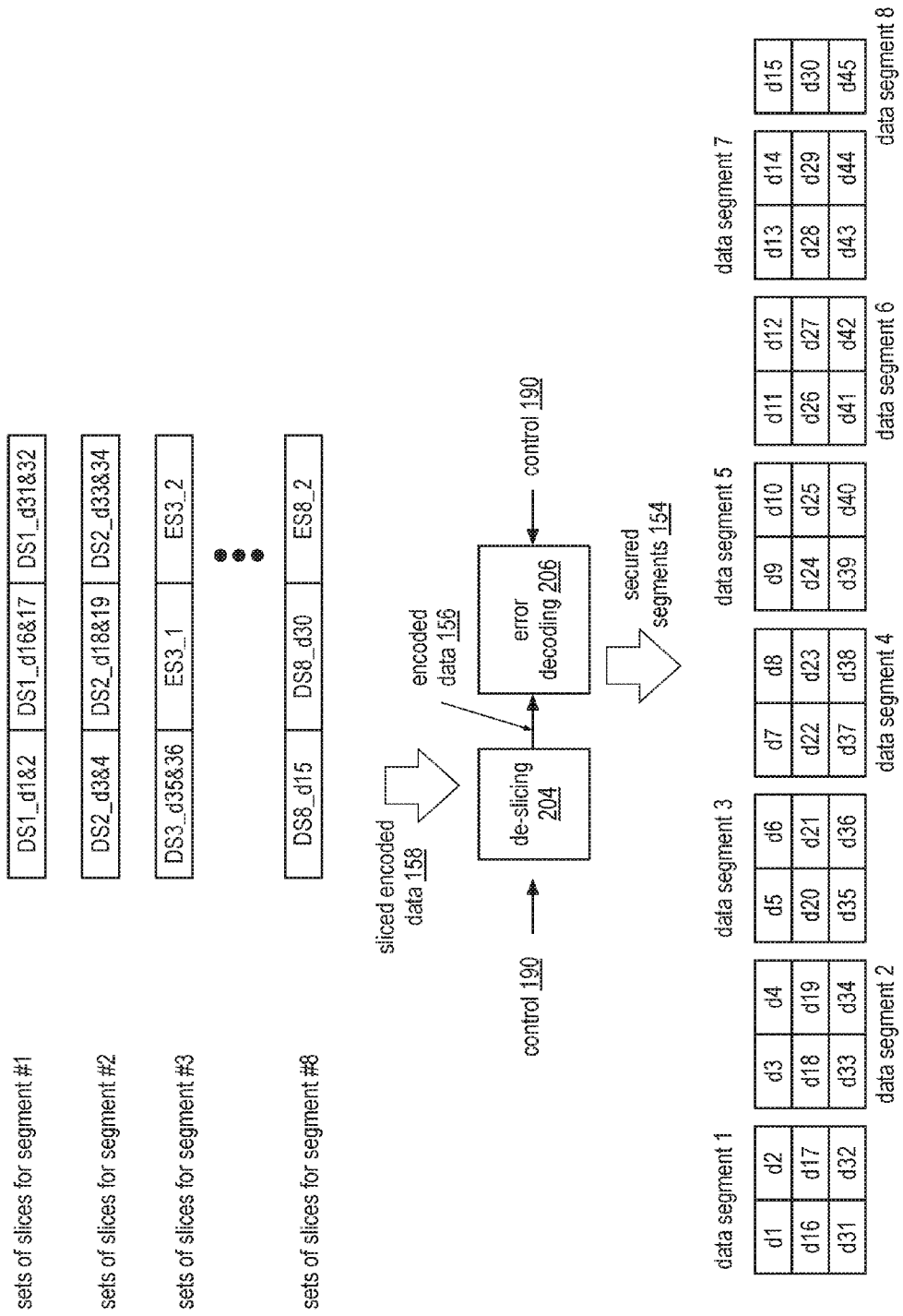
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
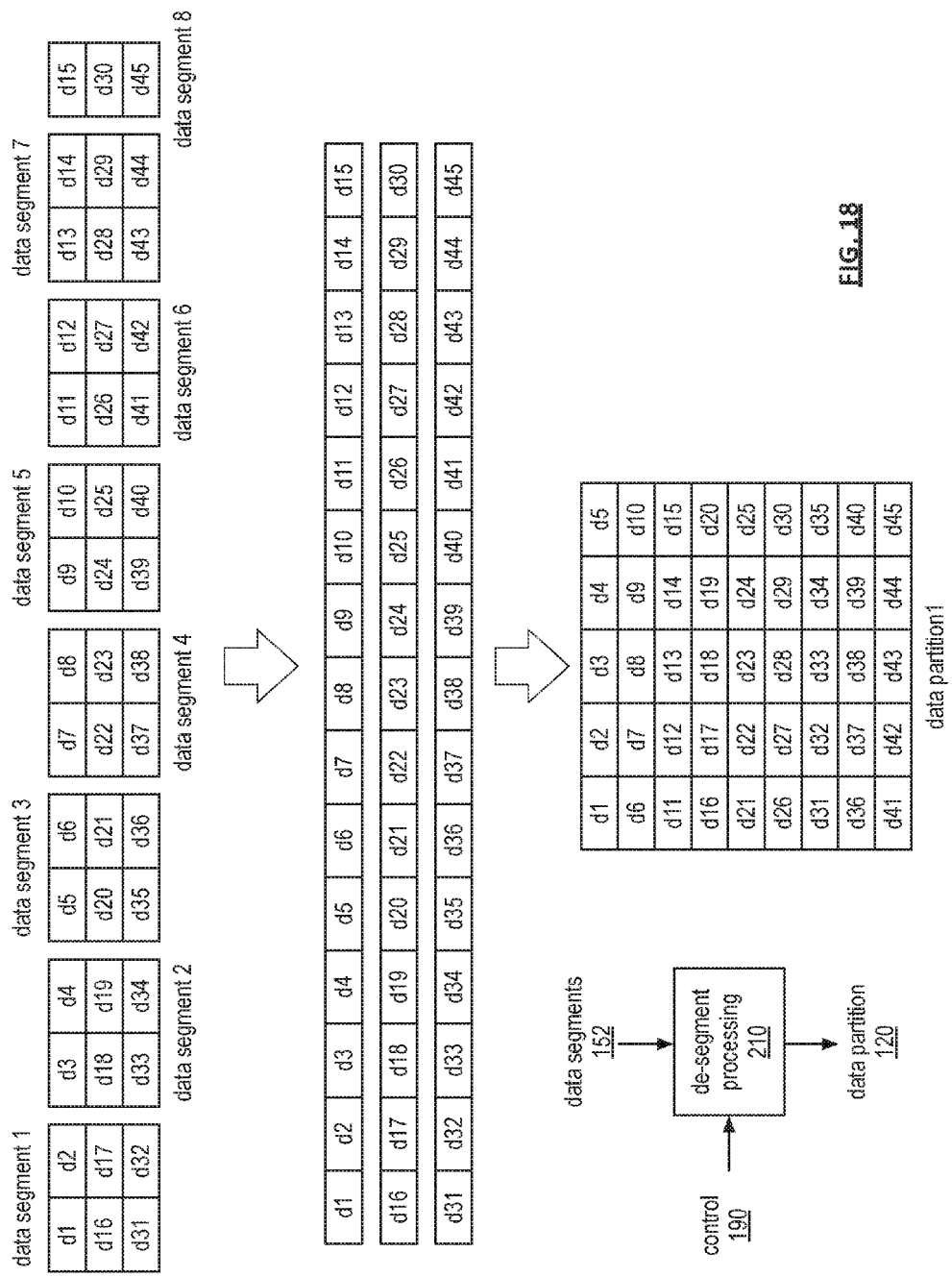
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
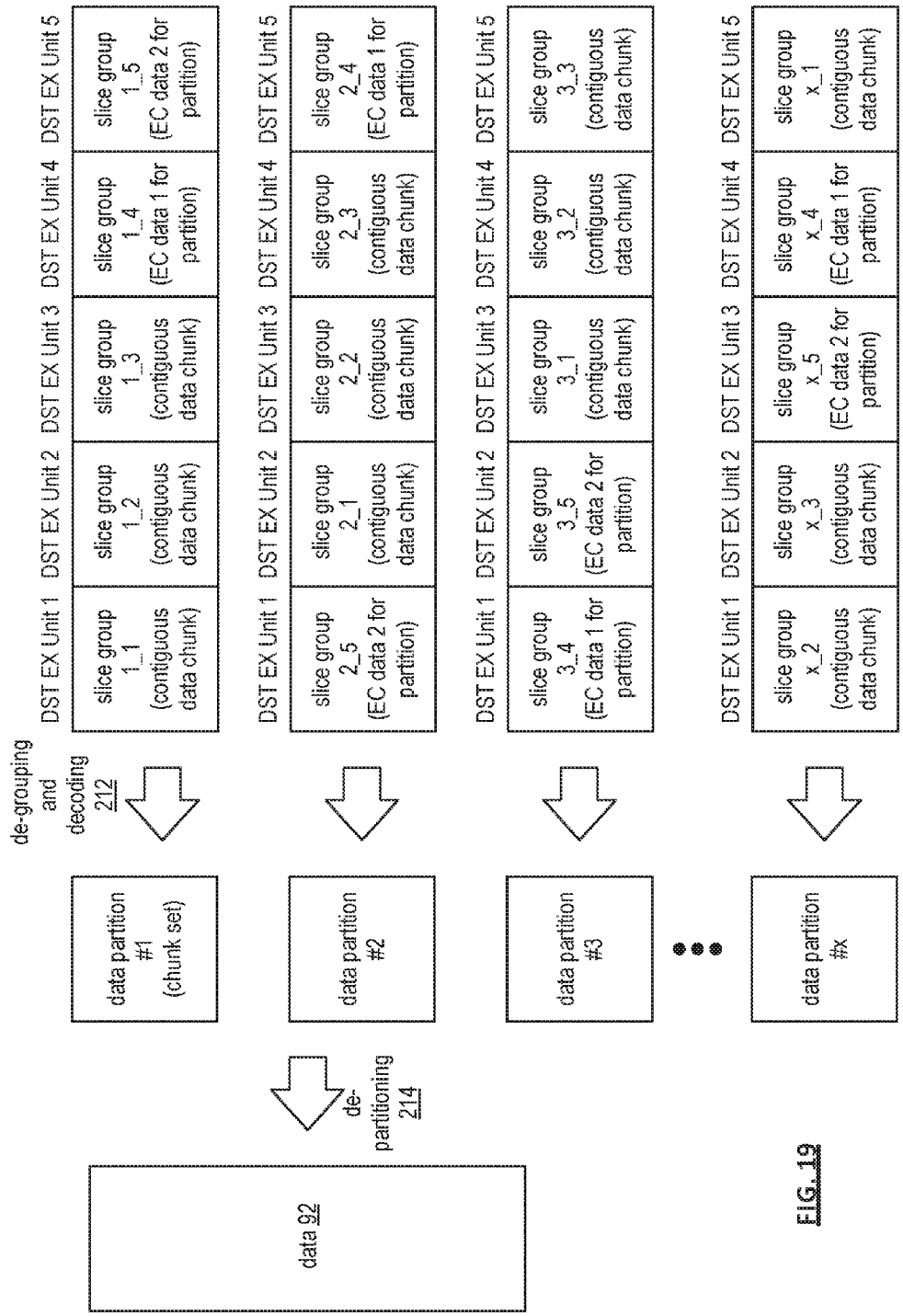
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
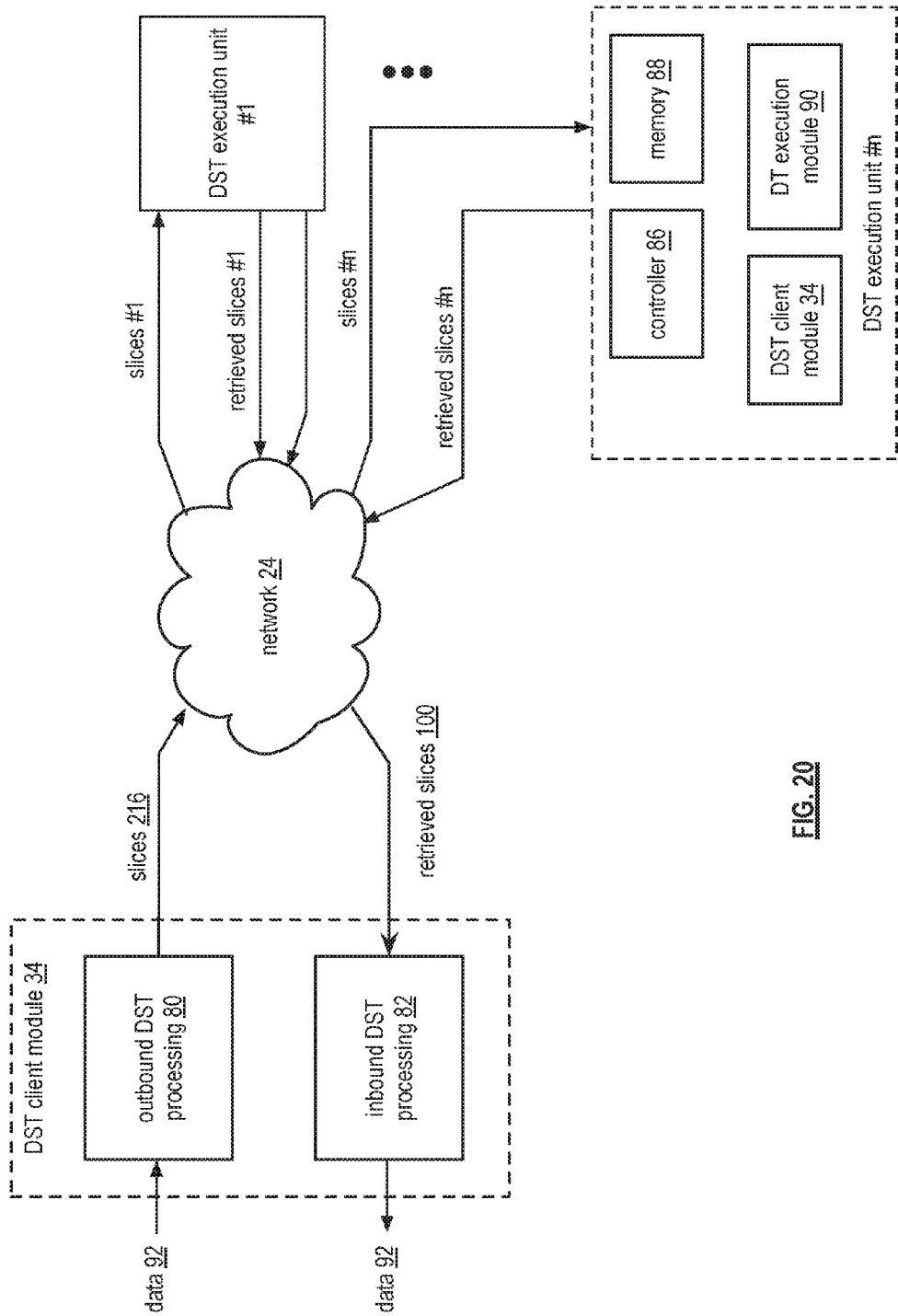
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
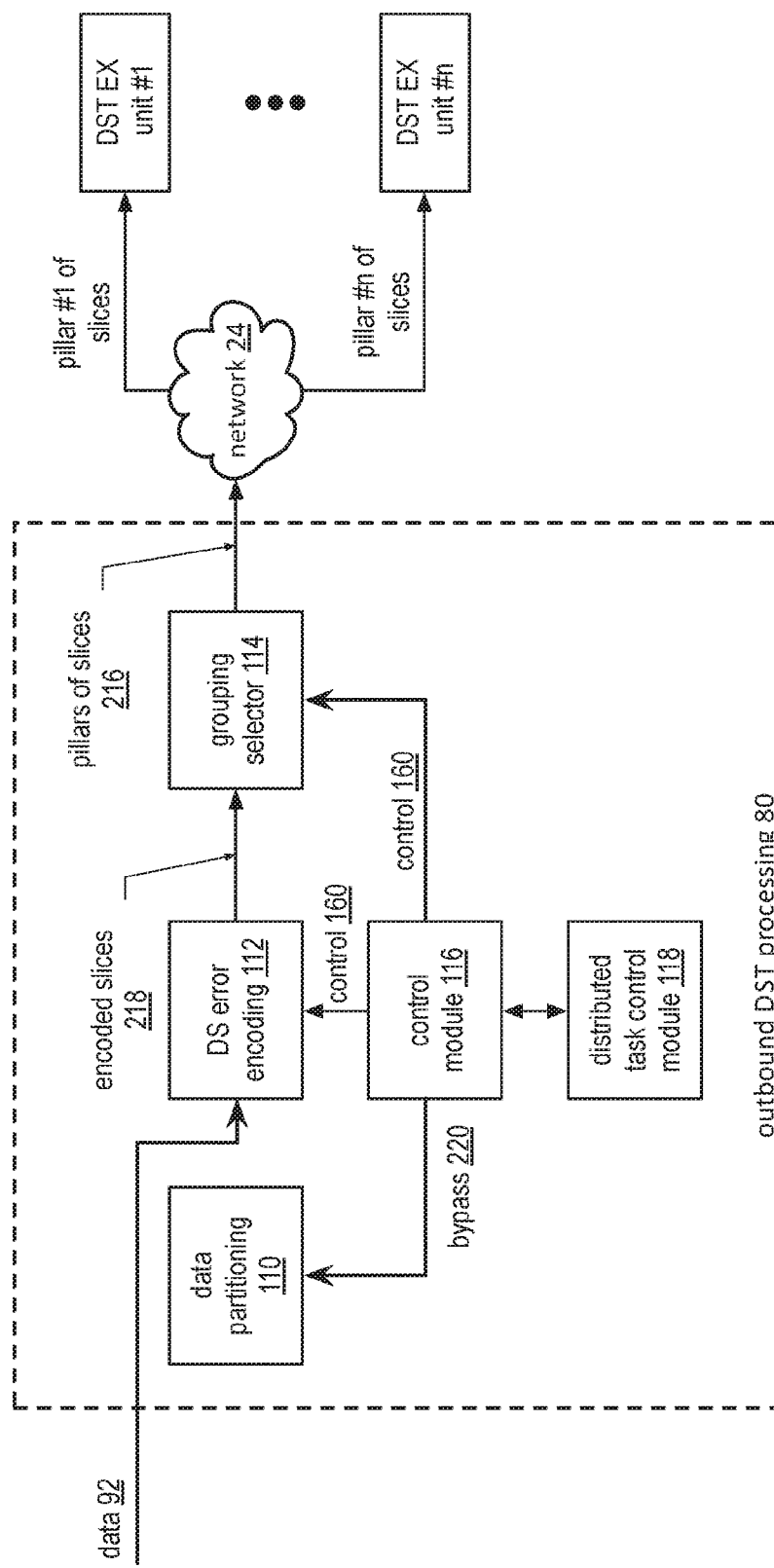
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
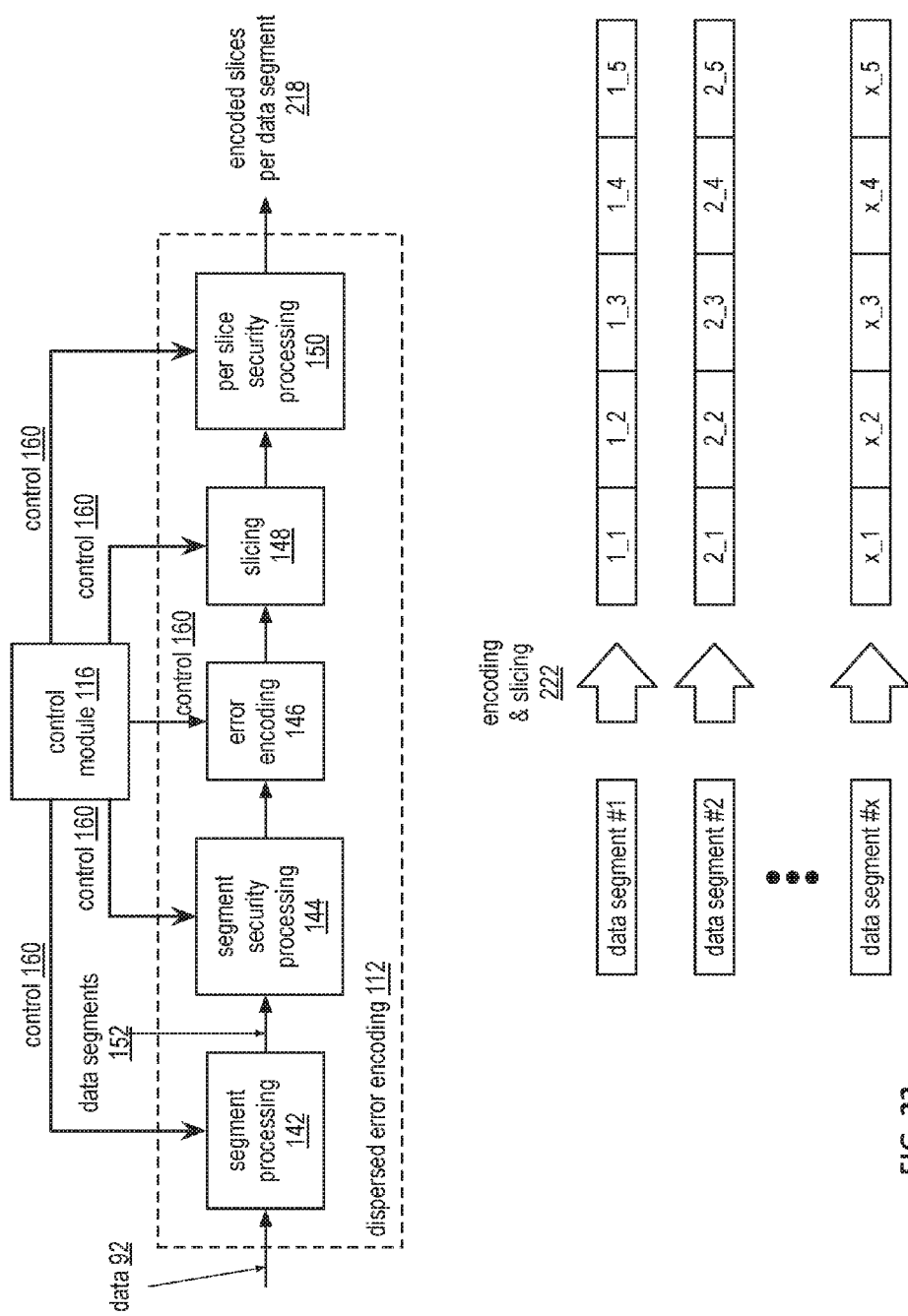
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
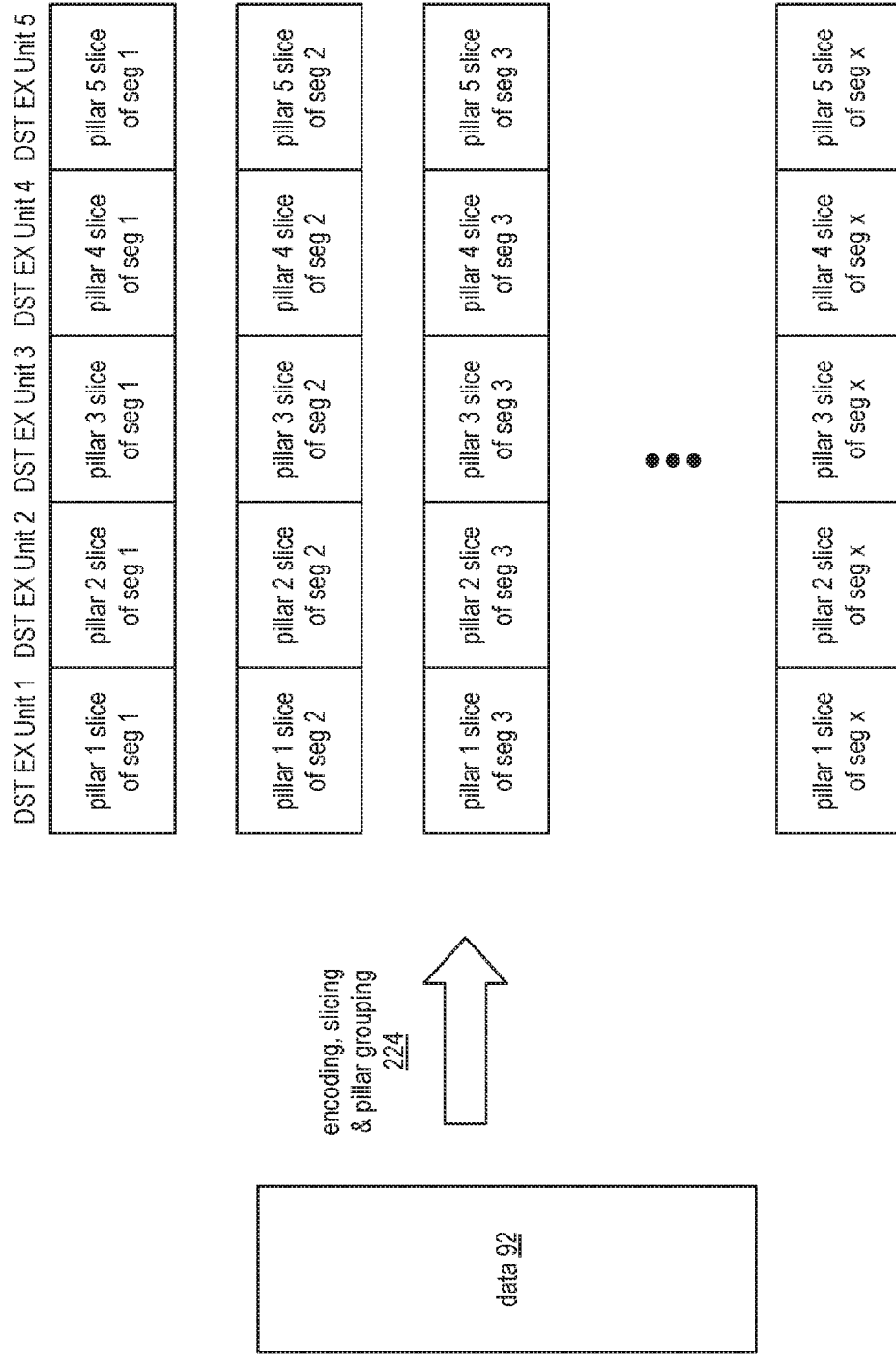
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
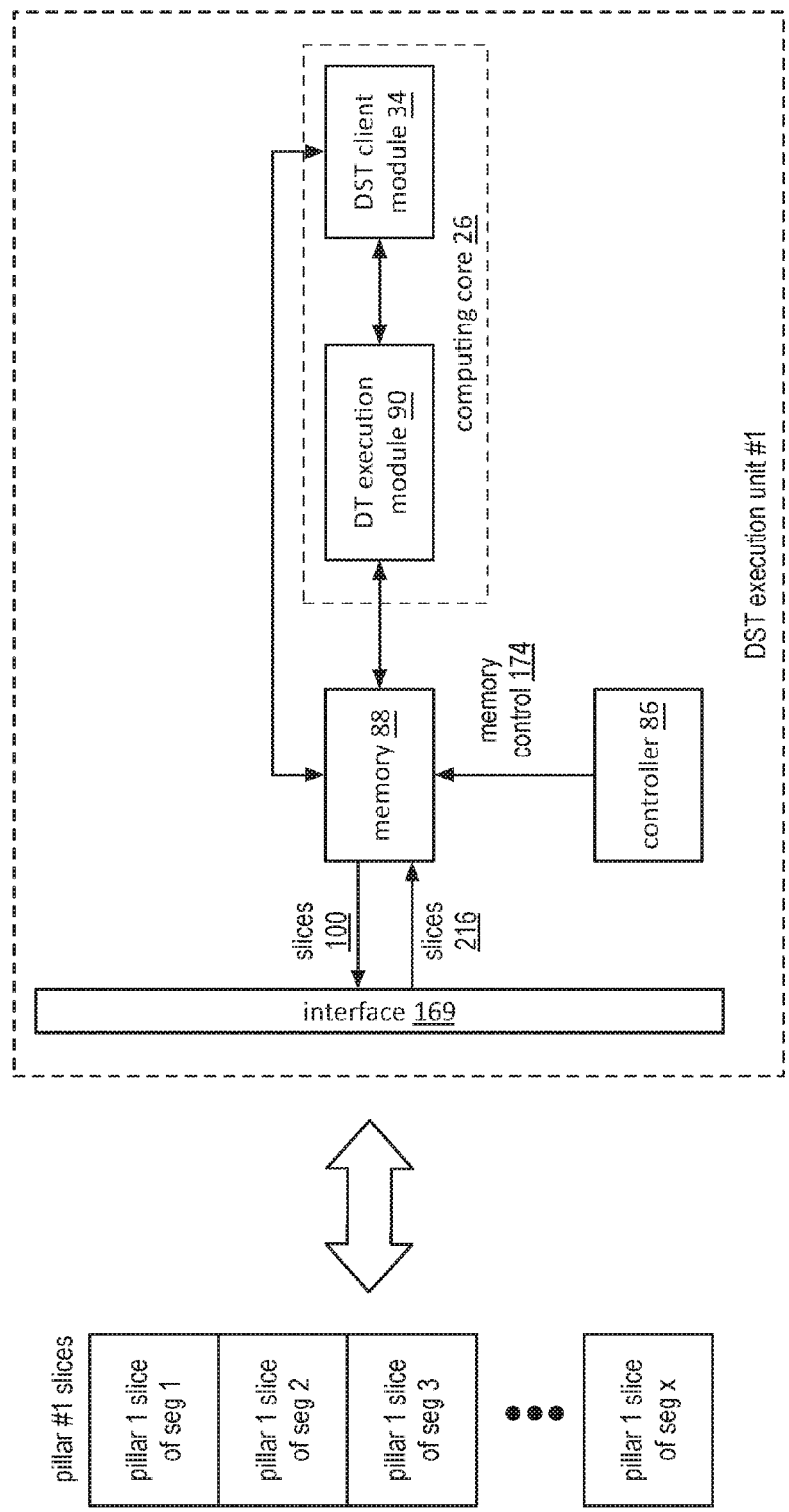
FIG. 24 is a schematic block diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
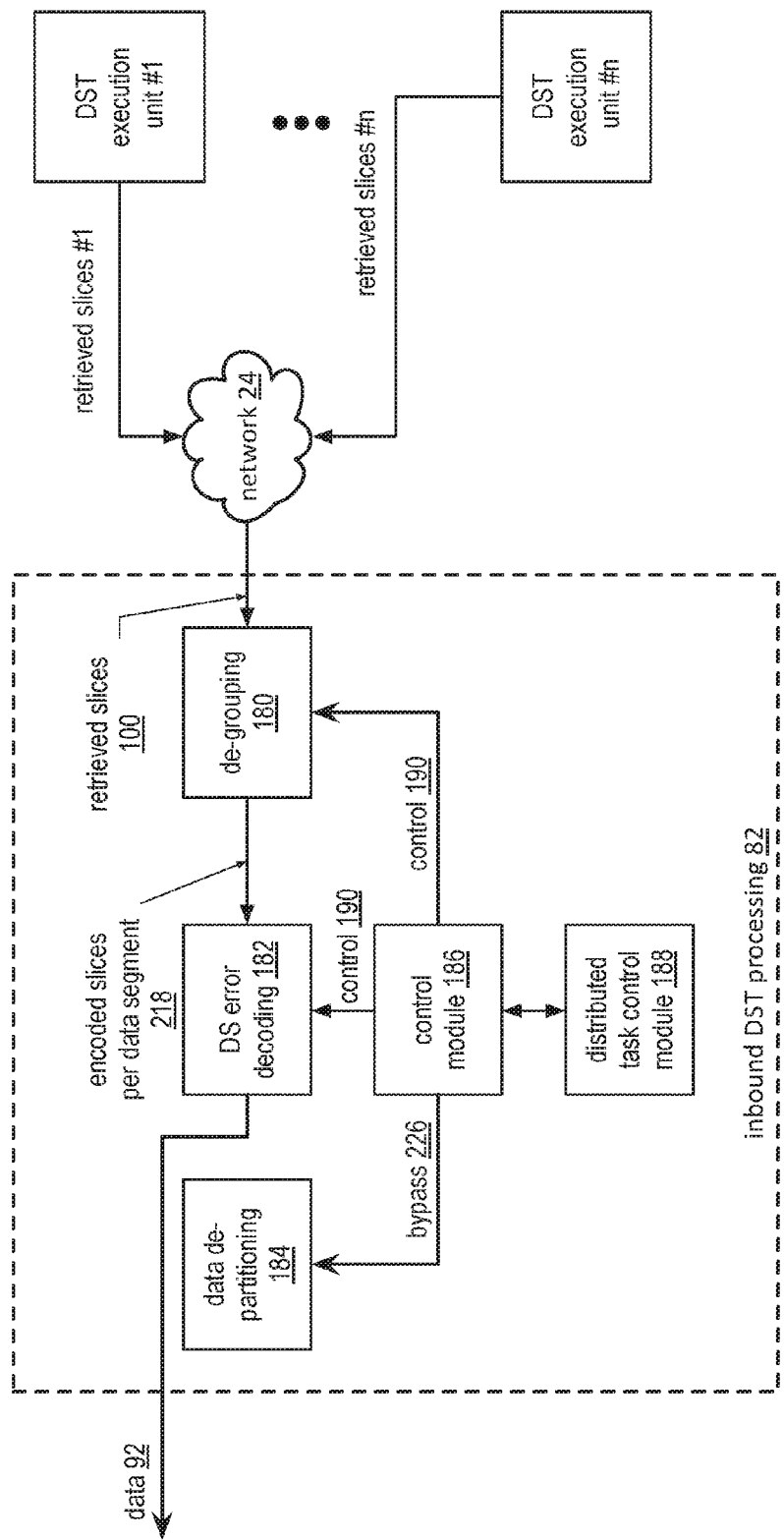
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
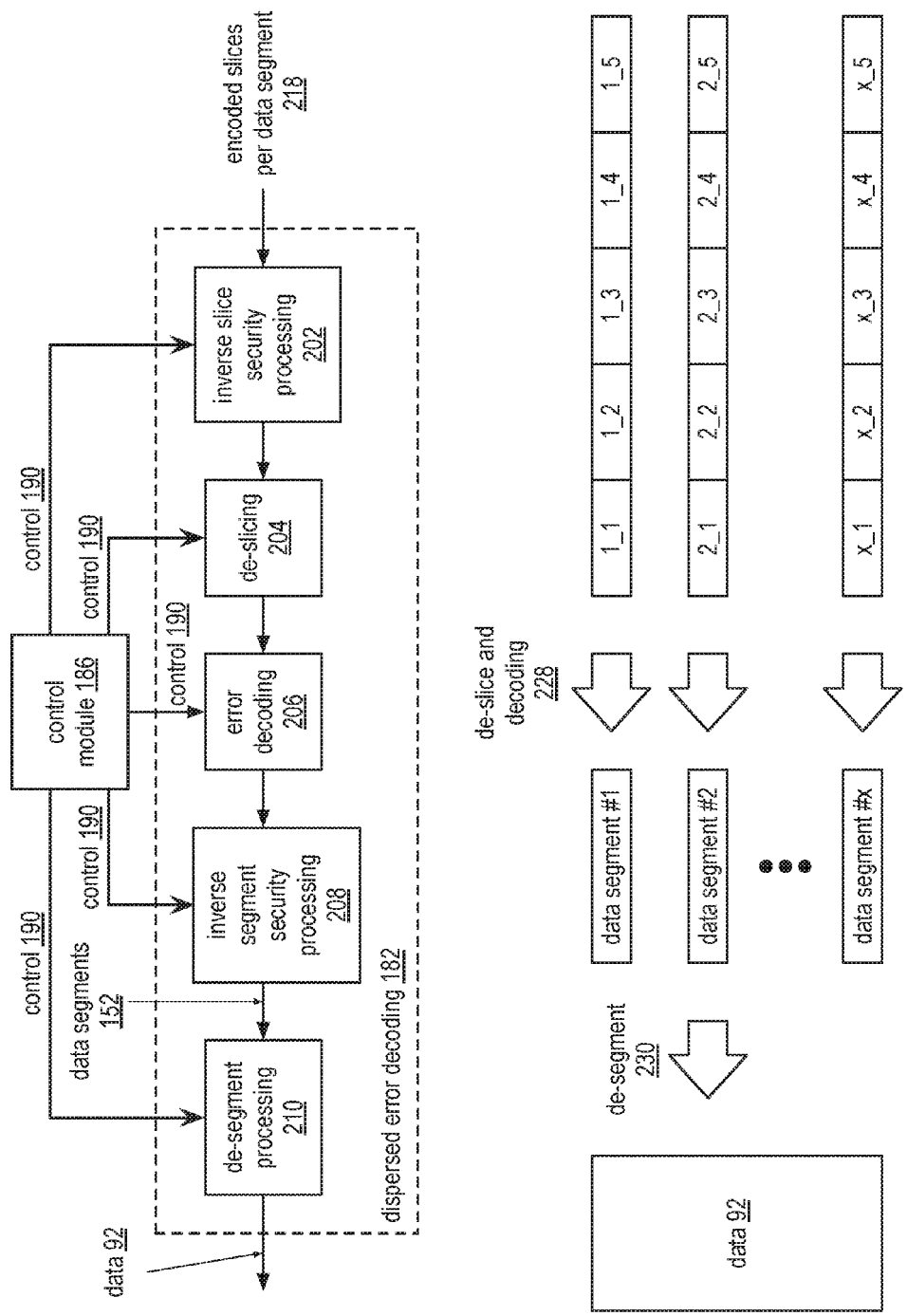
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
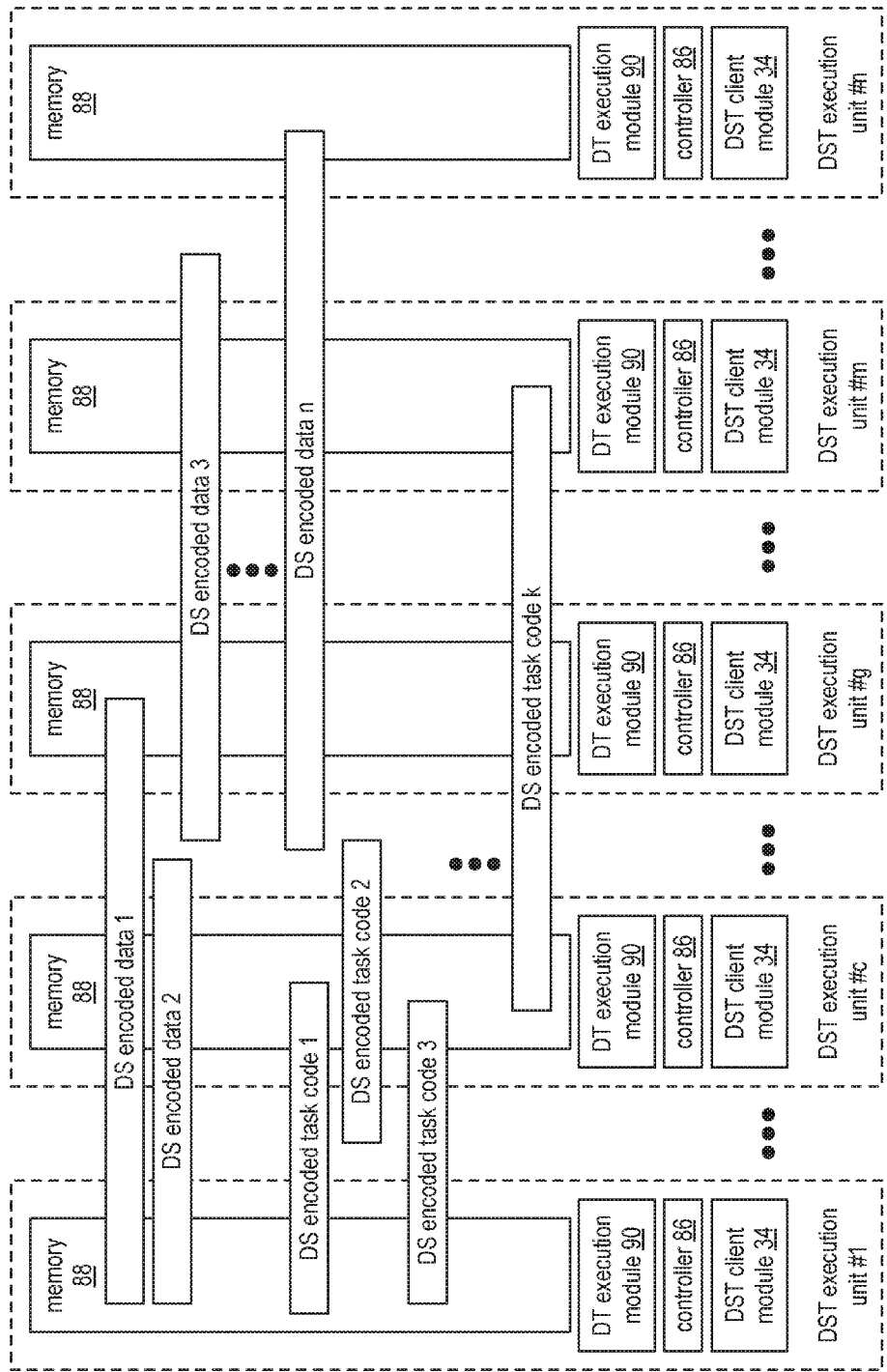
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
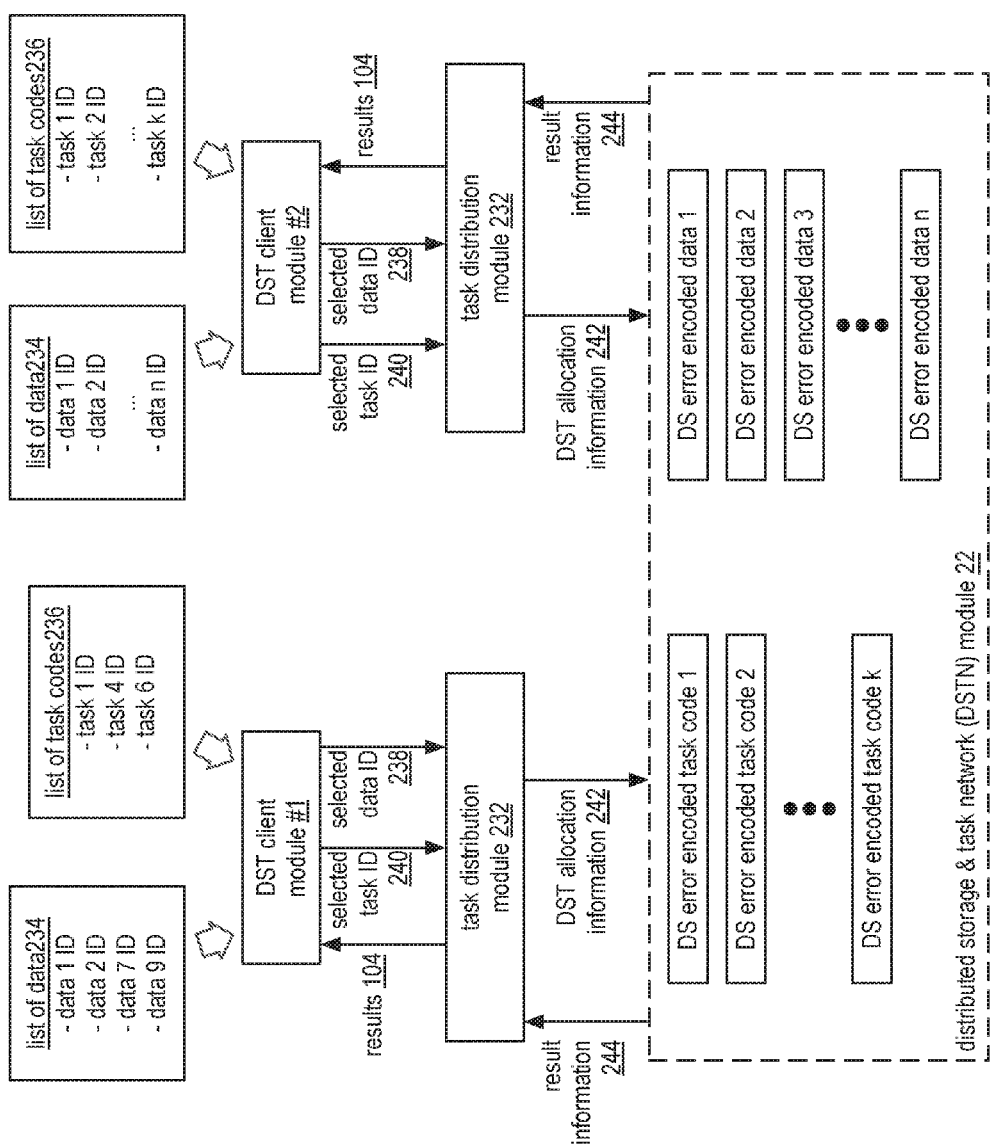
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
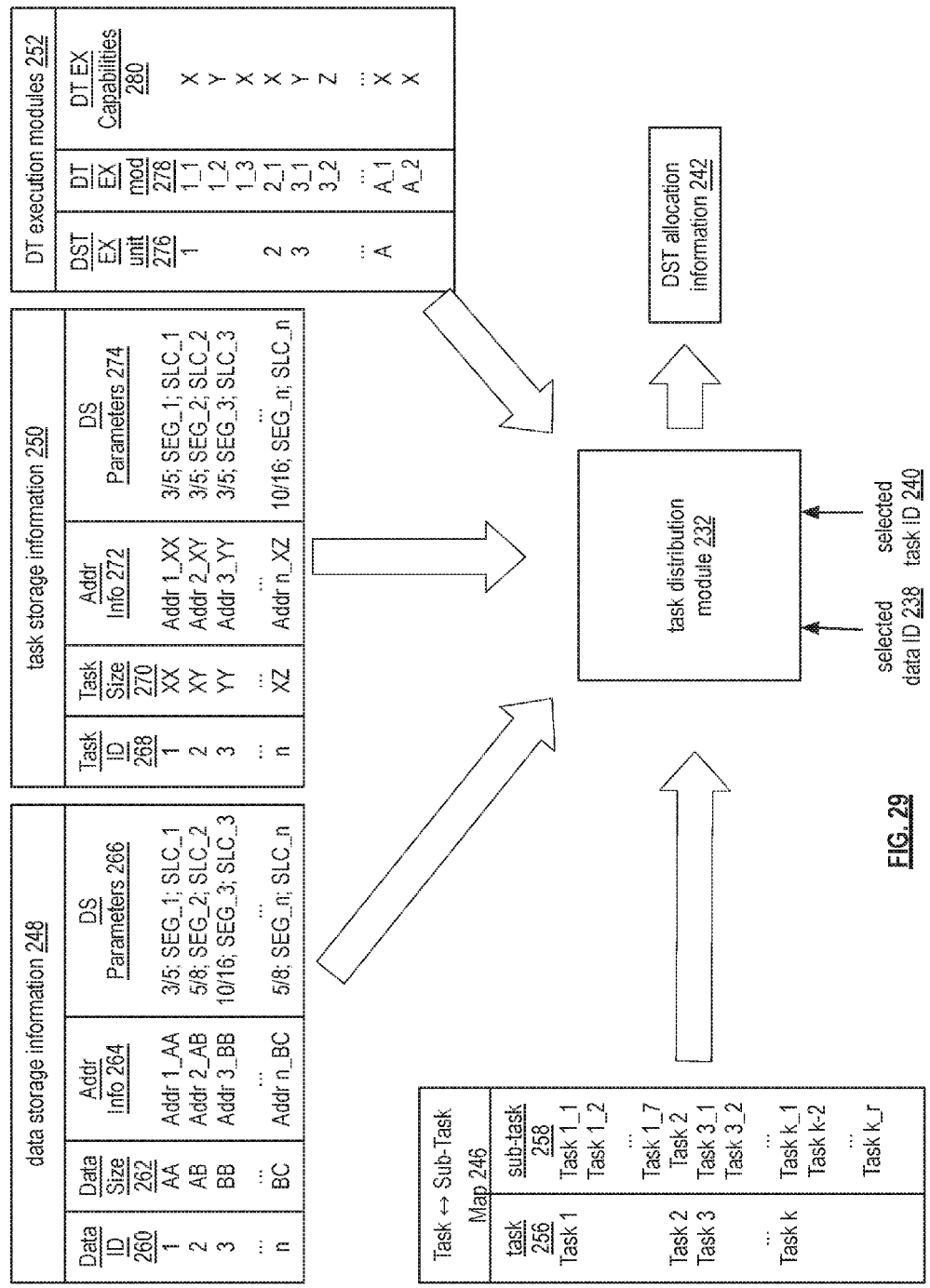
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
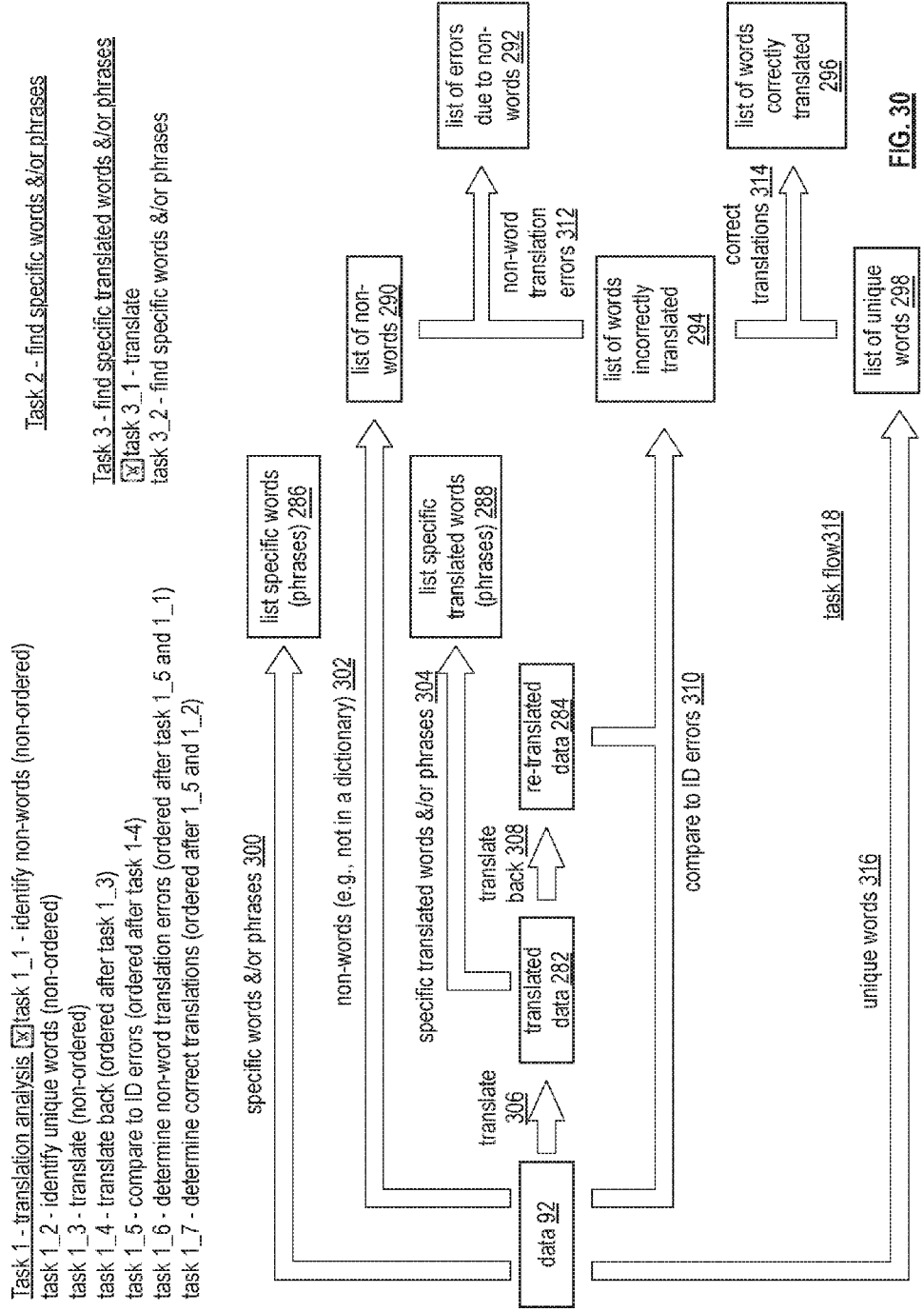
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
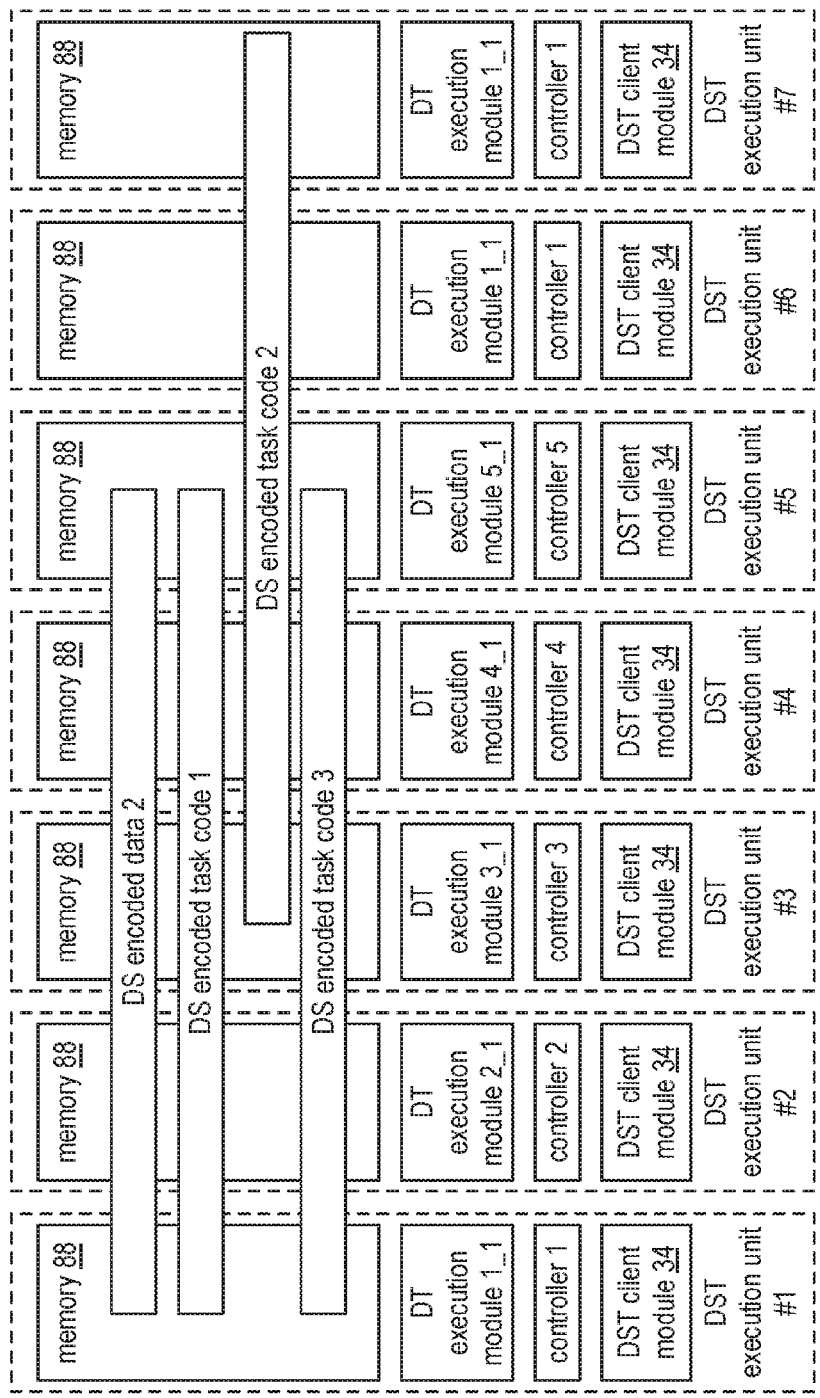
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
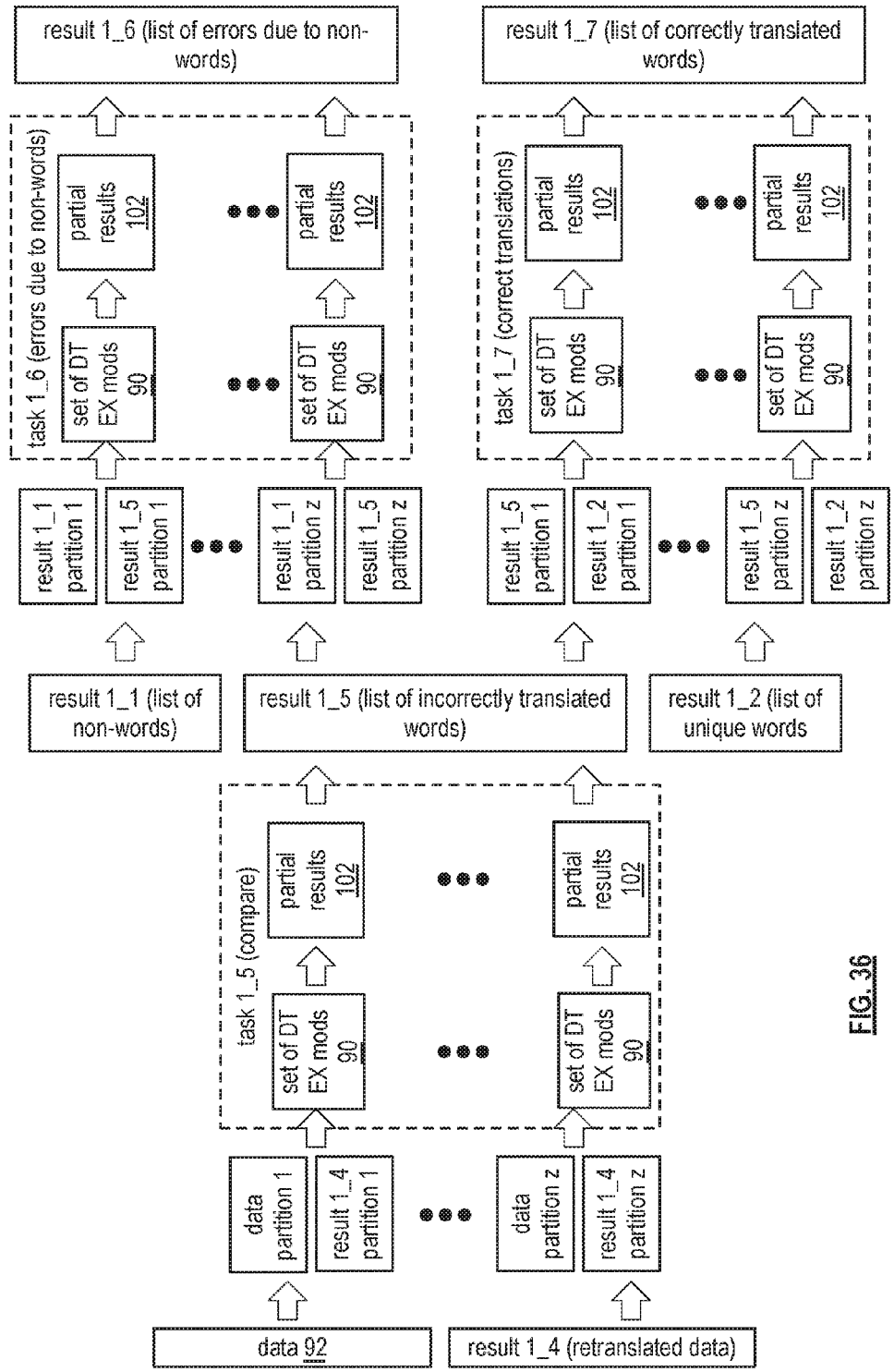

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., 1$^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
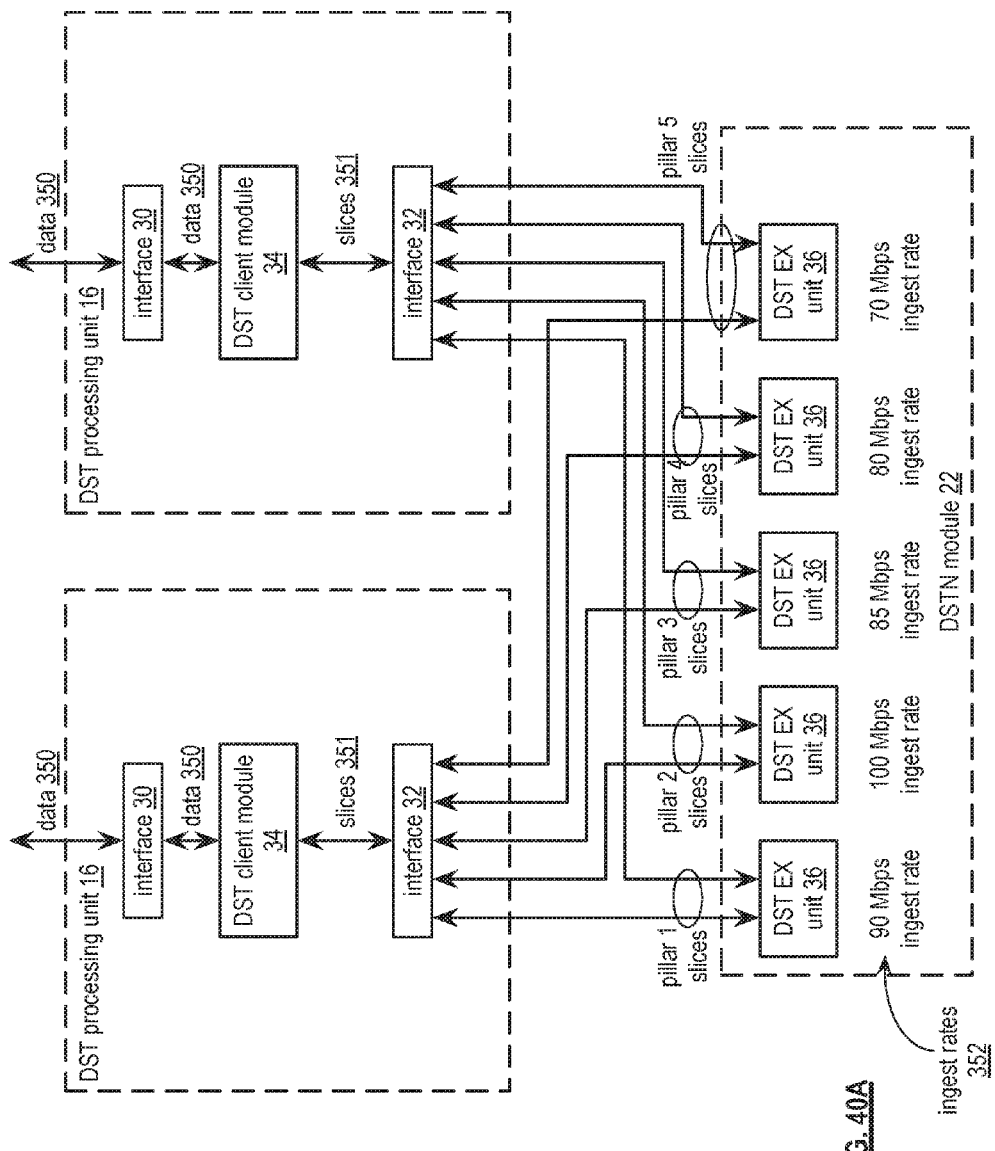
FIG. 40A is a schematic block diagram of another embodiment of a distributed computing system in accordance with the present invention.

FIG. 40A is a schematic block diagram of another embodiment of a distributed computing system that includes a plurality of distributed storage and task (DST) processing units 16 and a distributed storage and task network (DSTN) module 22. Each DST processing unit 16 of the plurality of DST processing units 16 includes an interface 30, a DST client module 34, and an interface 32. The DSTN module 22 includes a set of DST execution units 36. For example, the DSTN module 22 includes five DST execution units 36 when a pillar width is five.

The system functions to store data 350 as a plurality of sets of encoded data slices 351 in the DSTN module 22. The data 350 may be retrieved from the DSTN module 22 when at least a decode threshold number of encoded data slices per set of the plurality of sets of encoded data slices 351 are available. A DST client module 34 receives the data 350 via the interface 30 and encodes the data 350 to produce the plurality of sets of encoded data slices 351 for storage in at least a decode threshold number of DST execution units 36 of the set of DST execution units 36. For example, the DST client module 34 sends two sets of encoded data slices 351 to the DSTN module 22, where each set includes two of each of pillar 1 slices, pillar 2 slices, pillar 3 slices, pillar 4 slices, and pillar 5 slices.

Each DST client module 34 of the plurality of DST processing unit 16 may simultaneously receive the data 350, encode the data 350 to produce slices 351, and send the slices 351 to the set of DST execution units 36 for storage therein. Each DST execution unit 36 may be associated with a unique slice ingest rate 352 as compared to slice ingest rates 352 of other DST execution units 36. Each DST client module 34 may determine a write threshold when storing the data 350 in the DSTN module 22 based on slice ingest rates 352 of the set of DST execution units 36. The write threshold is greater than or equal to the decode threshold and less than or equal to the pillar width. For example, the DST client module 34 determines the write threshold to be 4 based on a current slice ingest rate of the set of DST execution units 36 when the decode threshold is 3 and the pillar width is 5. In such an example, the DST client module 34 sends 4 slices per set of the plurality of sets of encoded data slices to four of the DST execution units 36 for storage therein.

In an example of operation, the DST client module 34 of a first DST processing unit 16 receives the data 350 via interface 30 and encodes the data 350 to produce the plurality of sets of encoded data slices 351. The DST client module 34 determines the write threshold based on one or more of a reliability level goal, a speed threshold goal, an ingest rate of the data, a predetermination, a look up, a request, a query, a test, and input/output load placed on the set of DST execution units 36 by one or more other DST processing units 16, and an ingest rate 352 associated with each DST execution unit 36 of the set of DST execution units 36. For example, the DST client module 34 sends a first set of encoded data slices 351 to the set of DST execution units 36 and monitors ingestion performance to determine an ingest rate capability associated with each DST execution unit 36. For instance, a first DST execution unit 36 ingests pillar 1 slices at a rate of 90 MB per second, a second DST execution unit 36 ingests pillar 2 slices at a rate of 100 MB per second, a third DST execution unit 36 ingests pillar 3 slices at a rate of 85 MB per second, a fourth DST execution unit 36 ingests pillar 4 slices at a rate of 80 MB per second, and a fifth DST execution unit 36 ingests pillar 5 slices at a rate of 70 MB per second. Next, the DST client module 34 selects the write threshold to be three and determines to utilize the first, the second, and the third DST execution unit 36 to ingest the read threshold number of encoded data slices per set of encoded data slices 351 since those DST execution units 36 have a favorable ingestion rate capability level.

As another example, DST client module 34 obtains input/output load information from other DST processing unit 16 of the plurality of DST processing units 16 to determine available access capacity of each DST execution unit 36. The method of operation of the DST client module 34 where this example is discussed in greater detail with reference to FIG. 41.

The DST client module 34 sends the write threshold number of encoded data slices per set of encoded data slices three and 51 to a corresponding write threshold number of DST execution units 36 of the set of DST execution units 36. The DST client module 34 may facilitate rebuilding of other encoded data slices per set of encoded data slices three and 51, where the other encoded data slices were not written to corresponding DST execution units 36.

Figure 40B:
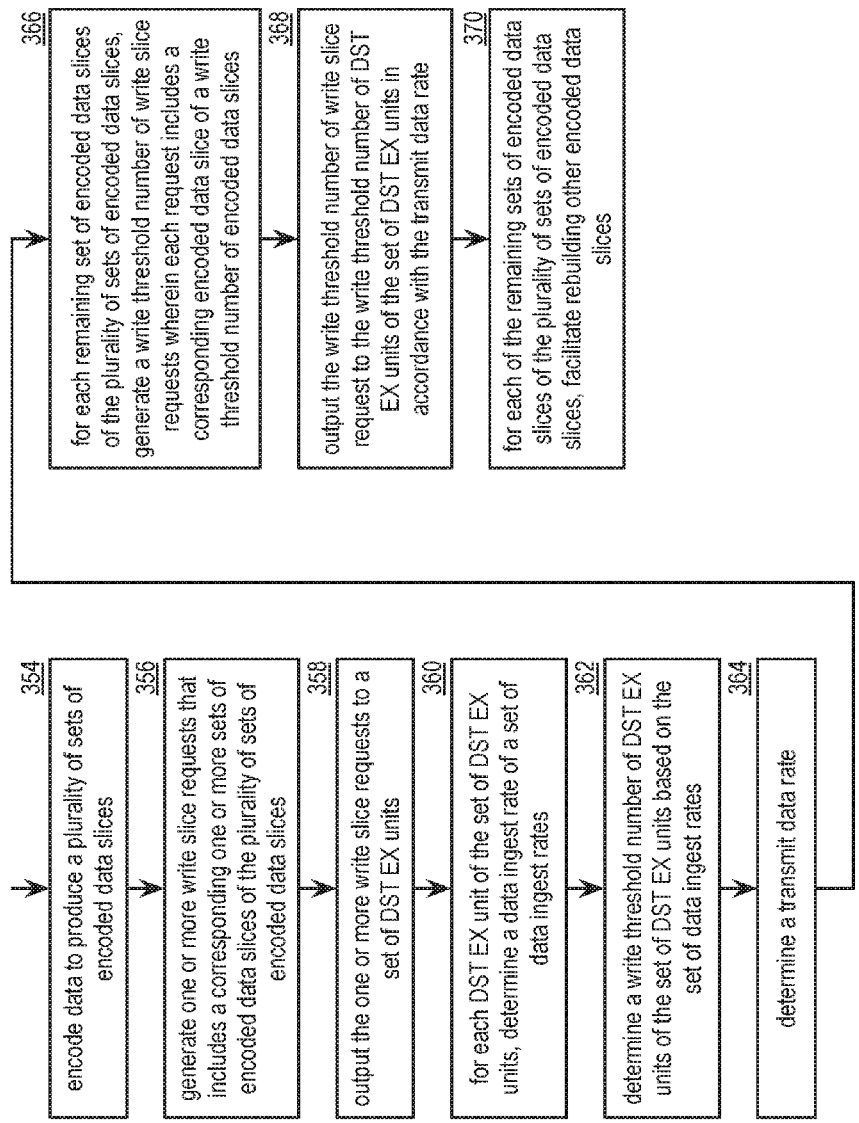
FIG. 40B is a flowchart illustrating an example of storing data in accordance with the present invention.

FIG. 40B is a flowchart illustrating an example of storing data. The method begins at step 354 where a processing module (e.g., of a distributed storage and task (DST) client module) encodes data to produce a plurality of sets of encoded data slices utilizing a dispersed storage error coding function. The method continues at step 356 where the processing module generates one or more sets of write slice requests that includes a corresponding one or more sets of encoded data slices of the plurality of sets of encoded data slices. The generating may include determining the number of the one or more sets of write slice requests based on at least one of a predetermination, a historic number to realize reliable ingest speed data, and a request. For example, the processing module determines to send five sets of encoded data slices when reliable ingest speed data has been historically obtained utilizing four sets of encoded data slices.

The method continues at step 358 where the processing module outputs the one more sets of write slice requests to a set of DST execution units. For each DST execution unit of a set of DST execution units, the method continues at step 360 where the processing module determines a data ingest rate of a set of data ingest rates. The determining may be based on one or more of a query, a speed test, a lookup, and receiving an error message.

The method continues at step 362 where the processing module determines a write threshold number of DST execution units of the set of DST execution units based on the set of data ingest rates. The determining may be further based on one or more of an estimated reliability level for data storage, a reliability level threshold, an estimated access speed, a lowest access speed of the write threshold number of DST execution units, a speed threshold, an access capability estimator, a predetermination, an estimated rebuilding impact, a rebuilding impact threshold, and a lookup. For example, a processing module determines to utilize a first, a third, a fourth and a fifth DST execution unit of the set of DST execution units to realize the write threshold of four for a set of five DST execution units, when the first, the third, the fourth, and the fifth DST execution unit each have an estimated access speed greater than the speed threshold, and the estimated rebuilding impact compares favorably to the rebuilding impact threshold for rebuilding slices of a second DST execution unit of the set of DST execution units.

The method continues at step 364 where the processing module determines a transmit data rate such that the transmit data rate compares favorably (e.g., greater than or equal to) to a lowest data ingest rate of the write threshold number of DST execution units. For example, the processing module determines the transmit data rate to be 70 MB per second when the lowest data ingest rate of the write threshold number of DST execution units is 70 MB per second. For each remaining set of encoded data slices of the plurality of sets of encoded data slices, the method continues at step 366 where the processing module generates a write threshold number of write slice requests, where each request includes a corresponding encoded data slice of a write threshold number of encoded data slices. For example, the processing module generates write slice requests for pillars one, three, four, and five when DST execution units one, three, four, and five have been selected as part of the write threshold number of DST execution units.

The method continues at step 368 where the processing module outputs the write threshold number of write slice requests to the write threshold number of DST execution units of the set of DST execution units in accordance with the transmit data rate. For example, the processing module outputs slices to each of the write threshold number of DST execution units at a rate of 70 MB per second when the transmit data rate is 70 MB per second. The for each of the remaining sets of encoded data slices of the plurality of sets of encoded data slices, the method continues at step 370 where the processing module facilitates rebuilding other encoded data slices (e.g., slices not written). The facilitating includes at least one of directly rebuilding, rebuilding in accordance with a schedule to achieve a loading goal, and sending a rebuilding request to a rebuilding module.

Figure 41:
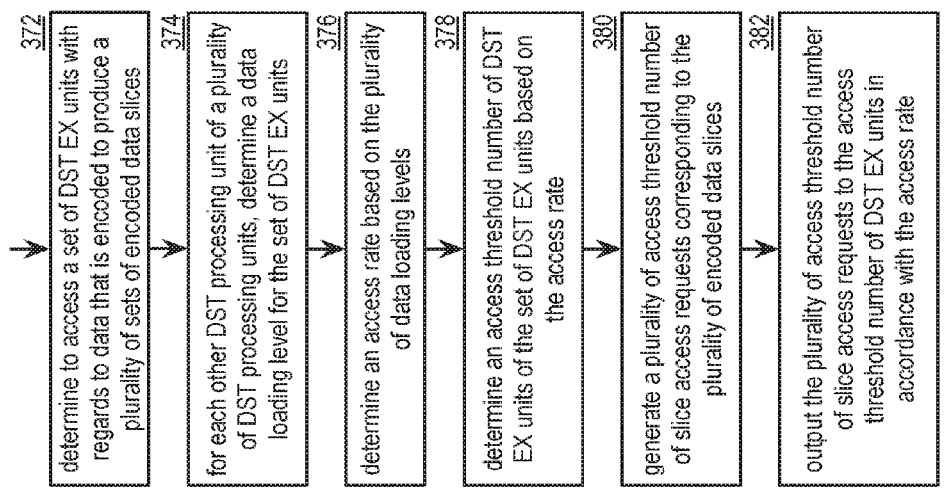
FIG. 41 is a flowchart illustrating another example of storing data in accordance with the present invention.

FIG. 41 is a flowchart illustrating another example of storing data. The method begins at step 372 where a processing module (e.g., of a distributed storage and task (DST) client module of a DST processing unit) determines to access a set of DST execution units with regards to data that is encoded to produce a plurality of sets of encoded data slices. The accessing includes at least one of reading a slice and writing a slice. The determining may be based on one or more of receiving a retrieval request, receiving a rebuilding request, and receiving a storage request.

For each other DST processing unit of a plurality of DST processing units that includes the DST processing unit, the method continues at step 374 where the processing module determines a data loading level for the set of DST execution units. The data loading level includes input and/or output loading metrics for access to each DST execution unit of the set of DST execution units with regards to the DST processing unit. The determining may be based on one or more of a query, a test, monitoring loading levels, receiving a list, and receiving loading information as part of an access request. For example, the processing module queries for DST processing units for a data loading level with regards to the set of DST execution units when the processing module determines that five DST processing units are accessing the set of DST execution units, wherein the five DST processing units includes the DST processing unit.

The method continues at step 376 where the processing module determines an access rate based on the plurality of data loading levels. The processing module determines the access rate such that the access rate plus an aggregate of the plurality of data loading levels is less than an access capability level of the set of DST execution units. The method continues at step 378 where the processing module determines an access threshold number of DST execution units of the set of DST execution units based on the access rate. The determining includes identifying a loading level for each DST execution unit in determining the access threshold number by dividing the access rate by a lowest loading level of a set of loading levels. The method continues at step 380 where the processing module generates a plurality of access threshold number of slice access requests corresponding to the plurality of encoded data slices. The method continues at step 382 where the processing module outputs the plurality of access threshold number of slice access requests to the access threshold number of DST execution units in accordance with the access rate.

Figure 42A:
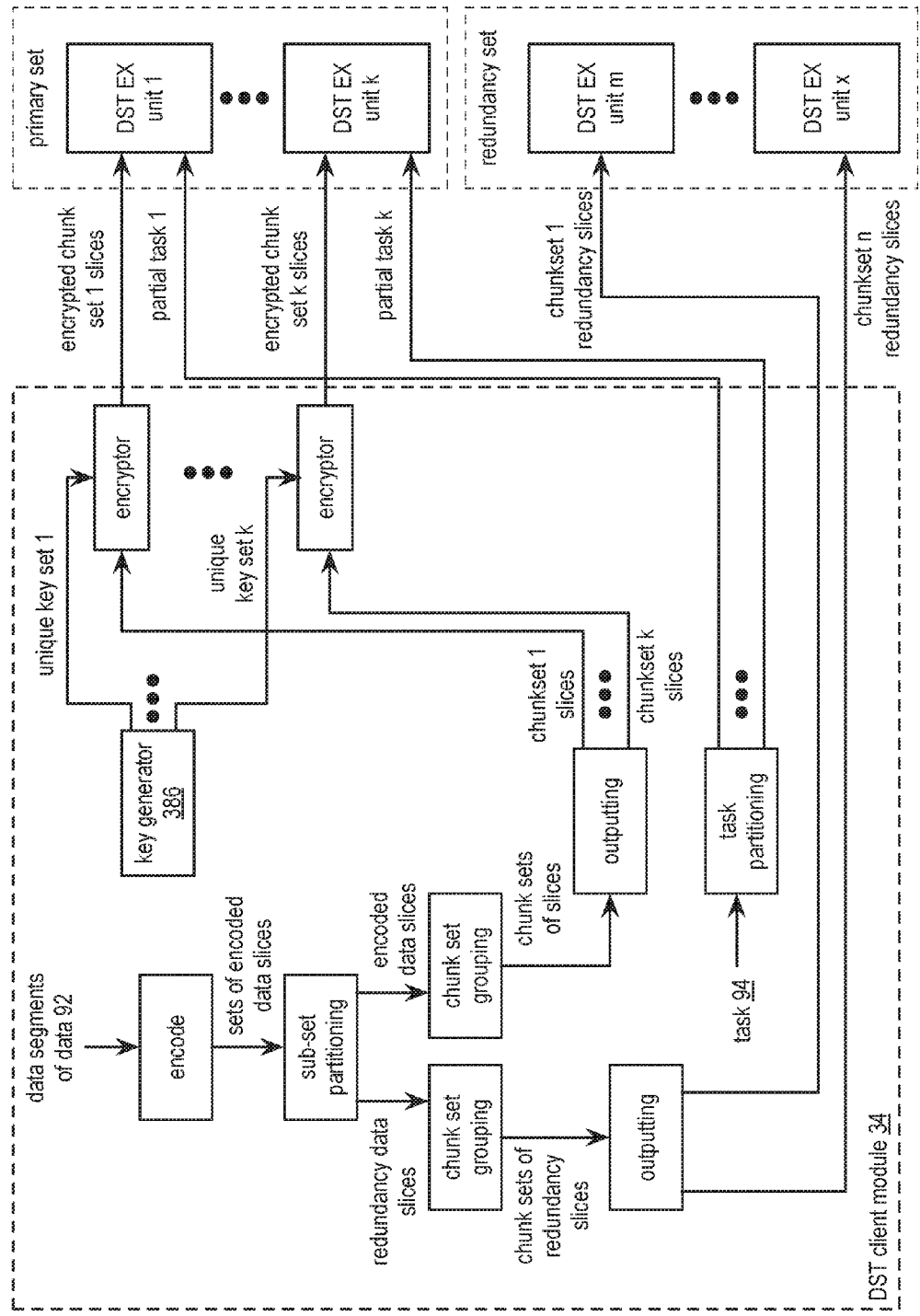
FIG. 42A is a schematic block diagram of another embodiment of a distributed computing system in accordance with the present invention.

FIG. 42A is a schematic block diagram of another embodiment of a distributed computing system that includes a DST client module 34 coupled to a set of dispersed storage and task (DST) execution units 1-$x$ via a network 24 (not shown). The DST client module 34 includes an encoding module, a sub-set partitioning module, two chunk set grouping modules, two outputting modules, a task partitioning module, a key generator 386, and a plurality of encryptor modules. The set of DST EX units 1-$x$ are divided into a primary set that includes DST EX units 1-$k$ and a redundancy set that includes DST EX units m-x, where k, m, and x are integers and where x is greater than m and m is greater than k.

In an example of operation, the DST client module 34 receives data 92 and a task 94 to be performed on the data 92. The task partitioning module partitions the task 94 into a set of partial tasks (e.g., partial tasks 1-k). The task partitioning module determines which DST EX units of the set of DST EX units 1-x that will perform the partial tasks on respective encoded and encrypted portions of the data 92. For example, the task partitioning module determines that the DST EX units 1-k of the primary set will perform the partial tasks.

With respect to the data, the DST client module 34 divides it into data segments. The encoding module encodes a data segment in accordance with error encoding parameters of a dispersed storage error encoding function to produce a set of encoded data slices. For example, the error encoding parameters indicate a total number of encoded data slices are to be created for each data segment, a decode number of encoded data slices that is needed to recover the data segment, and a redundancy number of encoded data slices, which is the total number minus the decode number. The error encoding parameters may indicate further encoding information such as the type of error encoding to perform, where the data segments are to be encrypted prior to encoding, whether integrity information is to be created for the data segment prior to encoding, whether integrity information is to be created for each encoded data slice, etc.

For each set of encoded data slices, the sub-set partitioning module divides a set of encoded data slices into a data slice set (e.g., the decode threshold number of encoded data slices) and into a redundancy data slice set (e.g., the redundancy number of encoded data slices). The sub-set partitioning module sends data slice sets to a first chunk set grouping module and sends redundancy data slices sets to a second chunk set grouping module.

The first chunk set grouping module groups a plurality of data slice sets (e.g., two or more) into a chunkset of slices. The second chunk set grouping module groups a plurality of redundancy data slice sets (e.g., two or more) into a chunkset of redundancy slices. For example, assume that the encoding module encodes a data segment into five encoded data slices; three of which are needed to recover the data segment and two are for redundancy. As such, the three encoded data slices are in the encoded data slice set and the two encoded data slices are in the redundancy data slice set. The first chunk set grouping module groups the three encoded data slices from a plurality of data segments into a chunk set of slices and the second chunk set grouping module groups the two encoded data slices from the plurality of data segments into a chunk set of redundancy slices.

The first outputting module receives chunksets of slices from the first chunk set grouping module and, for each chunkset of slices, divides and then outputs them as sub-chunksets of slices (e.g., chunkset 1 slices, chunkset 2 slices, . . . chunkset k slices). Continuing with the example above where each data segment requires three encoded data slices to recover the data segment, the first outputting module divides a chunkset of slices into three subsets, where an encoded data slice from each of the encoded data segments is included in each of the subset of chunkset of slices. As a more specific example, assume that a chunkset of slices includes encoded data slices for three data segments (e.g., EDS 1-1, EDS 1-2, EDS 1-3, EDS 2-1, EDS 2-2, EDS 2-3, EDS 3-1, EDS 3-2, and EDS 3-3, where EDS means encoded data slices, the first number represents the data segment, and the second number represents the slice number for the data segment). For this specific example, the first outputting module creates a first sub-chunkset of EDS 1-1, EDS 2-1, and EDS 3-1; a second sub-chunkset of EDS 1-2, EDS 2-2, and EDS 3-2; and a third sub-chunkset of EDS 1-3, EDS 2-3, and EDS 3-3.

The first outputting module sends the first sub-chunkset of slices to a first encryptor module, the second sub-chunkset of slices to a second encryptor, and so on. The first encryptor module encrypts the first sub-chunkset of slices using a first unique key set to produce an encrypted sub-chunkset of slices (e.g., encrypted chunk set 1 slices). Similarly, each of the other encryptor modules (e.g., encryptor 2 through encryptor k) encrypts its respective sub-chunkset of slices using a respective unique key set to produce a respective encoded sub-chunkset of slices.

The key generator module 386 generates each of the unique key sets for the encryptor modules based on an assigned partial task, information regarding a targeted DST EX unit (e.g., ID of the unit, a public key of a public/private key pair of the unit, etc.), information regarding the key generation (e.g., encryption algorithm, key seed, the data being encrypted, etc.), and/or a pseudo random function. The key generator module 386 may generate a new unique key set for each new sub-chunkset of slices or the same unique key set may be used for multiple sub-chunkset of slices. In addition, the key generator module 386 may generate one or more keys for a given unique key set. For example, the key generator module 386 may generate three keys for a given unique key set when the corresponding sub-chunkset of slices includes three sets of a decode number of encoded data slices. As a specific example, with the first sub-chunkset of slices includes EDS 1-1, EDS 2-1, and EDS 3-1, the key generator module generates a first key for EDS 1-1, a second key for EDS 2-1, and a third key for EDS 3-1. As another specific example, the key generator module generates one key for encrypting EDS 1-1, EDS 2-1, and EDS 3-1 of the first sub-chunkset of slices.

The encryptor modules output the encrypted sub-chunkset of slices to DST EX units 1-k of the primary set. Each of the DST EX units 1-k decrypts its respective encrypted sub-chunkset of slices to recover the sub-chunkset of slices. Each of the DST EX units 1-k then performs its assigned partial task on the recovered sub-chunkset of slices to produce a partial result. Examples of this were previously discussed.

The second outputting module receives the chunkset of redundancy slices and divides them into sub-chunksets of redundancy slices (e.g., chunkset 1 of redundancy slices, . . . , chunkset n of redundancy slices). The second outputting module then sends each sub-chunkset of redundancy slices to a respective one of the DST EX units in the redundancy set.

Figure 42B:
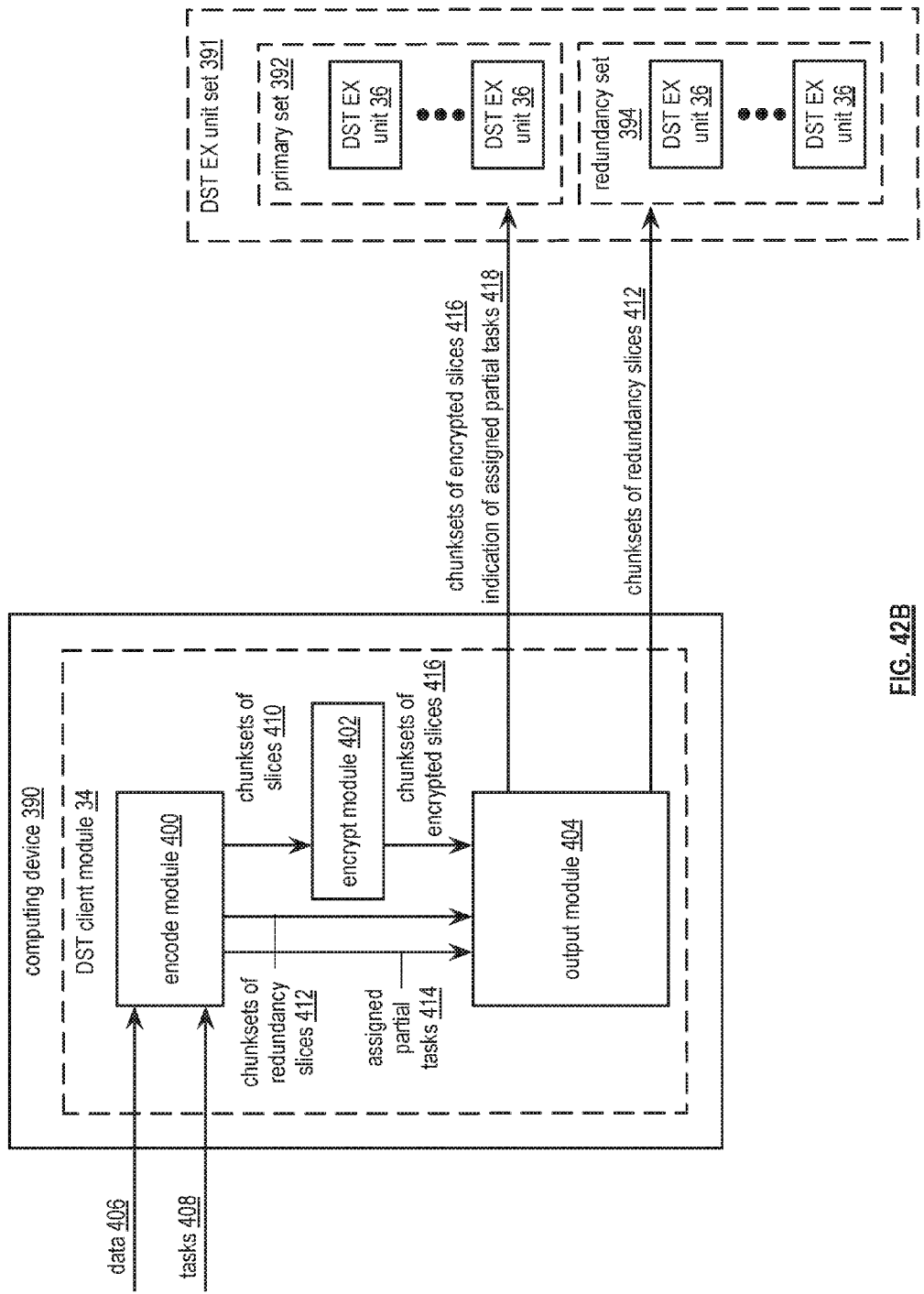
FIG. 42B is a schematic block diagram of another embodiment of a distributed computing system in accordance with the present invention.

FIG. 42B is a schematic block diagram of another embodiment of a computing device 390 and a set of distributed storage and task (DST) execution units 391. The DST execution units set 391 is divided into a primary set 392 of DST EX units 36 and a redundancy set 394 of DST execution units 36. The computing device 390 may be implemented utilizing at least one of a DST processing unit, a DS processing unit, a user device, a DST execution unit, and a DS unit. The computing device 390 includes a DST client module 34, which includes an encode module 400, an encrypt module 402, and an output module 404.

The system functions to reliably and securely store data 406 in the DST execution unit set 391 to facilitate processing of one or more distributed computing tasks on the data 406. The storing includes three primary functions: encoding the data 406; encrypting the encoded data, and sending the encrypted data to the DST execution unit set 391 for performance of a task thereon. To encode the data 406, the encode module 400 encodes the data 406 using a dispersed storage error encoding function to produce a plurality of sets of encoded data slices, where a set of encoded data slices includes encoded data slices and redundancy encoded data slices. For example, the encoded data slices includes a decode threshold number of encoded data slices and the redundancy encoded data slices includes a pillar width minus the decode threshold number of encoded data slices.

The encoding module 400 arranges the encoded data slices d into chunksets of slices 410 and arranges the redundancy encoded data slices into chunksets of redundancy slices 412. For example, the encode module 400 creates a chunkset of slices 410 to include encoded data slices having a common pillar number.

The encode module 400 selects the primary set 392 (e.g., henceforth interchangeably described as a set of primary storage and execution units) from the set 391 to store the chunksets of slices 410 and selects the redundancy set 394 (e.g., henceforth interchangeably described as a set of redundancy storage and execution units) of the set 391 to store the chunksets of redundancy slices 412. Having identified the primary set 392, the encode module 400 assigns partial tasks 414 of the tasks 408 to the set of primary storage and execution units 392 (e.g., assigned based on processing requirements and capabilities).

The encrypt module 402 generates a unique key set for each DST EX unit 396 based on the assigned partial task 414 (e.g., a task identifier, a bit pattern of the task), information regarding the corresponding primary storage and execution unit (e.g., a public key, a unit identifier), information regarding key generation (e.g., basis, method), and/or a pseudo random function (e.g., random number generator). The unique key set includes one or more keys for encrypting one or more encoded data slices of a corresponding chunkset for a DST execution unit 396.

As a specific example, the encrypt module 402 generates the unique key sets based on the assigned partial tasks. For a given DST EX unit, the encrypt module 402 identifies the assigned partial task 414 and performs a deterministic mathematical function (e.g., a hashing function, a hash-based message authentication code function, a mask generating function, a sponge function) on bits of the assigned partial task to create a value. The encrypt module 402 manipulates the value into the unique key set (e.g., set equal to, use as a seed for multiple unique keys, use as a value in a formula, truncate, use the mask generating function).

After generating the unique key sets, the encrypt module 402 encrypts each of the chunksets of slices 410 with a corresponding one of the unique key sets to produce chunksets of encrypted slices 416. The encrypt module 402 provides the chunkset of encrypted slices 416 to the output module 404, which sends respective sub-chunksets of encrypted slices 416 and respective assigned partial tasks 418 to the DST EX units of the primary set 392. In addition, the output module 404 sends respective sub-chunksets of redundancy slices 412 to the DST EX units of the redundancy set 394.

Figure 42C:
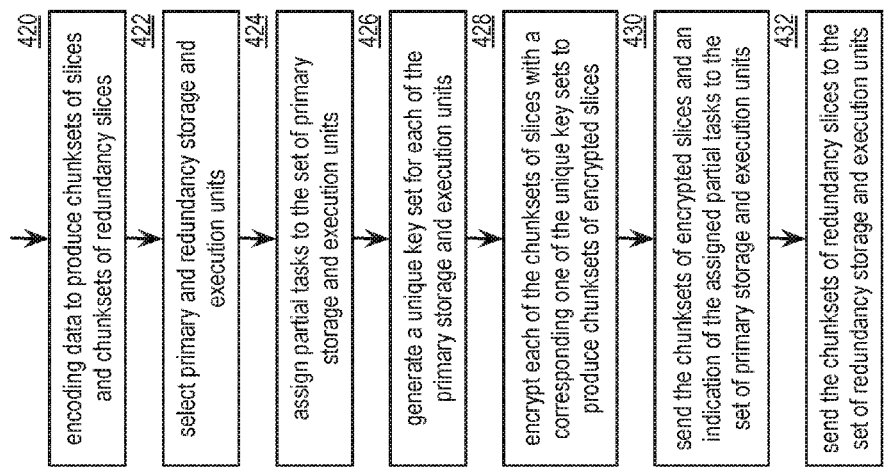
FIG. 42C is a flowchart illustrating an example of encrypting slices in accordance with the present invention.

FIG. 42C is a flowchart illustrating an example of encrypting slices. The method begins at step 420 where a processing module (e.g., of a distributed storage and task (DST) processing unit) encodes data using a dispersed storage error encoding function to produce a plurality of sets of encoded data slices, where a set of the plurality of sets of encoded data slices includes encoded data slices (e.g., a decode threshold number) and redundancy encoded data slices. The encoded data slices of the plurality of sets of encoded data slices are arranged into chunksets of slices (e.g., by common pillar) and the redundancy encoded data slices of the plurality of sets of encoded data slices are arranged into chunksets of redundancy slices. The method continues at step 422 where the processing module selects a set of primary storage and execution units for the chunksets of slices and a set of redundancy storage and execution units for the chunksets of redundancy slices. The method continues at step 424 where the processing module assigns partial tasks of one or more distributed computing tasks to the set of primary storage and execution units.

The method continues at step 426 where the processing module generates a unique key set for each of the primary storage and execution units based on at least one of: the assigned partial task for the corresponding primary storage and execution unit, information regarding the corresponding primary storage and execution unit, information regarding key generation, and a pseudo random function. The generating the unique key set for one of the primary storage and execution units includes a variety of generating approaches. A first generating approach includes generating a unique key that is used to encrypt the slices of the corresponding chunkset of encrypted slices. A second generating approach includes generating multiple unique keys, where one of the multiple unique keys is used to encrypt one or more slices of the corresponding chunkset of encrypted slices. A third generating approach includes a series of generating steps. A first generating step of the third generating approach includes identifying the assigned partial task for the one of the primary storage and execution units. A second generating step of the third generating approach includes performing a deterministic mathematical function on bits of the assigned partial task to create a value. A third generating step of the third generating approach includes manipulating the value into the unique key set. A fourth generating approach includes ascertaining a public key of a public/private key pair for the one of the primary storage and execution units and utilizing the public key to generate the unique key set.

The method continues at step 428 where the processing module encrypts each of the chunksets of slices with a corresponding one of the unique key sets to produce chunksets of encrypted slices. The method continues at step 430 where the processing module sends the chunksets of encrypted slices and an indication of the assigned partial tasks to the set of primary storage and execution units for storage of the chunksets of encrypted slices and execution of the assigned partial tasks on the chunksets of encrypted slices. The indication of the assigned partial task for one of the set of primary storage and execution units includes at least one of an indication that the assigned partial task was used to generate the corresponding unique key set and an indication as to how the assigned partial task was used to generate the corresponding unique key set. The indication of the assigned partial task for one of the set of primary storage and execution units further includes sending a corresponding assigned partial task to the one of the set of primary storage and execution units. The method continues at step 432 where the processing module sends the chunksets of redundancy slices to the set of redundancy storage and execution units for storage therein.

Figure 42D:
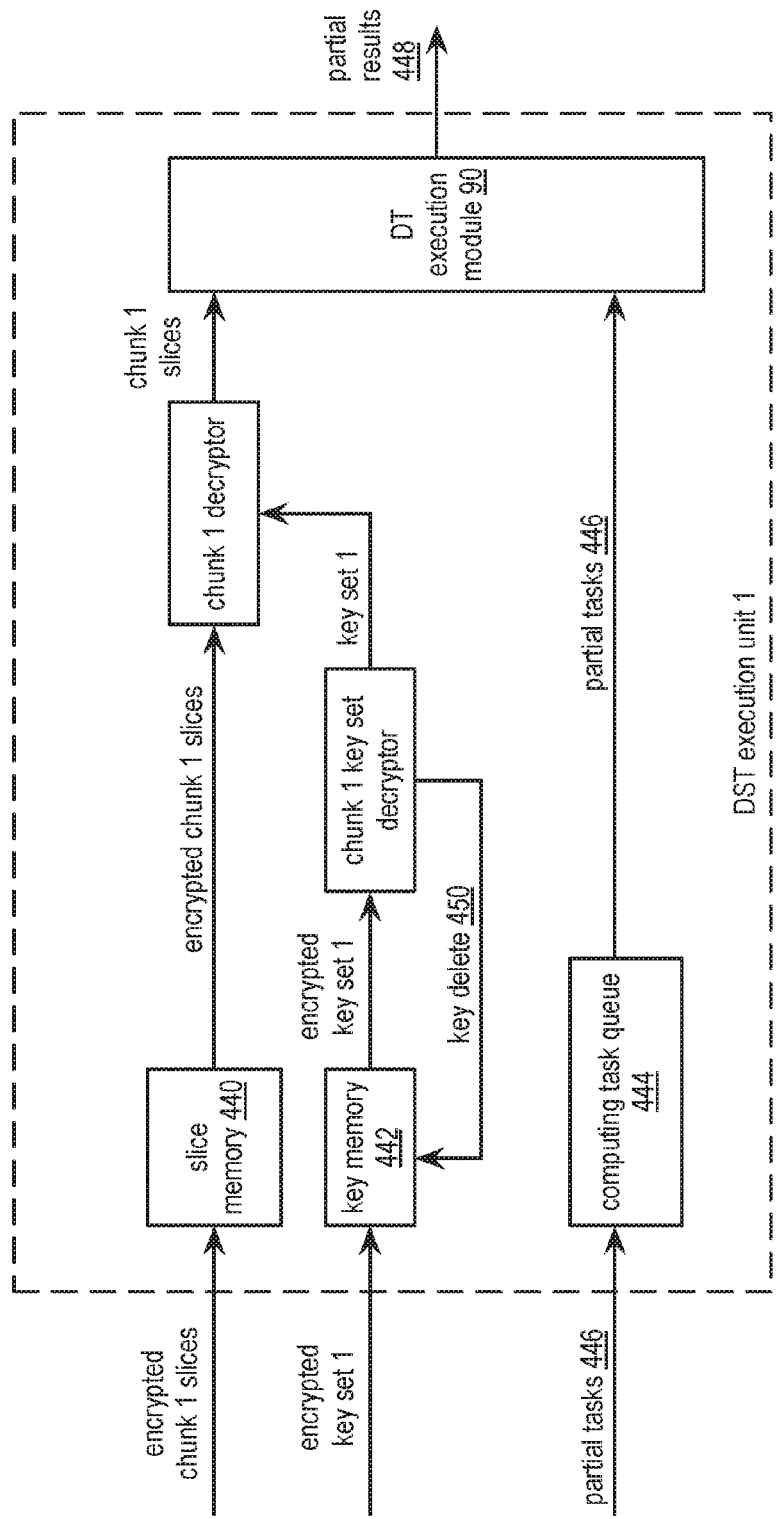
FIG. 42D is a schematic block diagram illustrating another embodiment of a distributed storage and task (DST) execution unit in accordance with the present invention.

FIG. 42D is a schematic block diagram illustrating another embodiment of a distributed storage and task (DST) execution unit 1, of a set of DST execution units, that includes a slice memory 440, a chunk 1 decryptor, a distributed task (DT) execution module 90, a key memory 442, a chunk 1 key set decryptor, and a computing task queue 444 (e.g., implemented within a memory device). The DST execution unit 1 functions to receive encrypted chunk 1 slices, decrypt the encrypted chunk 1 slices to produce chunk 1 slices, perform partial tasks 446 on the chunk 1 slices to produce partial results 448, and output the partial results 448. The slice memory four and 40 temporarily stores the encrypted chunk 1 slices. The key memory 442 temporarily stores a received encrypted key set 1. The computing task queue 444 temporarily stores received partial tasks 446 associated with the encrypted chunk 1 slices.

The chunk 1 key set decryptor decrypts the encrypted key set 1 to produce a key set 1. The chunk 1 key set decryptor decrypts the encrypted key set 1 as a whole when the encrypted key set 1 was produced as a whole. The chunk 1 key set decryptor decrypts a plurality of encryption keys when the encrypted key set 1 was produced as a plurality of encryption keys. The decrypting includes decrypting the encrypted key set 1 utilizing a private of a public/private key pair associated with the DST execution unit 1. Alternatively, the decrypting includes decrypting the encrypted key set 1 utilizing a public-key of another public/private key pair associated with a sending entity (e.g., a key generator).

The chunk 1 decryptor decrypts the encrypted chunk 1 slices utilizing at least one encryption key of the key set 1 to produce the chunk 1 slices. The decrypting includes decrypting each encrypted chunk 1 slice with a common encryption key of the key set 1 and decrypting each encrypted chunk 1 slice with a corresponding unique encryption key of the key set 1. The DT execution module 90 executes at least one partial task of the partial tasks 446 on one or more chunk 1 slices of the chunk 1 slices to produce the partial results 448. The chunk 1 key set decryptor may issue a key delete 450 message to the key memory 442 to delete the encrypted key set 1 when the encrypted chunk 1 slices have been successfully decrypted.

Figure 42E:
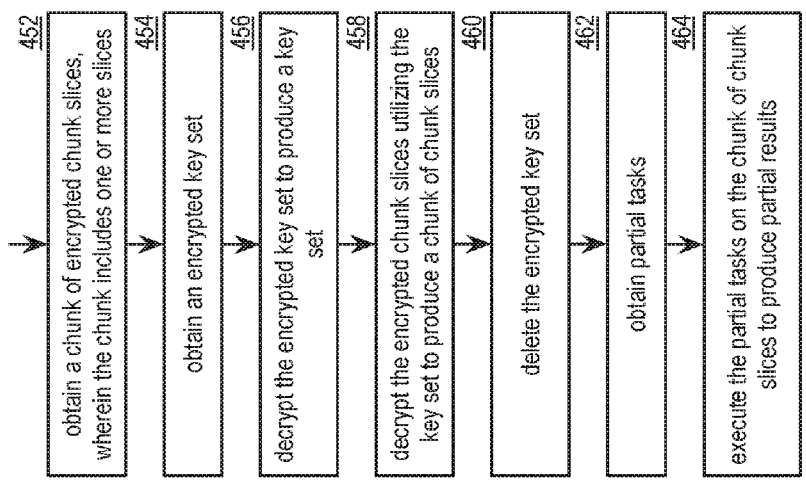
FIG. 42E is a flowchart illustrating an example of decrypting slices in accordance with the present invention.

FIG. 42E is a flowchart illustrating an example of decrypting slices. The method begins at step 452 where a processing module (e.g., of a distributed storage and task (DST) execution unit) obtains a chunk of encrypted chunk slices, where the chunk includes one or more slices. The obtaining includes at least one of receiving and retrieving. For example, the processing module receives the chunk in a distributed computing request that includes one or more of the chunk, an encrypted key set, and associate partial tasks. The method continues at step 454 where the processing module obtains the encrypted key set. The obtaining includes at least one of retrieving and receiving. The method continues at step 456 where the processing module decrypts the encrypted key set to produce a key set. The decrypting includes at least one of utilizing a public-key of a private/public key pair of a sending entity that provided the encrypted key set, utilizing a stored master key, and utilizing a private key of another private/public key pair associated with the processing module. The decrypting includes decrypting the encrypted key set as a whole and decrypting individual encryption keys of the encrypted key set to produce the key set.

The method continues at step 458 where the processing module decrypts the encrypted chunk slices utilizing the key set to produce a chunk of chunk slices. The decrypting includes decrypting all encrypted chunk slices with a common encryption key of the key set and decrypting each encrypted chunk slice with a unique encryption key of the key set. The method continues at step 460 where the processing module deletes at least one of the encrypted key set and the key set. The method continues at the step where the processing module obtains the partial tasks. The obtaining includes at least one of retrieving and receiving. The method continues at step 464 where the processing module executes the partial tasks on the chunk of chunk slices to produce partial results.

Figure 43A:
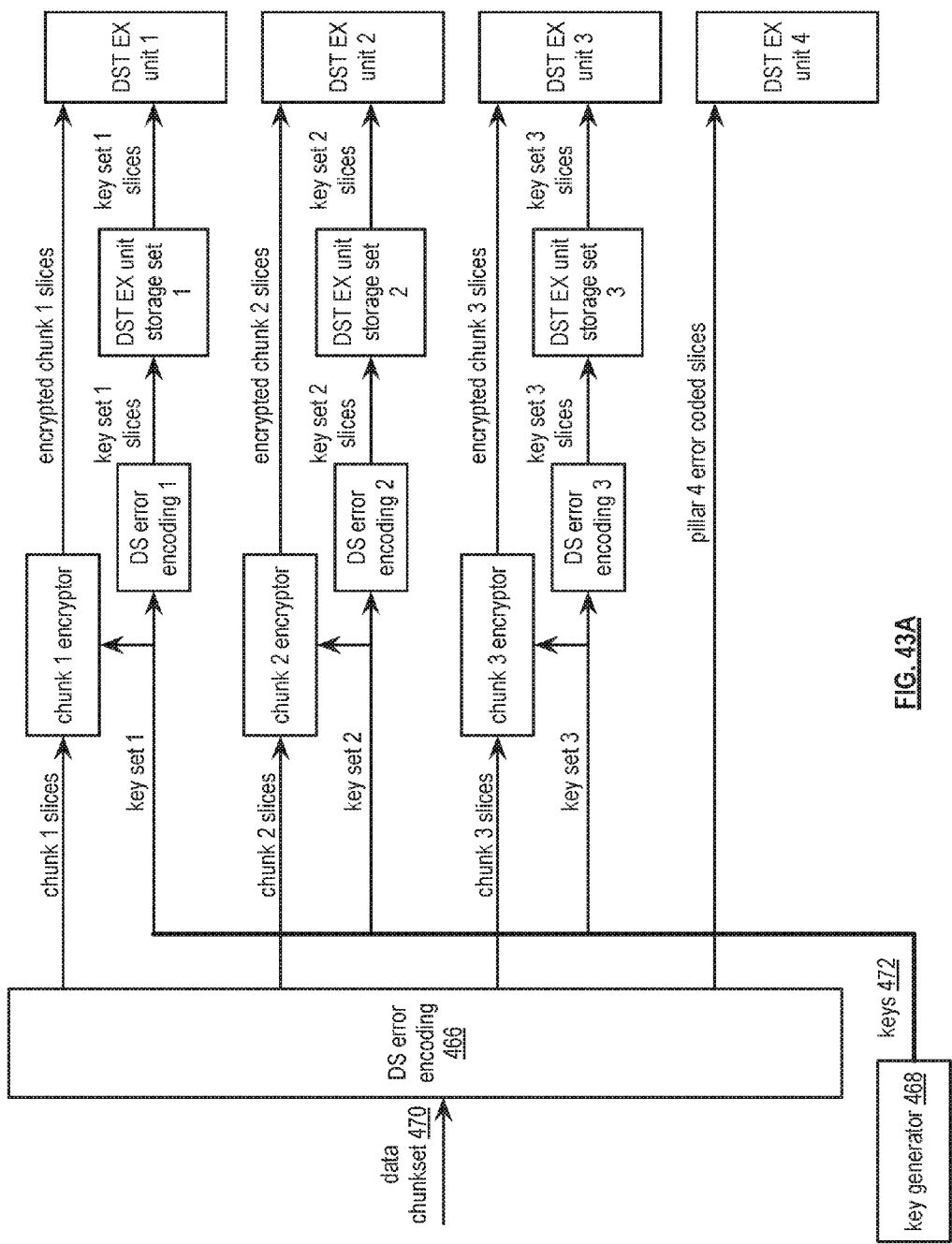
FIG. 43A is a schematic block diagram of another embodiment of a distributed computing system in accordance with the present invention.

FIG. 43A is a schematic block diagram of another embodiment of a distributed computing system that includes a distributed storage (DS) error encoding 466, a key generator 468, a decode threshold number of chunk encryptors (e.g., chunks 1-3), a decode threshold number of additional DS error encodings 1-3, a decode threshold number of dispersed storage and task (DST) execution unit storage sets 1-3, and a set of DST execution units 1-4. For example, the set of DST execution units includes four units when a pillar width is four.

The system functions to receive a data chunkset 470 and store the data chunkset 470 as a decode threshold number of encrypted chunk slices per chunk in a decode threshold number of DST execution units 1-3 of the set of DST execution units 1-4. The data chunkset 470 includes a decode threshold number of chunks. For each chunk of the decode threshold number of chunks, the DS error encoding 466 encodes the chunk to produce one or more chunk slices. For example, the DS error encoding 466 encodes chunk 1 to produce one or more chunk 1 slices. For each decode threshold number of chunk slices, the DS error encoding 466 encodes the decode threshold number of chunk slices to produce at least one corresponding error coded slice in accordance with a dispersed storage error coding function. For example, the DS error encoding 466 encodes a decode threshold number of chunk slices that includes a slice two of the chunk 1 slices, a slice two of the chunk 2 slices, and a slice two of the chunk 3 slices to produce an error coded slice two (e.g., of pillar 4). The DS error encoding 466 stores the at least one corresponding pillar 4 error coded slice in a corresponding at least one DST execution unit 4 associated with storing error coded slices of the set of DST execution units 1-4.

The key generator 468 generates keys 472 for encrypting chunk slices to produce encrypted chunk slices. The keys 472 includes a decode threshold number of key sets 1-3 utilized to encrypt the chunk slices. For example, the chunk 1 encryptor utilizes key set 1 to encrypt chunk 1 slices to produce encrypted chunk 1 slices etc. A key set includes one or more encryption keys. For example, the key set includes one encryption key when a common encryption key is desired for the one more chunk slices. As another example, the key set includes, for each chunk slice of the one or more chunk slices, a corresponding encryption key when a unique encryption key is desired for each of the one or more chunk slices. The generating of an encryption key of the one or more encryption keys may be based on one or more of a random number, a slice name, a lookup, receiving the key, and performing a deterministic function operation on a slice name.

The other DS error encodings 1-3 encode each key set of the decode threshold number of key sets 1-3 to produce a decode threshold number of key set 1-3 slices utilizing a dispersed storage error coding function. For example, DS error encoding 1 encodes key set 1 to produce at least one set of key set 1 slices, etc. Each DS error encoding of the other DS error encodings 1-3 facilitates storage of associated key set slices in a corresponding DST execution unit storage set of the decode threshold number of DST execution unit storage sets 1-3. For example, DS error encoding 2 facilitates storage of key set 2 slices in DST execution unit storage set 2. Each DST execution unit storage set of the decode threshold number of DST execution unit storage sets 1-3 outputs associated key set slices to a corresponding DST execution unit of the decode threshold number of DST execution units 1-3. For example, DST execution unit storage set 3 outputs at least one set of key set 3 slices to DST execution unit 3 of the decode threshold number of DST execution units 1-3.

The decode threshold number of chunk encryptors 1-3 encrypt corresponding chunk slices 1-3 utilizing associated decode threshold number of key sets 1-3 to produce encrypted chunk slices 1-3. The decode threshold number of chunk encryptors 1-3 outputs the encrypted chunk slices 1-3 to the corresponding decode threshold number of DST execution units 1-3 for storage therein. In addition, at least one of the DS error encoding 466, the key generator 468, and the decode threshold number of chunk encryptors outputs slice names associated with the encrypted chunk slices 1-3 and partial tasks to the decode threshold number of DST execution units 1-3.

Figure 43B:
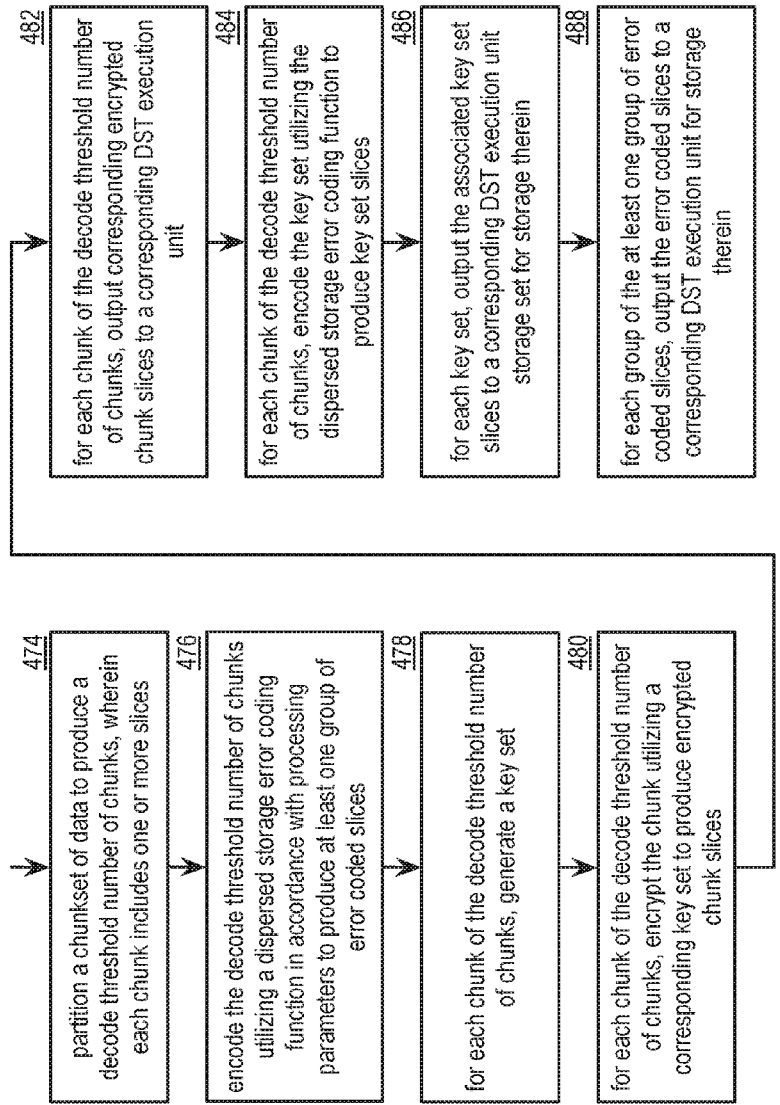
FIG. 43B is a flowchart illustrating another example of encrypting slices in accordance with the present invention.

FIG. 43B is a flowchart illustrating another example of encrypting slices. The method begins at step 474 where a processing module (e.g., of a distributed storage and task (DST) client module) partitions a chunkset of data to produce a decode threshold number of chunks, where each chunk includes one or more slices. The method continues at step 476 where the processing module encodes the decode threshold number of chunks utilizing a dispersed storage error coding function in accordance with processing parameters to produce at least one group of error coded slices. The method continues at step 478 where the processing module generates a key set for each chunk of the decode threshold number of chunks. The method continues at step 480 where the processing module encrypts each chunk of the decode threshold number of chunks utilizing a corresponding key set to produce encrypted chunk slices.

Figure 43C:
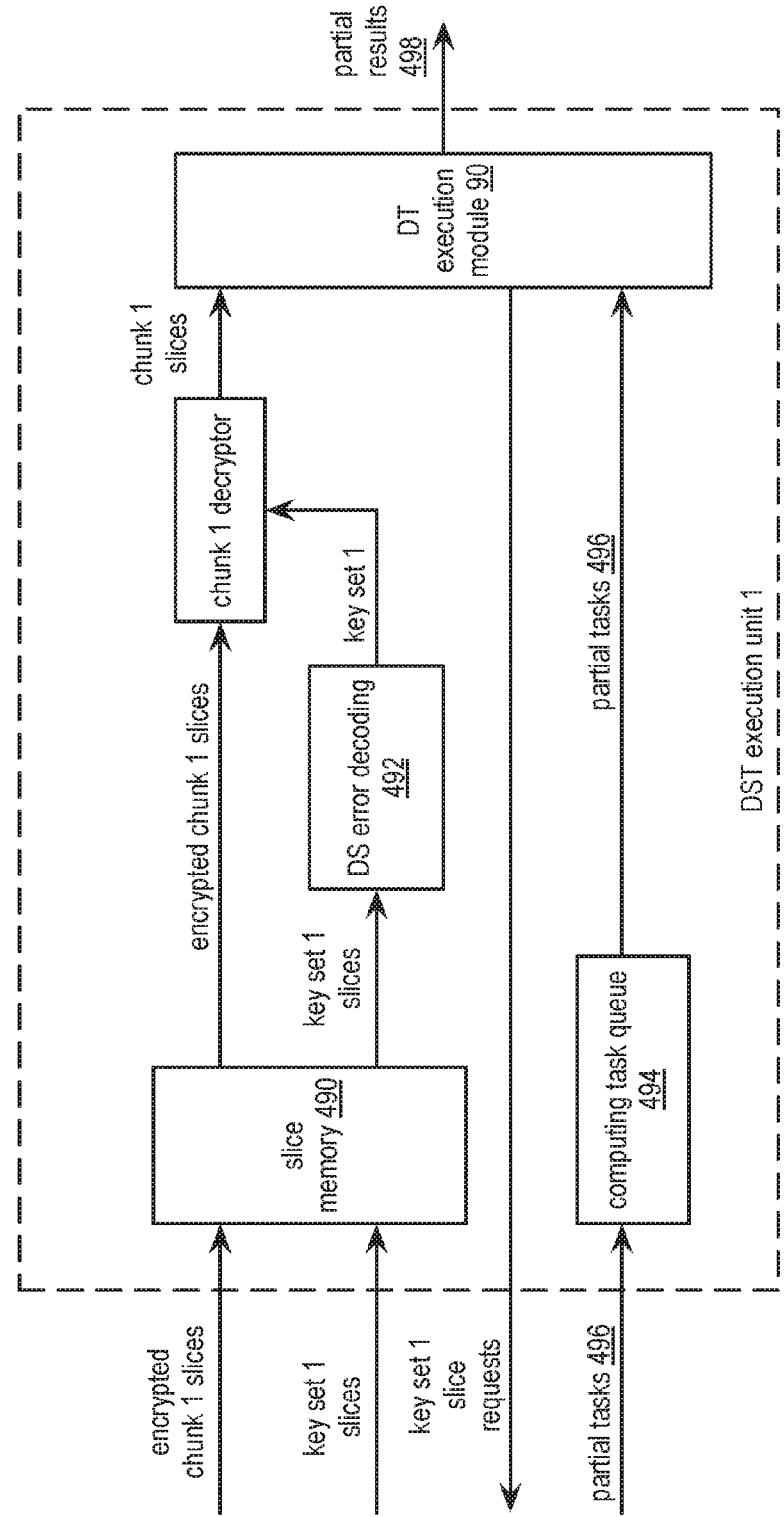
FIG. 43C is a schematic block diagram illustrating another embodiment of a distributed storage and task (DST) execution unit in accordance with the present invention.

For each chunk of the decode threshold number of chunks, the method continues at step 482 where the processing module outputs corresponding encrypted chunk slices to a corresponding DST execution unit. The outputting may further include outputting corresponding chunk slice names and associated partial tasks. For each chunk of the decode threshold number of chunks, the method continues at step 484 where the processing module encodes the key set utilizing the dispersed storage error coding function to produce at least one set of key set slices. For each key set, the method continues at step 486 where the processing module outputs the associated key set slices to a corresponding DST execution unit storage set for storage therein. For each group of the at least one group of error coded slices, the method continues at step 488 where the processing module outputs the error coded slices to a corresponding DST execution unit associated with the storage of error coded slices for storage therein FIG. 43C is a schematic block diagram illustrating another embodiment of a distributed storage and task (DST) execution unit 1, of a set of DST execution units 1-n, that includes a slice memory 490, a chunk 1 decryptor, a distributed task (DT) execution module 90, a distributed storage (DS) error decoding 492, and a computing task queue 494 (e.g., implemented using a memory device). The DST execution unit 1 functions to receive encrypted chunk 1 slices, decrypt the encrypted chunk 1 slices to produce chunk 1 slices, perform partial tasks 496 on the chunk 1 slices to produce partial results 498, and output the partial results 498. The slice memory 490 temporarily stores the encrypted chunk 1 slices and at least one set of key set 1 slices associated with the encrypted chunk 1 slices. The computing task queue 494 temporarily stores received partial tasks 496 associated with the encrypted chunk 1 slices.

The DT execution module 90 interprets partial tasks 496 to identify required chunk 1 slices and associated required key set 1 slices (e.g., matching slice names). The DT execution module 90 generates key set 1 slice requests that includes identity of the associated required key set 1 slices and outputs the key set 1 slice requests (e.g., to a corresponding DST execution unit storage set). In response, the key set 1 slices are received and stored in the slice memory 490. The DS error decoding 492 decodes the at least one set of key set 1 slices utilizing a dispersed storage error coding function to produce a key set 1. The chunk 1 decryptor decrypts the encrypted chunk 1 slices utilizing at least one encryption key of the key set 1 to produce the chunk 1 slices. The decrypting includes decrypting each encrypted chunk 1 slice with a common encryption key of the key set 1 and decrypting each encrypted chunk 1 slice with a corresponding unique encryption key of the key set 1. The DT execution module 90 executes at least one partial task of the partial tasks 496 on one or more chunk 1 slices of the chunk 1 slices to produce the partial results 498.

Figure 43D:
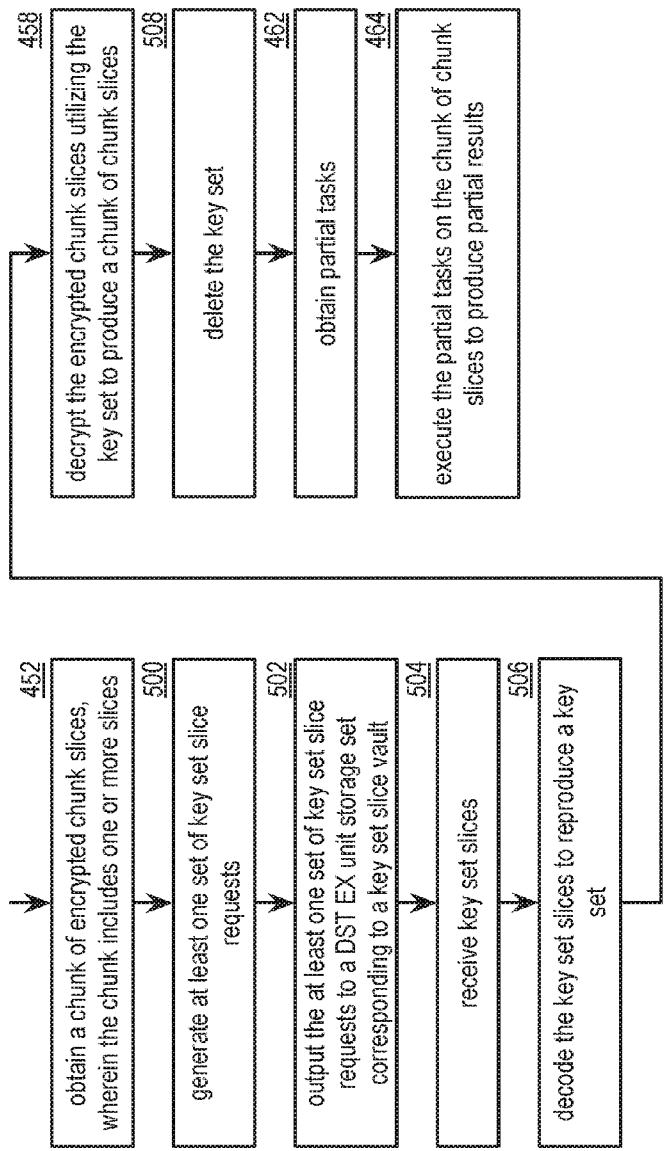
FIG. 43D is a flowchart illustrating another example of decrypting slices in accordance with the present invention.

FIG. 43D is a flowchart illustrating another example of decrypting slices, that includes similar steps to a FIG. 42E. The method begins with step 452 of FIG. 42E where a processing module (e.g., of a distributed storage and task (DST) execution unit) obtains a chunk of encrypted chunk slices, where the chunk includes one or more slices. The method continues at step 500 where the processing module generates at least one set of key set slice requests. The generating includes at least one of interpreting associated partial task requests to produce any key set identifier for inclusion in the at least one set of key set slice requests. The method continues at step 502 where the processing module outputs the at least one set of key set slice requests to a DST execution unit storage set corresponding to a key set slice vault. The outputting includes identifying the DST execution unit storage set based on at least one of a lookup, receiving a DST execution unit storage set identifier, and receiving internet protocol addresses of a set of DST execution units of the DST execution unit storage set.

The method continues at step 504 where the processing module receives key set slices (e.g., from the DST execution unit storage set). The method continues at step 506 where the processing module decodes the key set slices utilizing a dispersed storage error coding function to reproduce a key set. The method continues with step 458 of FIG. 42E where the processing module decrypts the encrypted chunk slices utilizing the key set to produce a chunk of chunk slices. The method continues at step 508 where the processing module facilitates deletion of the key set. The method continues with step 462 and 464 of FIG. 42E where the processing module obtains partial tasks and executes the partial tasks on the chunk of chunk slices to produce partial results.

Figure 44A:
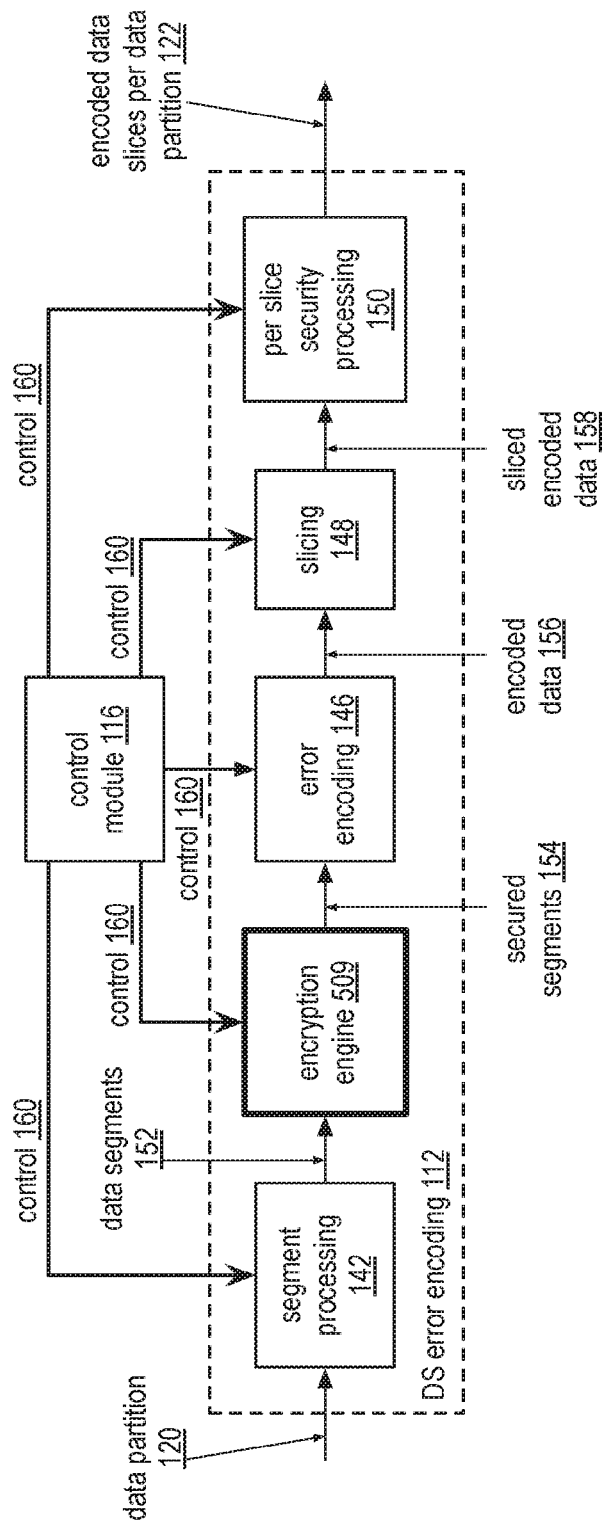
FIG. 44A is a schematic block diagram of another embodiment of a dispersed storage error encoding module in accordance with the present invention.

FIG. 44A is a schematic block diagram of another embodiment of a dispersed storage (DS) error module 112 of an outbound distributed storage and task (DST) processing section. The DS error encoding module 112 includes a segment processing module 142, an encryption engine 509, an error encoding module 146, a slicing module 148, and a per slice security processing module 150. Each of these modules is coupled to a control module 116 to receive control information 160 therefrom. Alternatively, the control module 116 may be omitted and each module stores its own parameters.

In an example of operation, the segment processing module 142 receives a data partition 120 from a data partitioning module and receives segmenting information as the control information 160 from the control module 116.

The segment processing module 142 segments the data partition 120 into data segments 152 based on the segmenting information. For example, the segmenting information indicates how many rows to segment the data based on a decode threshold of an error encoding scheme, indicates how many columns to segment the data into based on a number and size of data blocks within the data partition 120, and/or indicates how many columns to include in a data segment 152

The encryption engine 509 secures the data segments 152 to produce secured segments 154 based on segment security information and partitioning information received as control information 160 from the control module 116. The segment security information includes one or more of data compression, encryption, watermarking, integrity check (e.g., cyclic redundancy check (CRC), etc.), and/or any other type of digital security. The partitioning information includes one or more of data sub-segment partitioning instructions, a master key, a sub-key generation approach indicator, a deterministic function type indicator, a master key generation instruction indicator, a decode threshold number, and one or more shared secrets corresponding to one or more distributed storage and task execution modules. For example, the encryption module 509 partitions a data segment 152 into a decode threshold number of data sub-segments. The encryption module then generates a unique key for encrypting the data sub-segments and encrypts each of the data sub-segments using a corresponding unique key to produce a decode threshold number of encrypted data sub-segments. The encryption module then combines the decode threshold number of encrypted data sub-segments to produce encrypted data as a secured segment 154. When the encryption engine 509 is not enabled, it passes the data segments 152 to the error encoding module 146 or is bypassed such that the data segments 152 are provided to the error encoding module 146. The encryption module 509 is discussed in greater decode with reference to FIG. 44B.

The error encoding module 146 encodes the secure data segments 154 in accordance with error correction encoding parameters of control information 160 to produce encoded data 156. The error correction encoding parameters (e.g., also referred to as dispersed storage error coding parameters) include identifying an error correction encoding scheme (e.g., forward error correction algorithm, a Reed-Salomon based algorithm, an online coding algorithm, an information dispersal algorithm, etc.), a pillar width, a decode threshold, a read threshold, a write threshold, etc. The error encoding module 146 may receive at least some of the error correction encoding parameters from the encryption engine 509. For example, the error correction encoding parameters identify a specific error correction encoding scheme, specifies a pillar width of five, and specifies a decode threshold of three when the encryption engine 509 produces three data sub-segments from the data segment 152.

The slicing module 148 slices the encoded data segment 156 in accordance with the pillar width of the error correction encoding parameters of the control information 160 to produce sliced encoded data 158. As such, for data segments 156 of a data partition 120, the slicing module 140 outputs a plurality of sets of encoded data slices 158. For example, if the pillar width is five, the slicing module 148 slices the encoded data segments 156 into sets of five encoded data slices.

The per slice security processing module 150, when enabled by the control module 116, secures each encoded data slice 158 based on slice security information of the control information 160 to produce encoded data slices per data partition 122. The slice security information includes data compression, encryption, watermarking, integrity check (e.g., CRC, etc.), and/or any other type of digital security. When the per slice security processing module 150 is not enabled, it passes the encoded data slices 158 or is bypassed such that the slice encoded data 158 are outputted as the encoded data slices per data partition.

Figure 44B:
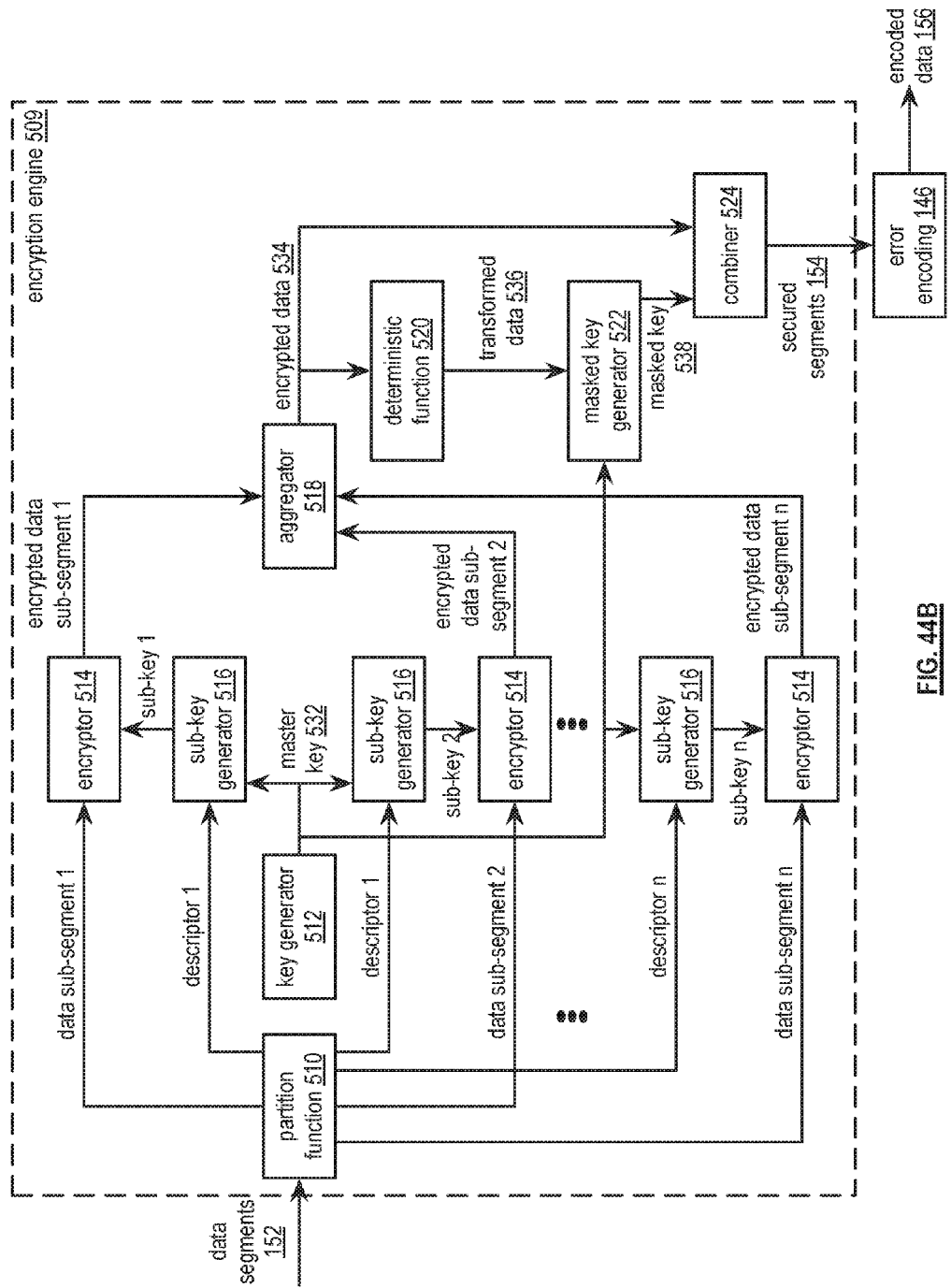
FIG. 44B is a schematic block diagram of an embodiment of an encryption engine in accordance with the present invention.

FIG. 44B is a schematic block diagram of an embodiment of an encryption engine 509 that includes a partition function 510, a key generator 512, n number of encryptors 514, n number of sub-key generators 516, an aggregator 518, a deterministic function 520, a masked key generator 522, and a combiner 524. The encryption engine 509 receives data segments 152, processes the data segments 152 to produce secured segments 154, and outputs the secured segments 154 to an error encoding module 146, where the error encoding module 146 dispersed storage error encodes each of the secured segments 154 to produce a set of encoded data slices 156 for storage in at least one of a dispersed storage network system and a distributed storage and task network module.

The encryption engine 509 functions to encrypt the data segments 152 to produce secured segments 154 such that the secured segments 154 may be encoded using the dispersed storage error coding function to produce sets of encoded data slices 156 for storage and further processing (e.g., distributed computing of one or more partial tasks on at least some of the encoded data slices 156 in a dispersed storage and task network (DSTN) module). The partition function 510 partitions each data segment 152 into n data sub-segments 1-$n$ in accordance with a data partitioning approach. The data partitioning approach includes at least one of partitioning the data segment 152 into a decode threshold number of data sub-segments and partitioning the data segment 152 such that at least one data sub-segment includes a data record associated with a distributed computing partial task. The partition function 510 is further operable to generate n descriptors 1-$n$ (e.g., data sub-segment identifier (ID)) for the n data sub-segments 1-$n$. Each descriptor of descriptors 1-$n$ may include one or more of a source name, a data segment ID, a data type indicator, a data size indicator, a data content indicator, a data source owner identifier, and a slice name.

The key generator 512 generates a master key 532 based on at least one of a random number, performing a deterministic function on a DSTN address, performing a deterministic function on a timestamp, a lookup, and receiving the master key 532. For example, the key generator generates a random key to produce the master key 532. Each sub-key generator 516 of the n sub-key generators 516 generates a sub-key of sub-keys 1-$n$ based on the master key 532 and associated descriptor of descriptors 1-$n$. For example, a first sub-key generator 516 utilizes the master key 532 and descriptor 1 to generate a sub-key 1. The generating includes performing a deterministic function on one or more of the master key 532 and the associated descriptor to generate the sub-key. The deterministic function including at least one of a hashing function (e.g., message digest algorithm 5 (MD5)), a mask generating function (MGF), a hash-based message authentication code (HMAC), and a sponge function. The generating may further include truncating a result of the performing of the deterministic function to provide a desired key length for the sub-key.

Each encryptor 514 of the n encryptors 514 encrypts an associated data sub-segment of the n data-segments 1-$n$ utilizing a corresponding sub-key of the n sub-keys 1-$n$ to produce an associated encrypted data sub-segment of n encrypted data sub-segments 1-*n*. For example, a second encryptor 514 encrypts data sub-segment 2 utilizing a sub-key 2 to produce encrypted data sub-segment 2. The aggregator 518 aggregates the n encrypted data sub-segments 1-*n* to produce encrypted data 534. For example, the aggregator 518 sequentially aggregates encrypted data sub-segment 1 through encrypted data sub-segment n to produce the encrypted data 534. The deterministic function 520 performs a deterministic function (e.g., same or different as utilized by the sub-key generators 516) on the encrypted data 534 to produce transformed data 536. The performing of the deterministic function may further include truncating an interim result of the deterministic function to provide a desired bit length of the transformed data 536 to substantially match a length of the master key 532.

The masked key generator 522 masks the master key 532 utilizing the transformed data 536 to produce a masked key 538. The masking may include at least one of a mathematical function and a logical function. For example, the masked key generator 522 performs an exclusive OR logical function on the master key 532 and the transformed data 536 to produce the masked key 538. The combiner 524 combines the encrypted data 534 and the masked key 538 to produce the secured segment 154. The combining includes at least one of appending the masked key 538 to the encrypted data 534, appending the encrypted data 534 to the masked key 538, and interleaving the masked key 538 and the encrypted data 534 to produce the secured segment 154.

The encryption engine 509 outputs the secured segments 154 to the error encoding module 146. The error encoding module 146 encodes the each secured segment 154 utilizing the dispersed storage error coding function to produce the encoded data slices 156. Each set of encoded data slices 156 may include a decode threshold number of slices that are substantially the same as the n encrypted data partitions 1-*n* (e.g., combined with the masked key 538) when the error encoding module 146 utilizes an encoding matrix that includes a unity matrix as a first decode threshold number of rows and the decode threshold number is substantially the same as the value n. The set of encoded data slices 156 may further include a pillar width minus the decode threshold number of error coded slices corresponding to remaining rows of the encoding matrix (e.g., redundancy encoded data slices to facilitate data segment recovery).

Figure 44C:
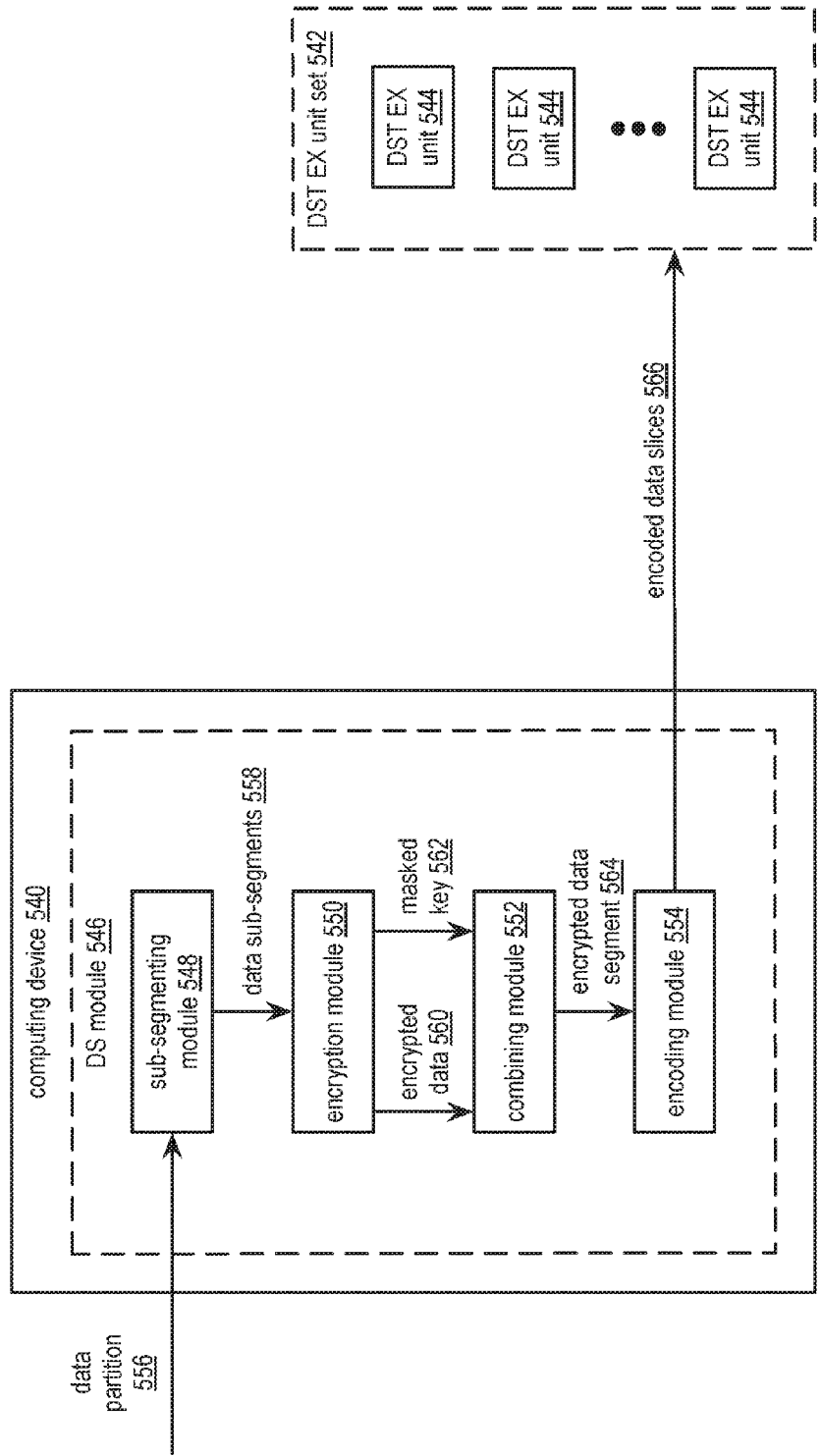
FIG. 44C is a schematic block diagram of another embodiment of a distributed computing system in accordance with the present invention.

FIG. 44C is a schematic block diagram of another embodiment of a distributed computing system that includes a computing device 540 and a distributed storage and task (DST) execution unit set 542. The DST execution unit set 542 includes a set of DST execution units 544. Alternatively, one or more of the DST execution units 544 may be implemented utilizing one or more of a server, a storage unit, a user device, a DST processing unit, a dispersed storage (DS) processing unit, and a DS unit. The computing device 540 may be implemented utilizing at least one of a DST processing unit, a DS processing unit, a user device, a DST execution unit, and a DS unit. For example, the computing device 540 is implemented as the DST processing unit. The computing device 540 includes a DS module 546. The DS module 546 includes a sub-segmenting module 548, an encryption module 550, a combining module 552, and an encoding module 554.

The system functions to store a data partition 556 in the DST execution unit set 542. The storing includes four primary functions where a first primary function includes sub-segmenting the data partition 556 to produce a set of data sub-segments 558, a second primary function includes encrypting the set of data sub-segments 558 to produce encrypted data 560 and a masked key 562, a third primary function includes combining the encrypted data 560 and the masked key 562 to produce an encrypted data segment 564, and a fourth primary function includes encoding the encrypted data segment 564 to produce a set of encoded data slices 566 for storage in the DST execution unit set 542.

The first primary function to sub-segment the data partition 556 to produce the set of data sub-segments 558 includes a series of sub-segmenting steps. In a first sub-segmenting step, the sub-segmenting module 548 segments the data partition 556 into a plurality of data segments. For a data segment of the plurality of data segments, in a second sub-segmenting step, the sub-segmenting module 548 divides the data segment into the set of data sub-segments 558. The sub-segmenting module 548 may divide the data segment into the set of data sub-segments 558 based a decode threshold number of a dispersed storage error encoding function. For example, the sub-segmenting module 548 divides the data segment into a decode threshold number of data sub-segments 558.

The second primary function to encrypt the set of data sub-segments 558 to produce the encrypted data 560 and the masked key 562 includes a series of encrypting steps. In a first encrypting step, the encryption module 550, for the data segment of the plurality data segments, generates a set of sub keys for the set of data sub-segments 558 based on a master key. The encryption module 550 may obtain the master key based on at least one of a random number, performing a deterministic function on a dispersed storage network address, performing a deterministic function on a timestamp, performing a lookup, and receiving the master key. For example, the encryption module 550 generates a random key as the master key. Alternatively, the encryption module 550 obtains a first master key for a first data segment of the plurality of data segments and obtains a second master key for a second data segment of the plurality of data segments.

The encryption module 550 generates the set of sub keys by one of a variety of generating approaches. A first generating approach includes a series of generating steps. In a first generating step, the encryption module 550 generates a first sub key of the set of sub keys by performing a deterministic function on the master key and a descriptor of a first data sub-segment of the set of data sub-segments 558. The descriptor of the first data sub-segment includes at least one of an identifier of the first sub-segment, a data type of the first data sub-segment, a data content indicator of the first data sub-segment, and a data size of the first data sub-segment. The deterministic function includes at least one of a logical function, a truncation function, a hashing function, a hash-based message authentication code function, a mask generating function, and a sponge function. For example, the encryption module performs an exclusive OR function on the master key and the descriptor of the first data sub-segment to produce the first sub key. In a second generating step, the encryption module 550 generates a second sub key of the set of sub keys by performing the deterministic function on the master key and a descriptor of a second data sub-segment of the set of data sub-segments.

A second generating approach includes a series of alternate generating steps. In a first alternate generating step, the encryption module 550 generates the first sub key of the set of sub keys by performing a function on the master key, the descriptor of the first data sub-segment of the set of data sub-segments 558, and a first shared secret. The function includes at least one of a mathematical function, a logical function, and the deterministic function. For example, the encryption module 550 performs the exclusive OR logical function on the master key, the descriptor of the first data sub-segment and the first shared secret to produce the first sub key. The encryption module 550 may obtain the first shared secret by performing a shared secret generation algorithm with an associated DST execution unit 544 of the DST execution unit set 542. In a second alternate generating step, the encryption module 550 generates the second sub key of the set of sub keys by performing the function on the master key, the descriptor of the second data sub-segment of the set of data sub-segments 558 is, and a second shared secret.

In a second encrypting step of the series of encrypting steps, the encryption module 550 encrypts the set of data sub-segments 558 using the set of sub keys to produce a set of encrypted data sub-segments. In a third encrypting step, the encryption module 550 aggregates the set of encrypted data sub-segments into the encrypted data 560. For example, the encryption module 550 arranges the set of encrypted data sub-segments in order of the set of data sub-segments 558 to produce the encrypted data 560. In a fourth encrypting step, the encryption module 550 generates the masked key 562 based on the encrypted data 560 and the master key. The encryption module 550 generates the masked key by performing another deterministic function on the encrypted data 560 to produce transformed data and performing a masking function on the master key using the transformed data and to produce the masked key 562. The masking function includes at least one of a logical function, a mathematical function, and the deterministic function. For example, the encryption module 550 performs the mask generating function on the encrypted data 560 to produce the transformed data to include a number of bits substantially the same as the master key and performs the exclusive OR function on the master key and the transformed data to produce the masked key 562.

The third primary function to combine the encrypted data 560 and the masked key 562 to produce the encrypted data segment 564 includes, for the data segment of the plurality data segments, the combining module 552 combining the encrypted data 560 and the masked key 562 to produce the encrypted data segment 564. The combining module 552 combines the encrypted data 560 and the masked key 562 by at least one of a variety of combining approaches. In a first combining approach, the combining module 552 interleaves the masked key 562 with the encrypted data 560 to produce the encrypted data segment 564. In a second combining approach, the combining module 552 appends the masked key 562 to the encrypted data 560 to produce the encrypted data segment 564. In a third combining approach, the combining module 552 distributes, in accordance with a pattern, portions of the masked key 562 within the encrypted data 560 to produce the encrypted data segment 564. The distributing includes using some known pattern of the encrypted data. For example, the combining module 552 distributes one byte of the masked key 562 for every 100 Kbytes of the encrypted data 560.

The fourth primary function to encode the encrypted data segment 564 to produce the set of encoded data slices 566 for storage in the DST execution unit 542 includes a series of encoding steps. In a first encoding step, the encoding module 554 encodes the encrypted data segment 564 in accordance with the dispersed storage error encoding function to produce the set of encode data slices 566. In a second encoding step, the encoding module 554 sends the set of encoded data slices 566 to the DST execution unit set 542 where the DST execution unit set 542 stores the set of encoded data slices 566 and may further perform one or more partial tasks on at least some of the encoded data slices corresponding to the encrypted data 560 to produce partial results.

For another data segment of the plurality of data segments, the sub-segmenting module 548 divides the other data segment into a second set of data sub-segments. The encryption module 550 generates a second set of sub keys for the second set of data sub-segments based on the master key and encrypts the second set of data sub-segments using the second set of sub keys to produce a second set of encrypted data sub-segments. The encryption module 550 aggregates the second set of encrypted data sub-segments into second encrypted data and generates a second masked key based on the second encrypted data and the master key. The combining module 552 combines the second encrypted data and the second masked key to produce a second encrypted data segment for encoding and storing in the DST execution unit set 542. The encryption module 552 may generate a first slice group from a first encrypted data sub-segment of the encrypted data segment and a first encrypted data sub-segment of the second encrypted data segment. The encryption module 552 may further generate a second slice group from a second encrypted data sub-segment of the encrypted data segment and a second encrypted data sub-segment of the second encrypted data segment.

Figure 44D:
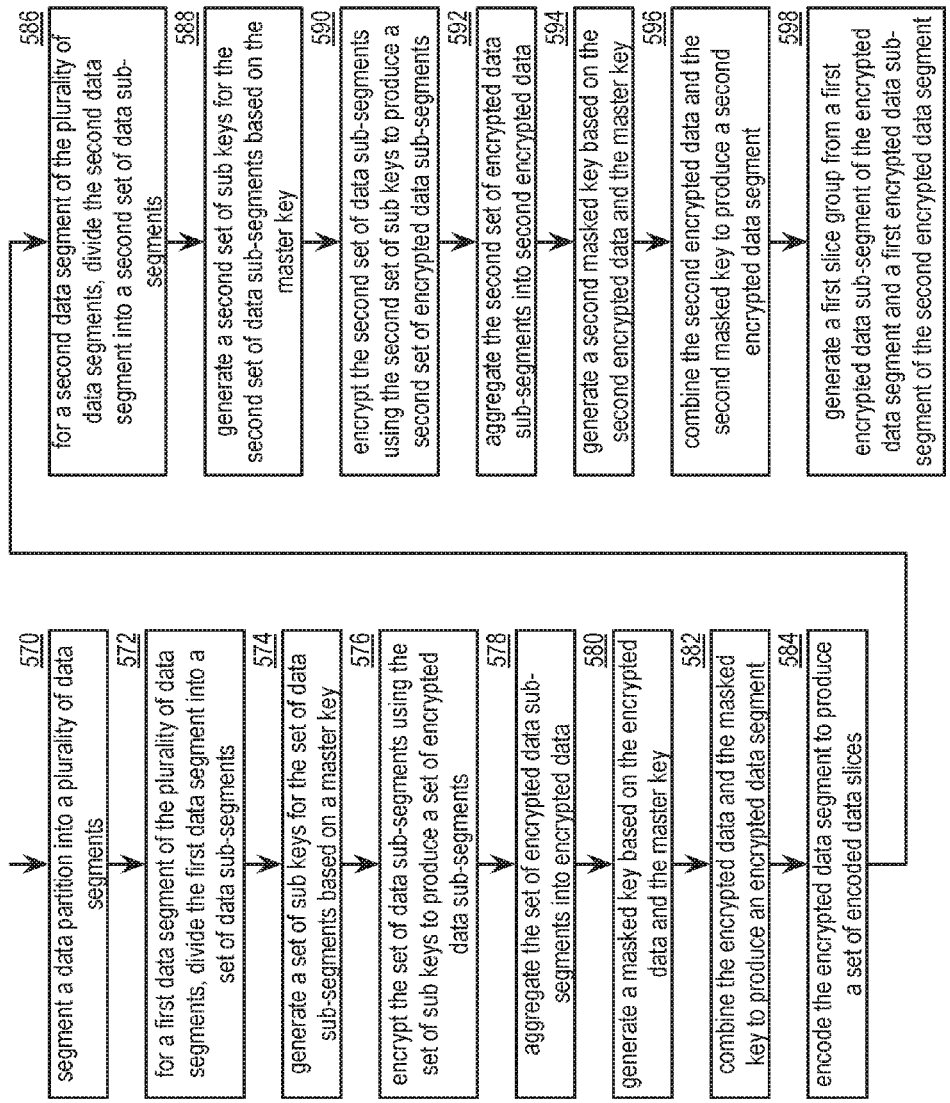
FIG. 44D is a flowchart illustrating an example of encoding slices in accordance with the present invention.

FIG. 44D is a flowchart illustrating an example of encoding slices. The method begins at step 570 where a processing module (e.g., a dispersed storage (DS) processing module) segments a data partition into a plurality of data segments. For a first data segment of the plurality data segments, the method continues at step 572 where the processing module divides data segment into a set of data sub-segments. The dividing the data segment into the set of data sub-segments may be based a decode threshold of a dispersed storage error encoding function. For example, the processing module divides the data segment into a decode threshold number of data sub-segments.

The method continues at step 574 where the processing module generates a set of sub keys for the set of data sub-segments based on a master key. The processing module may obtain the master key as at least one of a first master key for a first data segment of the plurality of data segments and a common master key for the first data segment and subsequent data segments of the plurality of data segments. The generating the set of sub keys includes a variety of key generating approaches. A first key generating approach includes a series of key generating steps. In a first key generating step, the processing module generates a first sub key of the set of sub keys by performing a deterministic function on the master key and a descriptor of a first data sub-segment of the set of data sub-segments. The descriptor of the first data sub-segment includes at least one of an identifier of the first sub-segment, a data type of the first data sub-segment, a data content indicator of the first data sub-segment, and a data size of the first data sub-segment. In a second key generating step, the processing module generates a second sub key of the set of sub keys by performing the deterministic function on the master key and a descriptor of a second data sub-segment of the set of data sub-segments. A second key generating approach includes a series of alternate key generating steps. In a first alternate key generating step, the processing module generates the first sub key of the set of sub keys by performing a function on the master key, a descriptor of a first data sub-segment of the set of data sub-segments, and a first shared secret. In a second alternate key generating step, the processing module generates the second sub key of the set of sub keys by performing the function on the master key, a descriptor of a second data sub-segment of the set of data sub-segments, and a second shared secret.

The method continues at step 576 where the processing module encrypts the set of data sub-segments using the set of sub keys to produce a set of encrypted data sub-segments. The method continues at step 578 where the processing module aggregates the set of encrypted data sub-segments into encrypted data. The method continues at step 580 where the processing module generates a masked key based on the encrypted data and the master key. The generating of the masked key includes performing another deterministic function on the encrypted data to produce transformed data and performing a masking function on the master key using the transformed data and to produce the masked key.

The method continues at step 582 where the processing module combines the encrypted data and the masked key to produce an encrypted data segment. The combining of the encrypted data and the masked key includes at least one of a variety of combining approaches. In a first combining approach, the processing module interleaves the masked key with the encrypted data to produce the encrypted data segment. In a second combining approach, the processing module appends the masked key to the encrypted data to produce the encrypted data segment. In a third combining approach, the processing module distributes, in accordance with a pattern, portions of the masked key within the encrypted data to produce the encrypted data segment. The distributing includes using some known pattern of the encrypted data (e.g., insert one byte of the masked key for every 100 Kbytes of encrypted data). The method continues at step 584 where the processing module encodes the encrypted data segment in accordance with the dispersed storage error encoding function to produce a set of encode data slices for storage in a dispersed storage network.

For a second (e.g., another) data segment of the plurality of data segments, the method continues at step 586 where the processing module divides the second data segment into a second set of data sub-segments. The method continues at step 588 where the processing module generates a second set of sub keys for the second set of data sub-segments based on the master key. Alternatively, the processing module obtains a second master key for the second data segment of the plurality of data segments. The method continues at step 590 where the processing module encrypts the second set of data sub-segments using the second set of sub keys to produce a second set of encrypted data sub-segments. The method continues at step 592 where the processing module aggregates the second set of encrypted data sub-segments into second encrypted data. The method continues at step 594 where the processing module generates a second masked key based on the second encrypted data and the master key. The method continues at step 596 where the processing module combines the second encrypted data and the second masked key to produce a second encrypted data segment. The method continues at step 598 where the processing module generates a first slice group from a first encrypted data sub-segment of the encrypted data segment and a first encrypted data sub-segment of the second encrypted data segment and generates a second slice group from a second encrypted data sub-segment of the encrypted data segment and a second encrypted data sub-segment of the second encrypted data segment.

Figure 45A:
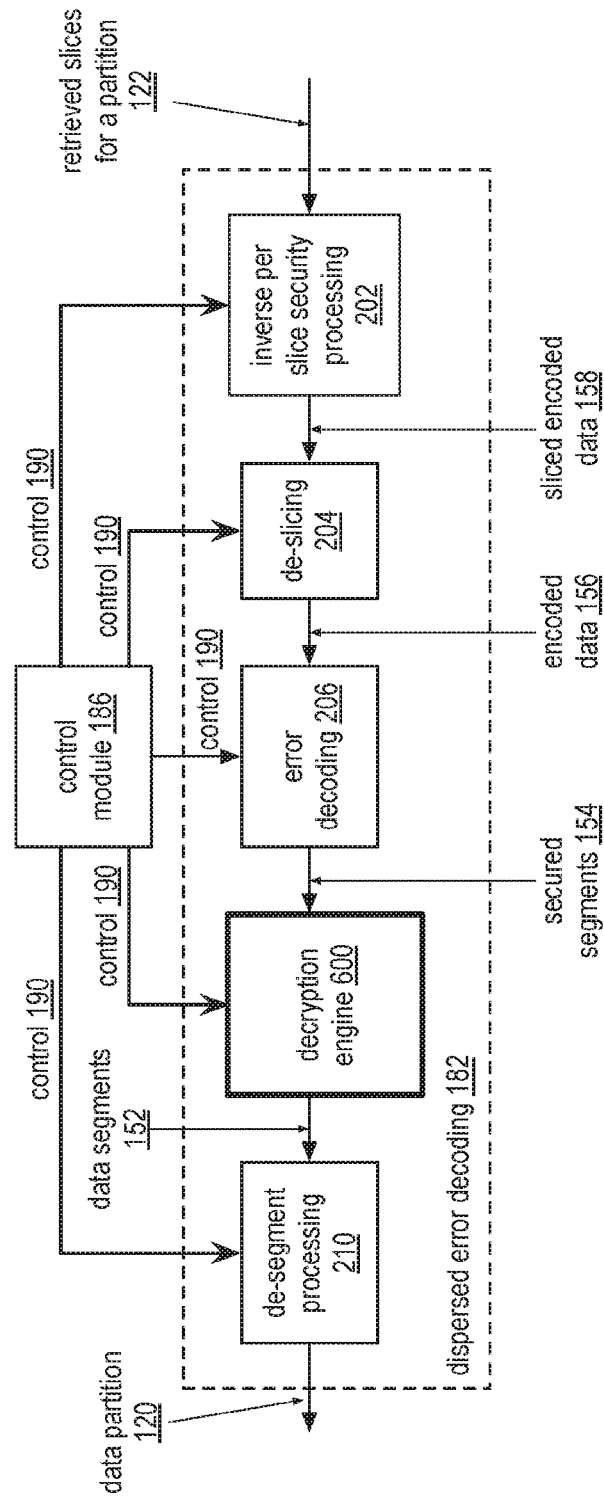
FIG. 45A is a schematic block diagram of another embodiment of a dispersed storage (DS) error decoding module in accordance with the present invention.

FIG. 45A is a schematic block diagram of another embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, a decryption engine 600, a de-segmenting processing module 210, and a control module 186.

In an example of operation, the inverse per slice security processing module 202, when enabled by the control module 186, unsecures each encoded data slice for a partition 122 based on slice de-security information received as control information 190 (e.g., the compliment of the slice security information discussed with reference to FIG. 44A) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice of retrieve slices for a partition 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Salomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The decryption engine 600, when enabled by the control module 186, unsecures the secured data segments 154 based on segment security information and partitioning information received as control information 190 from the control module 186. The segment security information includes data decompression, decryption, de-watermarking, integrity check (e.g., CRC, etc.) verification, and/or any other type of digital security. The partitioning information includes one or more of data sub-segment de-partitioning instructions, a master key, a sub-key generation approach indicator, a deterministic function type indicator, a master key generation instruction indicator, a decode threshold number, and shared secrets corresponding to one or more distributed storage and task execution modules. For example, when the decryption engine 600 is enabled, it de-combines a secured segments 154 to produce encrypted data, de-aggregates the encrypted data to produce a plurality of encrypted data sub-segments, decrypts the plurality of encrypted data sub-segments to produce a plurality of data sub-segments, and de-partitions the plurality of data sub-segments to produce data segments 152. In addition, the decryption engine 600 may issue one or more sub-keys to one or more corresponding DST execution units to facilitate decrypting corresponding locally stored slices as the encrypted data sub-segments to produce the data sub-segments for partial task execution. When the decryption engine 600 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 45B:
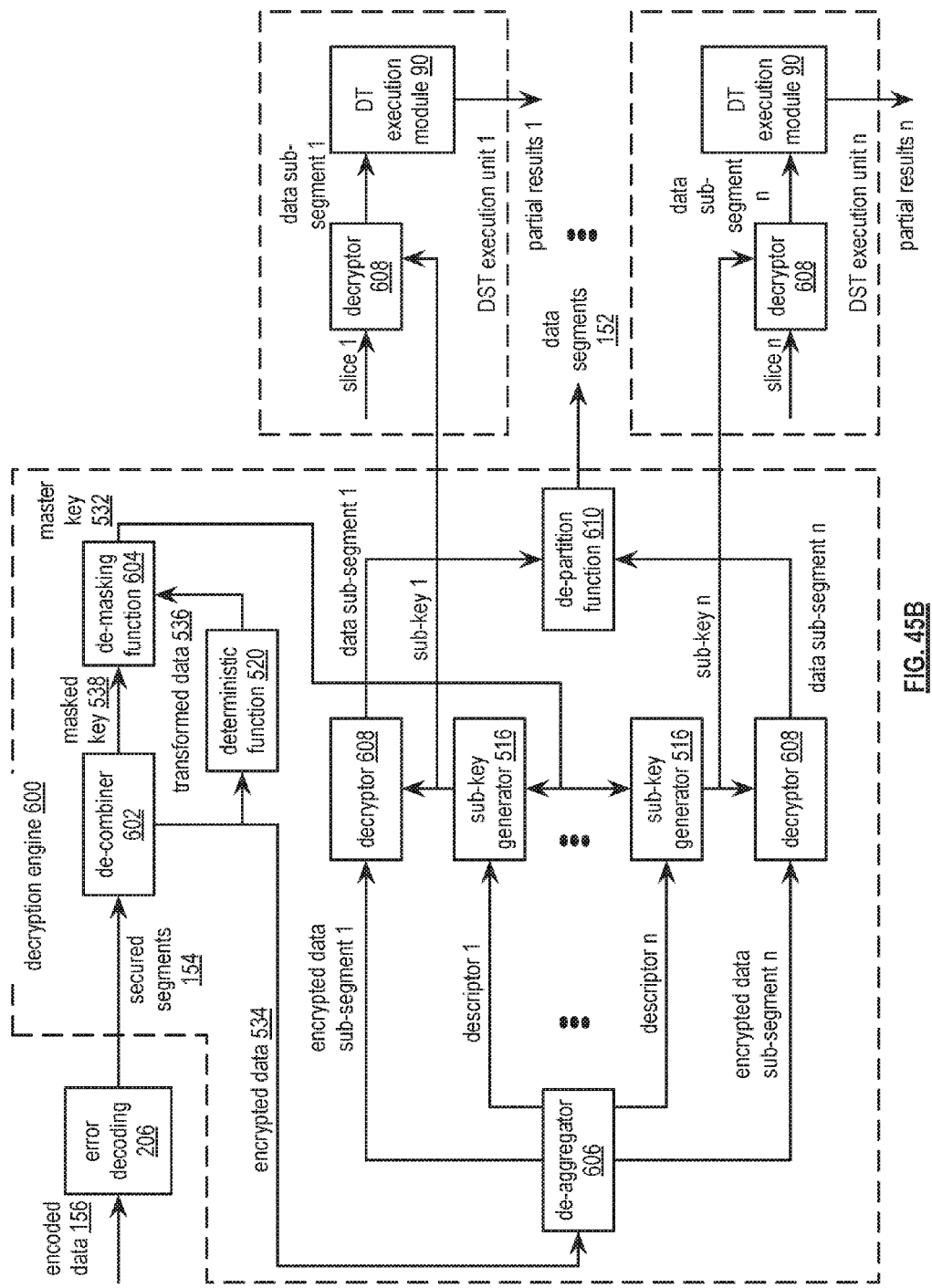
FIG. 45B is a schematic block diagram of an embodiment of a decryption engine system in accordance with the present invention.

FIG. 45B is a schematic block diagram of an embodiment of a decryption engine 600 that includes a de-partition function 610, n number of decryptors 608, n number of sub-key generators 516, a de-aggregator 606, a deterministic function 520, a de-masking function 604, and a de-combiner 602. The decryption engine 600 receives secured segments 154 from an error decoding 206 and decrypts the secured segments 154 to produce data segments 152. The error decoding 206 decodes encoded data 156 using a dispersed storage error coding function to produce the secured segments 154. For each secured segment 154, the decryption engine 600 produces n sub-keys based on the secured segment 154. The decryption engine 600 sends the n sub-keys to n number of distributed storage and task (DST) execution units. Each DST execution unit includes the decryptor 608 and a distributed task (DT) execution module 90. The decryptors 608 of the n DST execution units 1-n each obtains a slice of n slices (e.g., retrieved from a local memory) and decrypts the slice to produce a data sub-segment of n data sub-segments 1-n for further partial task processing to produce partial results of n partial results 1-n.

The de-combiner 602 de-combines the secured segment 154 to reproduce encrypted data 534 and a masked key 538 in accordance with a de-combining approach. The de-combining approach includes at least one of de-interleaving and de-appending. The deterministic function 520 performs a deterministic function on the encrypted data 534 to produce transformed data 536. The deterministic function includes at least one of a hashing function, a mask generating function (MGF), a hash-based message authentication code (HMAC), and a sponge function. The performing of the deterministic function may include truncating an interim result of the deterministic function to provide a desired bit length of the transformed data 536.

The de-masking function 604 de-masks the masked key 538 utilizing the transformed data 536 to reproduce a master key 532. The de-masking may include at least one of a mathematical function and a logical function. For example, the de-masking function performs an exclusive OR logical function on the masked key 538 and the transformed data 536 to reproduce the master key 532. The de-aggregator 606 de-aggregates the encrypted data 534 into n encrypted data sub-segments 1-n in accordance with a data aggregation approach. The approach includes at least one of de-aggregating the encrypted data 534 into a decode threshold number (e.g., n) of encrypted data sub-segments and de-aggregating the encrypted data 534 such that at least one encrypted data sub-segment includes an encrypted representation of a data record associated with a distributed computing partial task. The de-aggregator 606 is further operable to generate n descriptors 1-n for corresponding encrypted data sub-segments of the encrypted data sub-segments 1-n. Each descriptor of descriptors 1-n may include at least one of a source name, a data segment identifier (ID), and a slice name. For example, the de-aggregator 606 generates descriptors 1-n as slice names corresponding to encrypted data sub-segments 1-n, where each slice name includes a common source name, a common data segment ID, and unique pillar IDs when the encrypted data 534 includes an encrypted data segment.

Each sub-key generator 516 of the n sub-key generators 516 generates a sub-key of the n sub-keys based on the master key 532 and an associated descriptor of descriptors 1-n. For example, a second sub-key generator 516 utilizes the master key 532 and a descriptor 2 to generate a sub-key 2. The generating includes utilizing a deterministic functions including at least one of the hashing function (e.g., message digest algorithm 5 (MD5)), the mask generating function (MGF), the hash-based message authentication code (HMAC), and the sponge function. The generating may further include truncating an interim result of the deterministic function to provide a desired key length of the sub-keys 1-n.

Each decryptor 608 of the n decryptors 608 decrypts an associated encrypted data sub-segment of the n encrypted data sub-segments 1-n utilizing a corresponding sub-key of the n sub-keys 1-n to reproduce an associated data sub-segment of the n data sub-segments 1-n. For example, a first decryptor 608 decrypts encrypted data sub-segment 1 utilizing a sub-key 1 to produce a data sub-segment 1. The de-partition function 610 aggregates the n data sub-segments 1-n to reproduce the data segment 152. For example, the de-partition function 610 sequentially aggregates data sub-segment 1 through data sub-segment n to reproduce the data segment 152. Each sub-key generator 516 of the n sub-key generators 516 outputs an associated sub-key of the n sub-keys 1-n to a corresponding DST execution unit of the n DST execution units to enable the corresponding DST execution unit to decrypt and further process the corresponding locally stored slice that includes an encrypted sub-segment. For example, the first sub-key generator 516 outputs the sub-key 1 to DST execution unit 1. For each DST execution unit of the n DST execution units 1-n, the DST execution unit obtains the slice and decrypts the slice utilizing an associated sub-key to reproduce a corresponding data sub-segment of the data sub-segments 1-n. The obtaining includes at least one of retrieving the slice from the local memory of the DST execution unit and receiving the slice from a DST client module. The obtaining may further include de-combining the slice to produce a corresponding encrypted data sub-segment and a portion of the masked key 538. For example, DST execution unit 1 receives a slice 1 and a sub-key 1, de-combines slice 1 to reproduce encrypted data sub-segment 1 and a corresponding portion of the masked key 532, and decrypts the encrypted data sub-segment 1 utilizing sub-key 1 to reproduce data sub-segment 1. The DT execution module 90 executes a partial task on the data sub-segment to produce a partial result of partial results 1-n. The executing further includes receiving the partial task. For example, the DT execution module 90 of DST execution unit 1 receives a partial task 1 and performs the partial task 1 on the data sub-segment 1 to produce partial results 1.

Figure 45C:
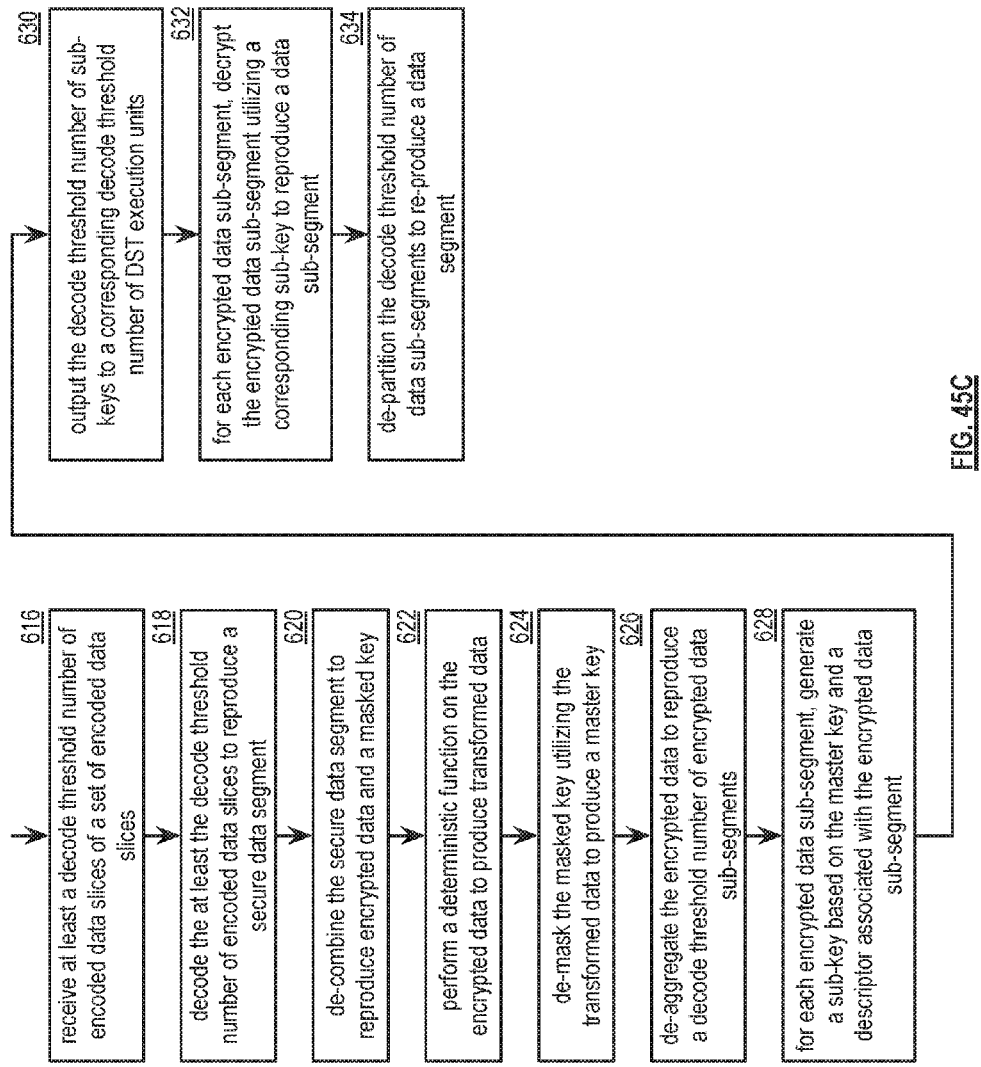
FIG. 45C is a flowchart illustrating an example of decoding slices in accordance with the present invention.

FIG. 45C is a flowchart illustrating an example of decoding slices. The method begins at step 616 where a processing module (e.g., of a distributed storage and task (DST) client module) receives at least a decode threshold number of encoded data slices of a set of encoded data slices. The set of encoded data slices includes a decode threshold number of encrypted data sub-segments and additional error coded slices (e.g., a pillar width number minus the decode threshold number). The receiving may include one or more of generating read slice requests, sending the read slice requests to a decode threshold number of DST execution units, and receiving the decode threshold number of encoded data slices from the decode threshold number of DST execution units.

The method continues at step 618 where the processing module decodes the at least the decode threshold number of encoded data slices utilizing a dispersed storage error coding function to reproduce a secure data segment. The method continues at step 620 where the processing module de-combines (e.g., de-append to, de-interleave) the secure data segment to reproduce encrypted data and a masked key. The method continues with at step 622 where the processing module performs a deterministic function on the encrypted data to produce transformed data. The method continues at step 624 where the processing module de-masks the masked key utilizing the transformed data to reproduce a master key. For example, the processing module performs an exclusive OR function on the masked key and the transformed data to reproduce the master key.

The method continues at step 626 where the processing module de-aggregates the encrypted data to reproduce a decode threshold number of encrypted data sub-segments. For example, the processing module de-aggregates the encrypted data to reproduce three encrypted data sub-segments when the decode threshold number is three. For each encrypted data sub-segment, the method continues at step 628 where the processing module generates a sub-key based on the master key and a descriptor associated with the encrypted data partition. The generating includes receiving the descriptor associated with the encrypted data sub-segment and performing a deterministic function on the master key utilizing the descriptor to reproduce the sub-key. For example, the processing module receives the descriptor and performs a hash based message authentication code (HMAC) function on the master key utilizing the descriptor to reproduce the sub-key.

The method continues at step 630 where the processing module outputs the decode threshold number of sub-keys to a corresponding decode threshold number of DST execution units where each DST execution unit obtains a corresponding encrypted data sub-segment (e.g., retrieves a locally stored slice) and decrypts the encrypted data sub-segment utilizing a received sub-key to reproduce a corresponding data sub-segment for further processing (e.g., execution of a partial task on the data partition to produce a partial result). For each encrypted data sub-segment, the method continues at step 632 where the processing module decrypts the encrypted data sub-segment utilizing a corresponding sub-key to reproduce a corresponding data sub-segment when data is desired. The method continues at step 634 where the processing module de-partitions (e.g., aggregates) the decode threshold number of data sub-segments to reproduce a data segment when the data is desired.

Figure 46A:
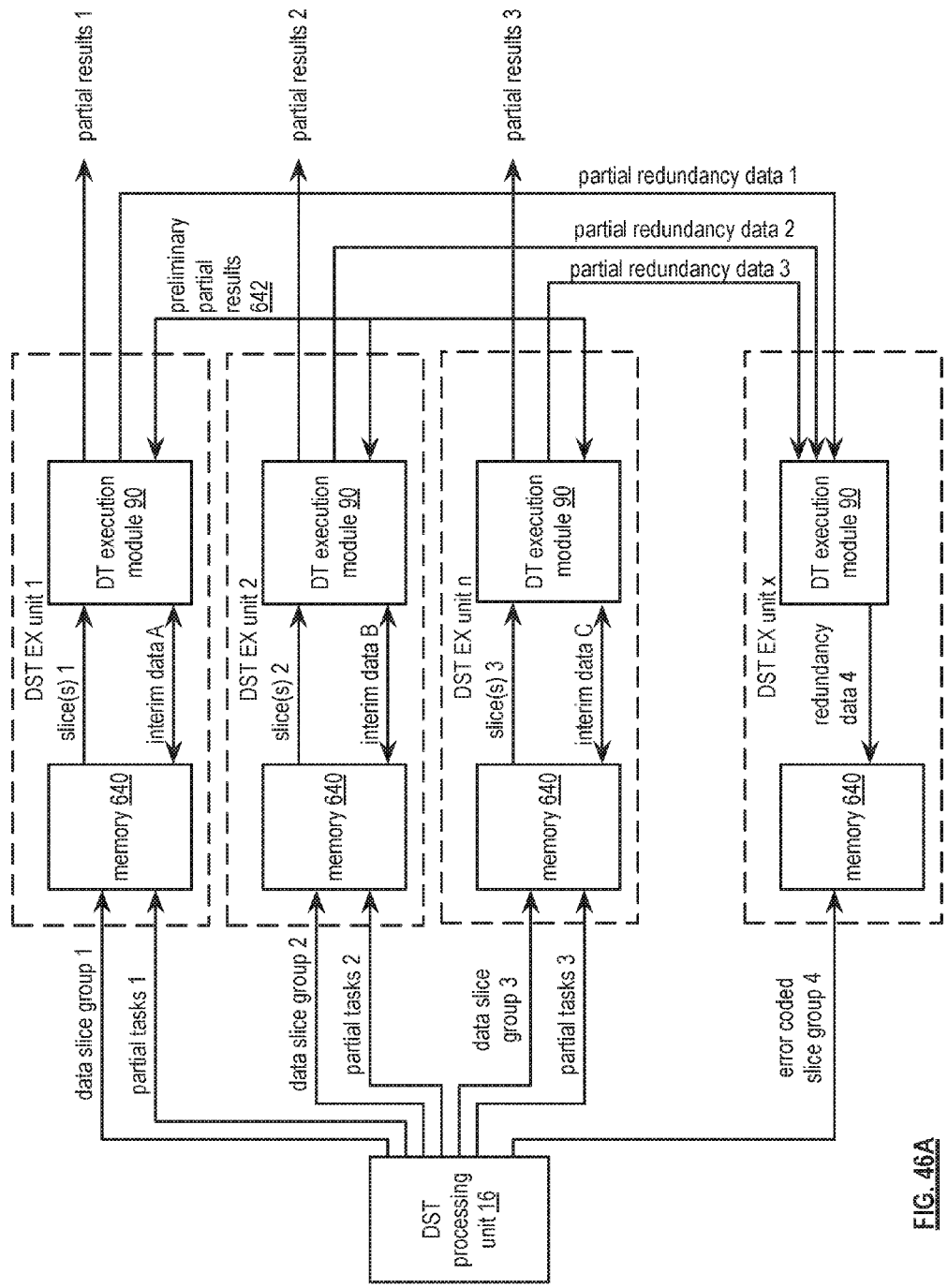
FIG. 46A is a schematic block diagram of another embodiment of a distributed computing system in accordance with the present invention.

FIG. 46A is a schematic block diagram of another embodiment of a distributed storage and task (DST) processing unit 16 and a set of DST execution units 1-*x*. The set of DST execution units 1-4 may include any number of DST execution units and is divided into a data slice sub-set of units and a redundancy sub-set of units. For example, the data slice sub-set of units includes a number of units corresponding to a decode threshold number of a dispersed storage error encoding function and the redundancy sub-set of units includes a number of units corresponding to a redundancy number of the dispersed storage error encoding function. Each of the DST execution units includes a memory 640 and a distributed task (DT) execution module 90.

The system functions to distribute data to the decode threshold number of DST execution units 1-3*n* (e.g., the data slice sub-set of units) for execution of a decode threshold number of partial tasks 1-3 to produce a decode threshold number of partial results 1-3. The partial results may include preliminary partial results 642, where each DT execution module 90 performs a common task of the partial tasks on the data to produce the preliminary partial results. Each DT execution module 90 generates interim data A-B based on the preliminary partial results 642 and stores the interim data A-B in the memory 640 of each of the decode threshold number of DST execution units for subsequent unique partial sub-task processing.

The DST processing unit 16 generates and outputs a decode threshold number of data slice groups 1-3 and corresponding decode threshold number of partial tasks 1-3 to the decode threshold number of DST execution units 1-3. Each slice group of the slice groups 1-3 includes one or more slices. The DST processing unit 16 issues an associated error coded data slice 4 to DST execution unit 4 associated with storage of error coded slices to provide reliable recovery of the data slice groups. Each DST execution unit of the decode threshold number of DST execution units 1-3 receives and stores the corresponding data slice group and corresponding partial tasks in the memory 640 of the DST execution unit. Each DT execution module 90 of the decode threshold number of DST execution units 1-3 performs the common task of a corresponding partial task on at least a portion of the data slice group to produce a corresponding preliminary partial result. For example, DT execution module 90 of DST execution unit 1 performs the common task of partial task 1 on a data slice 1 of data slice group 1 to produce a first preliminary partial result of the preliminary partial results 642, DT execution module 90 of DST execution unit 2 performs the common task of partial task 2 on a data slice 1 of data slice group 2 to produce a second preliminary partial result, and DT execution module 90 of DST execution unit 3 performs the common task of partial task 3 on a data slice 1 of data slice group 3 to produce a third preliminary partial result.

Each DT execution module 90 of DST execution units 1-3 generates a corresponding interim data of the interim data for storage in the memory 640 associated with the DT execution module 90. The decode threshold number of interim data A, interim data B, and interim data C forms an interim data segment for at least temporary storage in the set of DST execution units 1-4. Each DT execution module 90 of DST execution units 1-3 executes a unique partial sub-task on a corresponding interim data to produce a partial result. For example, DT execution module 90 of DST execution unit 1 performs a first unique partial sub-task on interim data A to produce partial results 1, DT execution module 90 of DST execution unit 2 performs a second unique partial sub-task on interim data B to produce partial results 2, and DT execution module 90 of DST execution unit 3 performs a third unique partial sub-task on interim data C to produce partial results 3.

The DT execution modules 90 of the decode threshold number of DST execution units 1-3 generates partial redundancy data 1-3 based on the interim data A-C. For example, the DT execution module 90 of DST execution unit 1 generates a partial error coded slice for interim data A with regards to a redundancy data slice 4, the DT execution module 90 of DST execution unit 2 generates a partial error coded slice for interim data B with regards to the redundancy data slice 4, and the DT execution module 90 of DST execution unit 3 generates a partial error coded slice for interim data C with regards to the redundancy data slice 4 when a decode threshold number is three and a pillar width is four for dispersed storage of the interim data segment.

A DT execution module 90 of each DST execution unit associated with storage of error coded slices of the interim data segment receives a decode threshold number of partial error coded slices and decodes the decode threshold number of partial error coded slices to produce an associated error coded interim result slice for storage in a slice memory of the DST execution unit as a redundancy data slice. For example, the DT execution module 90 of DST execution unit 4 receives the decode threshold number of partial error coded slices from the decode threshold number of DST execution units 1-3 and performs an exclusive OR function on the decode threshold number of partial error coded slices to produce the error coded interim result slice 4 for storage in the memory 640 of DST execution unit 4. Any interim data A-C may be rebuilt by retrieving a decode threshold number of interim data and redundancy data, decoding the decode threshold number of interim data in redundancy data to reproduce the interim data segment, and encoding the interim data segment to reproduce the interim data to be rebuilt.

Figure 46B:
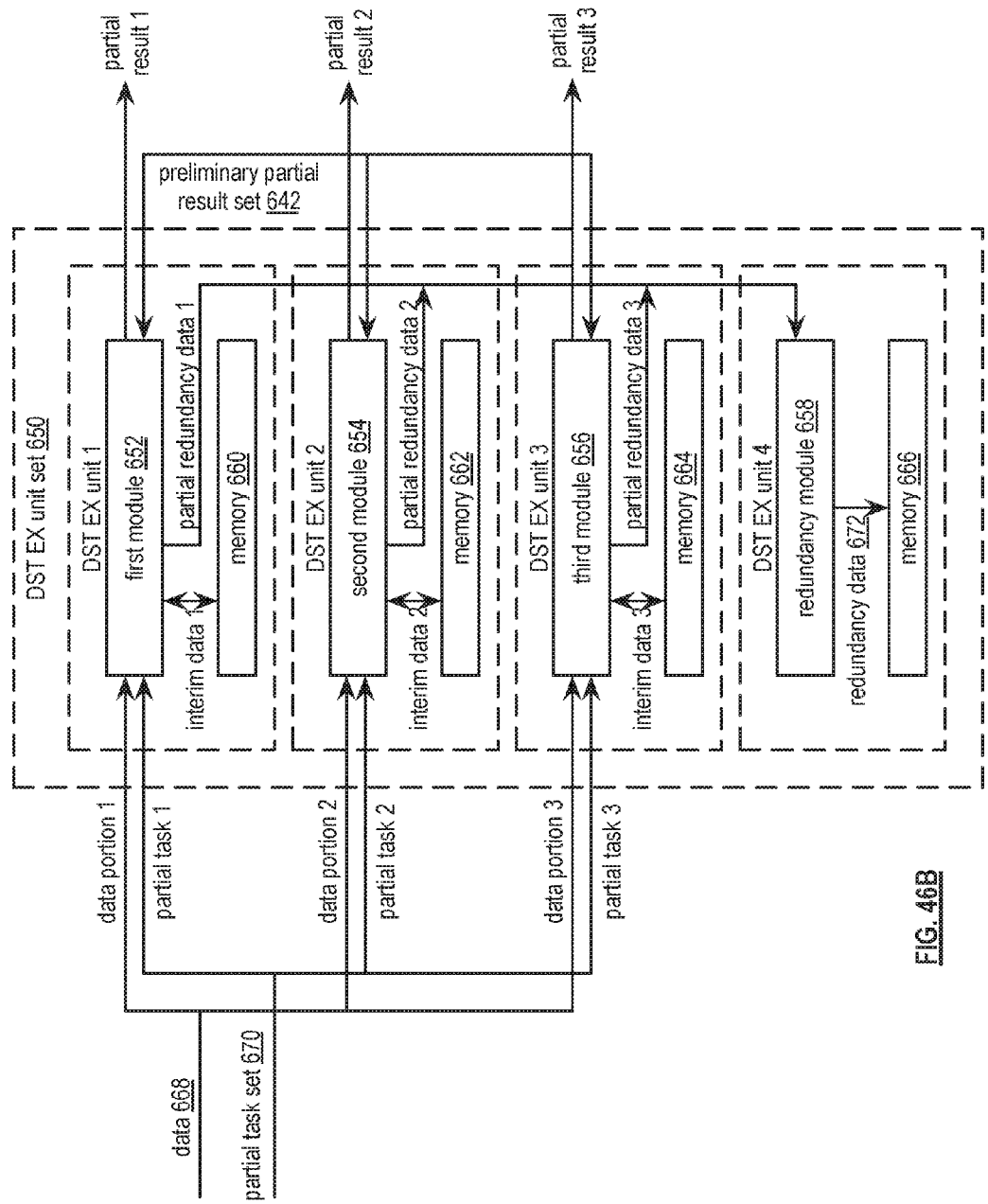
FIG. 46B is a schematic block diagram of another embodiment of a distributed computing system in accordance with the present invention.

FIG. 46B is a schematic block diagram of another embodiment of a distributed computing system that includes a distributed storage and task (DST) execution unit set 650. The DST execution unit set 650 includes a set of DST execution units 1-4. Alternatively, the DST execution unit set 650 may include any number of DST execution units. Each DST execution unit of the set of DST execution units 1-4 is associated with at least one processing module and a memory. For example, the at least one processing module includes software stored in a DST execution unit. As another example, the at least one processing module includes firmware stored in the DST execution unit. As yet another example, the at least one processing module includes a coprocessor implemented within the DST execution unit. The memory may be implemented utilizing one or more of a memory array, a memory device, a plurality of memory devices, an optical disk drive memory device, a magnetic disk drive memory device, and a solid state memory device. For example, DST execution unit 1 includes a first module 652 and memory 660, DST execution unit 2 includes a second module 654 and memory 662, DST execution unit 3 includes a third module 656 and memory 664, and DST execution unit 4 includes a redundancy module 658 and memory 666.

A first decode threshold number of DST execution units of the set of DST execution units may be utilized to process a partial task set 670 on data 668 to produce partial results. Remaining DST execution units of the set of DST execution units (e.g., a pillar width number minus the decode threshold number) may be utilized to store the redundancy data 672 to provide an ability to recover information stored by the decode threshold number of DST execution units when one or more of the decode threshold number of DST execution units is not available. For example, three DST execution units 1-3 include first second third modules 652, 654, and 656 and a fourth DST execution unit 4 includes the redundancy module 658 when the pillar width is 4 and the decode threshold is 3.

The system functions to perform the partial task set 670 on the data 668 to produce partial results. The performing of the partial task set 670 on the data 668 includes primary functions where a first primary function includes receiving the set of partial tasks 670 and the data 668, a second primary function includes executing at least some of the partial task set 670 on at least some of the data 668 to produce a preliminary partial results set 642, a third primary function includes generating interim data based on at least some of the set of preliminary partial results 642, a fourth primary function includes generating the redundancy data 672, and a fifth primary function includes executing further partial tasks to produce the partial results.

The first primary function to receive the set of partial tasks 670 and the data 668 includes a series of receiving steps performed by the set of modules (e.g., 652, 654, 656). A partial task of the set of partial tasks 670 includes a common task and a unique partial sub-task. The common task corresponds to a function to identify a common characteristic of portions of the data 668. The unique partial sub-task corresponds to a function to uniquely categorize the common characteristic of the portions of the data based on a unique parameter. For example, a common task includes searching the data 668 to identify hamburger prices across all regions of the United States, a first unique partial sub-task includes identifying, within the identified hamburger prices, hamburger prices for fast food restaurants, a second unique partial sub-task includes identifying, within the identified hamburger prices, hamburger prices for non-fast food restaurants, and a third unique partial sub-task includes identifying, within the identified hamburger prices, hamburger prices for retail food stores.

A first receiving step of the series of receiving steps includes the first module 652 receiving, via an interface associated with the first DST execution unit, a first partial task (e.g., partial task 1) of the set of partial tasks 670 and a first portion of the data (e.g., data portion 1), where the first partial task includes the common task and the first unique partial sub-task. A second receiving step includes the second module 654 receiving, via an interface associated with the second DST execution unit, a second partial task (e.g., partial task 2) of the set of partial tasks 670 and a second portion of the data (e.g., data portion 2), where the second partial task includes the common task and the second unique partial sub-task. A third receiving step includes the third module 656 receiving, via an interface associated with the third DST execution unit, a third partial task (e.g., partial task 3) of the set of partial tasks 670 and a third portion of the data (e.g., data portion 3), where the third partial task includes the common task and the third unique partial sub-task.

A fourth receiving step includes the set of modules 652-656 allocating the data 668 into the first, second, and third portions of the data 668 based on at least one of a time parameter, a geographic parameter, and a source parameter. For example, the first module 652 allocates a first hour of a data stream to the first portion of the data, the second module 654 allocates a second hour of the data stream to the second portion of the data, and the third module 656 allocates a third hour of the data stream to the third portion of the data when basing the allocation on the time parameter. As another example, the first module 652 allocates an East Coast portion of a national database to the first portion of the data, the second module 654 allocates a Midwest portion of the national database to the second portion of the data, and the third module 656 allocates a West Coast portion of the national database to the third portion of the data when basing the allocation on the geographic parameter. As yet another example, the first module 652 allocates information from an Internet WebCrawler to the first portion of the data, the second module 654 allocates information from a media server to the second portion of the data, and the third module 656 allocates information from a private database to the third portion of the data when basing the allocation on the source parameter.

The second primary function to execute the at least some of the partial task set 670 on the at least some of the data 668 to produce the preliminary partial results set 642 includes executing, by the set of modules (e.g., 652-656), the common task on the data 668 to produce the set of preliminary partial results 642. The first module 652 executes the common task on the first portion of the data (e.g., data portion 1) to produce a first preliminary partial result of the set of preliminary partial results 642. The second module 654 executes the common task on the second portion of the data (e.g., data portion 2) to produce a second preliminary partial result of the set of preliminary partial results 642. The third module 656 executes the common task on the third portion of the data (e.g., data portion 3) to produce a third preliminary partial result of the set of preliminary partial results 642.

The third primary function to generate the interim data based on the at least some of the set of preliminary partial results 642 includes a series of interim data steps. In a first interim data step each of the first, second, and third modules 652-656 generates the interim data based on at least some of the set of preliminary partial results 642. The first module 652 generates first interim data (e.g., interim data 1) based on the at least some of the set of preliminary partial results 642. The first module 652 generates the first interim data by processing at least one of the first, second, and third preliminary partial results to produce the first interim data. The processing includes selecting the at least one of the first, second, and the third preliminary partial results based on one or more of a predetermination, another unique partial sub-task, and a local preliminary partial result. For example, the first module 652 selects third preliminary partial results when the third pulmonary partial results are required for execution of the third unique partial sub-task. The second module 654 generates second interim data (e.g., interim data 2) based on the at least some of the set of preliminary partial results 642. The third module 656 generates third interim data (e.g., interim data 3) based on the at least some of the set of preliminary partial results 642.

In a second interim data step of the series of interim data steps, each of the first, second, and third modules 652-656 facilitate storage of the interim data in the memories 660-664 that are associated with the first DST execution unit, the second DST execution unit, and the third DST execution unit. The first module 652 facilitates storage of the first interim data in memory 660 associated with the first DST execution unit. The second module 654 facilitates storage of the second interim data in memory 662 associated with the second DST execution unit. The third module 656 facilitates storage of the third interim data in memory 664 associated with the third DST execution unit.

The fourth primary function to generate the redundancy data 672 includes a series of redundancy steps. In a first redundancy step, the first module 652 generates first partial redundancy data (e.g., partial redundancy data 1) based on the first interim data and sends the first partial redundancy data to each DST execution unit associated with storing the redundancy data 672. For example, the first module 652 sends the first partial redundancy data to the redundancy module 658 of DST execution unit 4 when one DST execution unit is utilized for storage of the redundancy data 672. The generating of the first partial redundancy data includes at least one of utilizing the first interim data (e.g., a first slice of a set of slices) as the first partial redundancy data and generating a fourth partially encoded slice (e.g., to construct a pillar 4 slice of the set of slices) based on the first interim data (e.g., the first slice of the set of slices). The generating of the fourth partially encoded slice based on the first interim data includes obtaining an encoding matrix, reducing the encoding matrix to produce a square matrix to include rows associated with the decode threshold number of slices of the set of slices (e.g., rows 1-3), inverting the reduced matrix to produce a reduced inverted matrix, matrix multiplying the reduced inverted matrix by the first interim data as a vector to produce a data vector, and matrix multiplying the data vector by a row of the encoding matrix corresponding to the pillar 4 slice to produce the fourth partially encoded slice.

In a second redundancy step, the second module 654 generates second partial redundancy data (e.g., partial redundancy data 2) based on the second interim data and sends the second partial redundancy data to the fourth DST execution unit. In a third redundancy step, the third module 656 generates third partial redundancy data based on the third interim data and sends the third partial redundancy data to the fourth DST execution unit. In a fourth redundancy step, the redundancy module 658 generates the redundancy data 672 for the first, second, and third interim data based on the first, second, and third partial redundancy data. The generating includes at least one of adding a decode threshold number of the first, second, and third partial redundancy data in a field associated with a dispersed storage error coding function, e.g., exclusive OR, and decoding the decode threshold number of the first, second, and third partial redundancy data using a dispersed storage error coding function to produce the redundancy data 672.

The fifth primary function to execute the further partial tasks to produce the partial results includes at least one of the first, second, and third modules 652-656 executing a corresponding one or more unique partial sub-tasks on at least one of a corresponding portion of the data 668 and a corresponding portion of the interim data to produce the partial results. The first module 652 executes the first unique partial sub-task on at least one of the first portion of the data and the first interim data to produce a first partial result. The second module 654 executes the second unique partial sub-task on at least one of the second portion of the data and the second interim data to produce a second partial result. The third module 656 executes the third unique partial sub-task on at least one of the third portion of the data and the third interim data to produce a third partial result. Each of the first, second, and third modules 652-656 outputs the partial results. The first module 652 outputs, via the interface associated with the first DST execution unit, the first partial result. The second module 654 outputs, via the interface associated with the second DST execution unit, the second partial result. The third module 656 outputs, via the interface associated with the third DST execution unit, the third partial result.

Figure 46C:
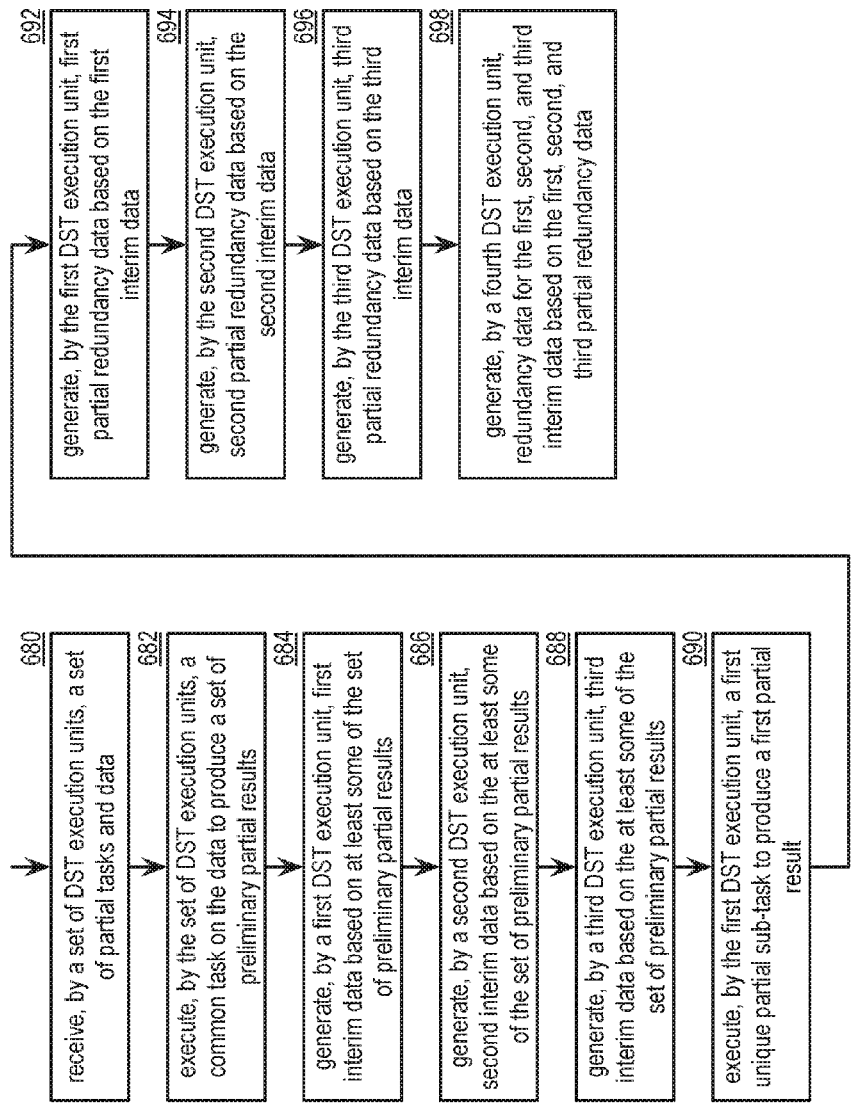
FIG. 46C is a flowchart illustrating an example of storing an interim result in accordance with the present invention.

FIG. 46C is a flowchart illustrating an example of storing an interim result. The method begins at step 680 where a set of distributed storage and task (DST execution units receive a set of partial tasks and data, where a partial task of the set of partial tasks includes a common task and a unique partial sub-task. The common task corresponds to a function to identify a common characteristic of portions of the data and the unique partial sub-task corresponding to a function to uniquely categorize the common characteristic of the portions of the data based on a unique parameter. The receiving includes a series of receiving steps. A first receiving step includes a first DST execution unit of the set of DST execution units receiving a first partial task of the set of partial tasks and a first portion of the data, where the first partial task includes the common task and a first unique partial sub-task. A second receiving step includes a second DST execution unit of the set of DST execution units receiving a second partial task of the set of partial tasks and a second portion of the data, where the second partial task includes the common task and a second unique partial sub-task. A third receiving step includes a third DST execution unit of the set of DST execution units receiving a third partial task of the set of partial tasks and a third portion of the data when a third DST execution unit is to be included in the receiving, where the third partial task includes the common task and a third unique partial sub-task.

A fourth receiving step of the series of receiving steps includes one or more of a variety of data receiving approaches. A first data receiving approach includes the set of DST execution units allocating the data into the first, second, and third portions of the data based on a time parameter. A second data receiving approach includes the set of DST execution units allocating the data into the first, second, and third portions of the data based on a geographic parameter. A third data receiving approach includes the set of DST execution units allocating the data into the first, second, and third portions of the data based on a source parameter.

The method continues at step 682 where the set of DST execution units executes the common task on the data to produce a set of preliminary partial results. The executing includes a series of common task executing steps. In a first common task executing step, the first DST execution unit executes the common task on the first portion of the data to produce a first preliminary partial result of the set of preliminary partial results. In a second common task executing step, the second DST execution unit executes the common task on the second portion of the data to produce a second preliminary partial result of the set of preliminary partial results. In a third common task executing step, the third DST execution unit executes the common task on the third portion of the data to produce a third preliminary partial result of the set of preliminary partial results.

The method continues at step 684 where the first DST execution unit generates first interim data based on the at least some of the set of preliminary partial results. The generating includes processing at least one of the first, second, and third preliminary partial results to produce the first interim data. The processing includes selecting the at least one of the first, second, and the third preliminary partial results based on one or more of a predetermination, another unique partial sub-task, and a local preliminary partial result. The method continues at step 686 where the second DST execution unit generates second interim data based on the at least some of the set of preliminary partial results. The method continues at step 688 where the third DST execution unit generates third interim data based on the at least some of the set of preliminary partial results.

The method continues at step 690 where the first DST execution unit executes the first unique partial sub-task on at least one of: the first portion of the data and the first interim data to produce a first partial result. Alternatively, or in addition to, the second DST execution unit executes the second unique partial sub-task on at least one of: the second portion of the data and the second interim data to produce the second partial result. Alternatively, or in addition to, the third DST execution unit executes the third unique partial sub-task on at least one of: the third portion of the data and the third interim data to produce the third partial result.

The method continues at step 692 where the first DST execution unit generates first partial redundancy data based on the first interim data. The method continues at step 694 where the second DST execution unit generates second partial redundancy data based on the second interim data. The method continues at step 696 where the third DST execution unit generates third partial redundancy data based on the third interim data. The method continues at step 698 where a fourth DST execution unit of the set of DST execution units generates redundancy data for the first, second, and third interim data based on the first, second, and third partial redundancy data.

Figure 47A:
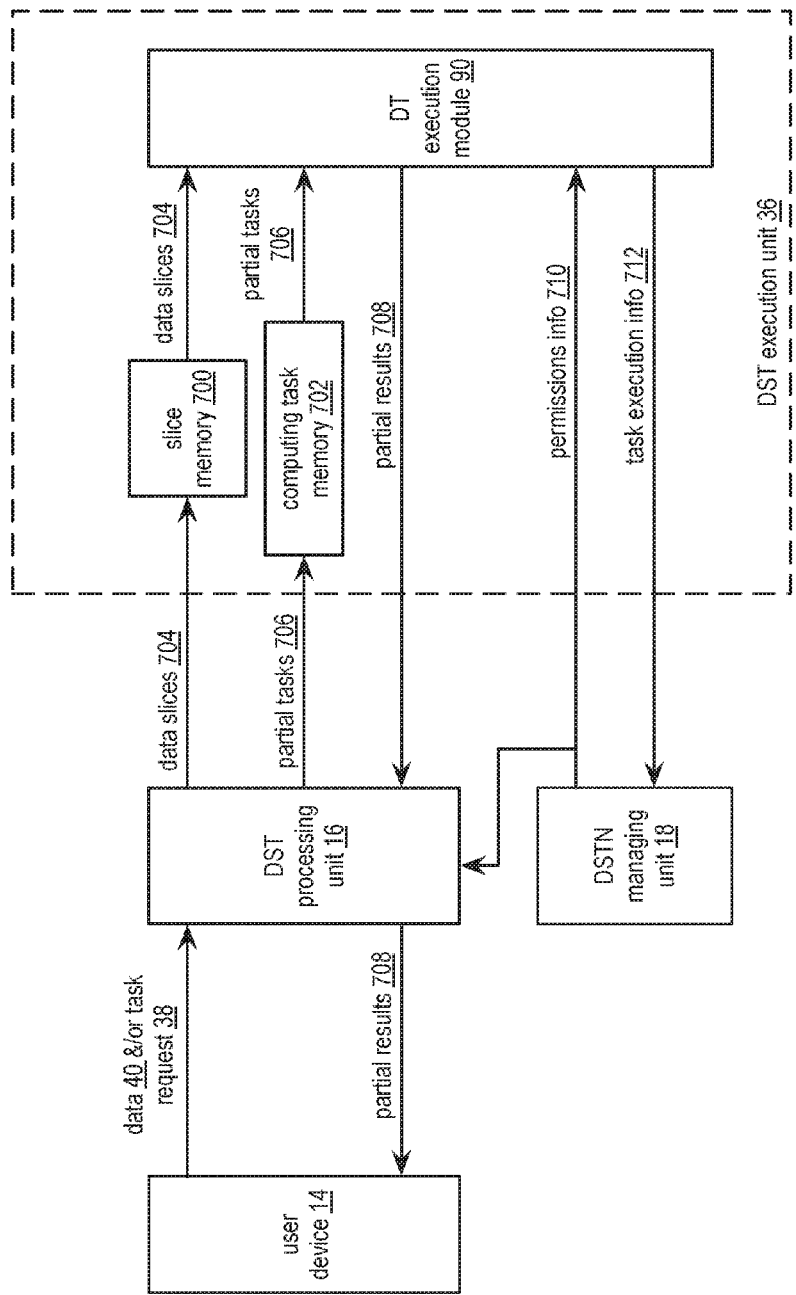
FIG. 47A is a schematic block diagram of another embodiment of a distributed computing system in accordance with the present invention.

FIG. 47A is a schematic block diagram of another embodiment of a distributed computing system that includes a user device 14, a distributed storage and task (DST) processing unit 16, a distributed storage and task network (DSTN) managing unit 18, and a DST execution unit 36. The DST execution unit 36 includes a slice memory 700, a computing task memory 702, and a distributed task (DT) execution module 90. The system functions to generate data slices 704 for partial task execution to produce partial results 708.

The DSTN managing unit 18 maintains a registry that includes a plurality of registry entries. At least one of the plurality of registry entries includes a user device identifier of the user device 14 and corresponding permissions associated with the user device 14. The permissions include one or more of an allowed partial task type, a number of allowed partial test types, a number of allowed simultaneous partial task execution requests, a maximum partial task execution resource utilization level per unit of time, and a cumulative partial task execution resource utilization level. The maintaining includes generating a registry entry for the user device 14, modifying the registry entry based on task execution information 712, and outputting permissions information 710 to one or more elements of the system. The permissions information 710 includes one or more registry entries of the plurality of registry entries. The task execution information 712 includes information with regards to the execution of tasks by the DT execution module 90 (e.g., partial tasks executed, partial task execution resource utilization information). For example, the DSTN managing unit 18 updates the registry entry associated with the user device 14 to include an updated view of partial task execution resource utilization level based on partial task execution resource utilization level information received in the task execution information 712.

One or more elements the system (e.g., the DS processing unit 16, the DT execution module) utilize the permissions information 710 with regards to authorizing a request 38 to facilitate the execution of partial tasks 706. The DS processing unit 16 receives data 40 and/or a task request 38 and utilizes the permissions information 710 to authorize the request 38. The authorizing includes one or more of indicating that the request 38 is authorized when request 38 and a user identifier associated with user device 14 compares favorably to the permissions information 710 and with regards to an allowed partial test type, indicating that the request 38 is authorized when a number of current simultaneous partial task execution requests has not exceeded a number of allowed simultaneous partial task execution requests, and indicating that the request 38 is authorized when a cumulative partial task execution resource utilization level associated with the user device 14 compares favorably (e.g., less than) to a maximum partial task execution resource utilization level for the user device 14.

When the request 38 is authorized, the DST processing unit 16 encodes data 40 to produce data slices 704 and produces the partial tasks 706 associated with the task request 38. A partial task 706 of the partial tasks 706 includes one or more of a task identifier, a task descriptor, a task, a requesting entity identifier, and the permissions information. The DST processing unit 16 sends the data slices 704 and partial tasks 706 to the DST execution unit 36. The DST execution unit 36 stores the data slices 704 in the slice memory 700 and stores the partial tasks 706 in the computing task memory 702.

The DT execution module 90 retrieves data slices 704 from the slice memory 700 and retrieves partial tasks 706 from the computing task memory 702. The DT execution module 90 may authorize the partial tasks 706 with regards to the permissions information 710. The authorizing includes directly authorizing and receiving an authorization indication from the DST processing unit 16. When authorized, the DT execution module 90 executes one or more of the partial tasks 706 on one or more of the data slices 704 to produce partial results 708. The DT execution module 90 generates the task execution information 712 based on execution of the partial tasks 706 to produce the partial results 708. The DT execution module 90 outputs the task execution information 712 to the DSTN managing unit 18. The DT execution module 90 outputs the partial results 708 to the user device 14. The outputting includes sending the partial results 708 directly to the user device 14 and sending the partial results 708 to the user device 14 via the DST processing unit 16.

Figure 47B:
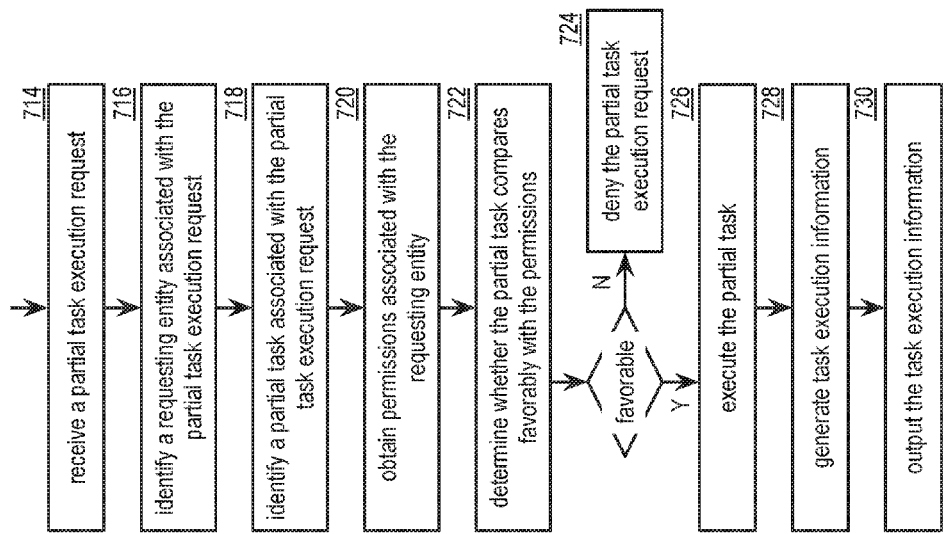
FIG. 47B is a flowchart illustrating an example of authorizing a partial task execution request in accordance with the present invention.

FIG. 47B is a flowchart illustrating an example of authorizing a partial task execution request. The method begins at step 714 where a processing module (e.g., of a distributed storage and task (DST) client module, of a distributed task (DT) execution module) receives a partial task execution request (e.g., from at least one of a user device, a DST processing unit). The method continues at step 716 where the processing module identifies a requesting entity associated with the partial task execution request. The identifying may be based on one or more of extraction from the request, receiving, and initiating a query. The method continues at step 718 where the processing module identifies a partial task associated with the partial task execution request. The identifying includes at least one of extracting the partial task from the partial task execution requests, a lookup based on a task code, and initiating a query.

The method continues at step 720 where the processing module obtains permissions associated with the requesting entity. The obtaining includes at least one of accessing receiving permissions information from a registry, accessing the permissions information based on an identifier of the requesting entity to extract a registry entry, initiating a query, extracting the permissions from the request, and a lookup.

The method continues at step 722 where the processing module determines whether the partial task compares favorably with the permissions. For example, the processing module determines that the comparison is favorable when the permissions indicate that the requesting entity is authorized for a task type of the partial task. As another example, the processing module determines that the comparison is favorable when the permissions indicates that a cumulative partial task execution utilization level is less than a utilization level threshold. The method branches to step 726 when the comparison is favorable. The method continues to step 724 when the comparison is unfavorable. The method continues at step 724 where the processing module denies the partial task execution request. The denying includes one or more of generating a denial response that includes an indication that the partial task execution request is denied and sending the denial response to at least one of the requesting entity and a distributed storage and task network (DSTN) managing unit.

The method continues at step 726 where the processing module executes the partial task when the partial task compares favorably with the permissions. For example, the processing module executes the partial task on a corresponding data slice to produce partial results. The execution may further include outputting the partial results to the requesting entity. The method continues at step 728 where the processing module generates task execution information based on execution of the partial task on me data slice to produce the partial results. The method continues at step 730 where the processing module outputs the task execution information. The outputting includes sending the task execution information to at least one of the DSTN managing unit, the requesting entity, and the DST processing unit.

Figure 48A:
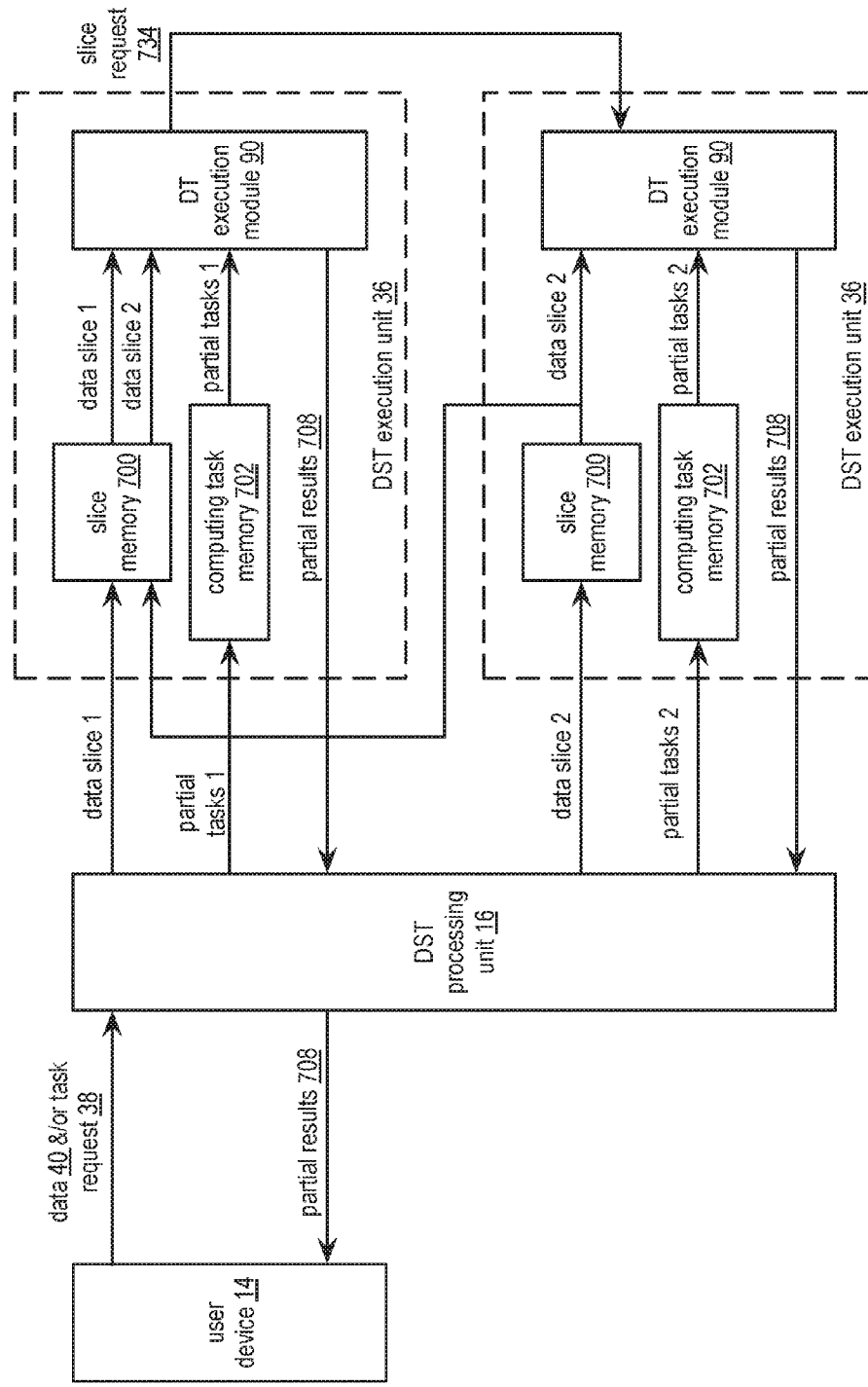
FIG. 48A is a schematic block diagram of another embodiment of a distributed computing system in accordance with the present invention.

FIG. 48A is a schematic block diagram of another embodiment of a distributed computing system that includes a user device 14, a distributed storage and task (DST) processing unit 16, and at least two DST execution units 36. Each DST execution unit 36 and the at least two DST execution units 36 includes a slice memory 700, a computing task memory 702, and a distributed task (DT) execution module 90. The system functions to generate data slices for partial task execution to produce partial results 708.

The DS processing unit 16 receives data 40 and/or a task request 38 and encodes data 40 to produce at least two groups of data slices 1-2 and produces at least two groups of partial tasks 1-2 associated with the task request 38. The data 40 may include a plurality of data records. The DST processing unit 16 may encode a data record of the plurality of data records to produce a last slice of a first group of data slices 1 and a first slice of a second group of data slices 2. A first group of partial tasks 1 may include a partial task associated with the data record. The DST processing unit 16 sends the at least two groups of data slices 1-2 and at least two groups of partial tasks 1-2 to a first DST execution unit 36 of the at least two DST execution units 36. The first DST execution unit 36 stores data slices 1 in the slice memory 700 of the first DST execution of 36 and stores the partial tasks 1 in the computing task memory 702 of the first DST execution unit 36.

The DT execution module 90 of the first DST execution and 36 retrieves data slices 1 from the slice memory 700 and retrieves partial tasks 1 from the computing task memory 702. The DT execution module 90 determines whether the slice memory 700 contains every data slice required to execute partial tasks 1. When the DT execution module 90 determines that slice memory does not contain every data slice required to execute partial tasks 1, the DT execution module 90 identifies at least one other data slice. For example, the DT execution module identifies a first slice of the data slices 2 when a data record associated with a partial task 1 includes a last slice of the data slices 1 and the first slice of the data slices 2. The DT execution module 90 generates a slice request 734 to obtain the at least one other data slice from another DST execution unit 36. The slice request 734 includes one or more of a slice name associated with the at least one other data slice, a requesting entity identifier, a copy of the partial task 1, and an access credential (e.g., a signature, a signed copy of the partial task 1). The DT execution module sends the slice request 734 to the other DST execution unit 36.

The DT execution module 90 of the other DST execution unit 36 receives the slice request 734 and may authorize the slice request 734 based on the request. For example, the DT execution module 90 of the other DST execution of 36 verifies a signature of the slice request 734. When the request is authorized, the DT execution module 90 of the other DST execution of 36 facilitates sending the at least one other data slice to the DST execution unit 36. The DST execution 36 stores the at least one other data slice (e.g., data slice 2) in the slice memory 700. The DT execution module 90 may determine whether the slice memory 700 contains every data slice required to execute partial tasks 1. When the DT execution module 90 determines that slice memory 700 contains every data slice required to execute partial tasks 1, the DT execution module 90 executes one or more partial tasks of partial tasks 1 on data slices retrieved from the slice memory (e.g., data slices 1, data slices 2) to produce partial results 708. For example, the DT execution module 90 aggregates data slice 1 and data slice 2 to reproduce the data record and executes the one or more partial tasks on the data record to produce the partial results 708. The DT execution module outputs the partial results 708 to the DST processing unit 16 and/or the user device 14. Alternatively, or in addition to, the DT execution module 90 of the other DST execution unit 36 may perform a partial task 2 on a data slice 2 to produce partial results 708.

Figure 48B:
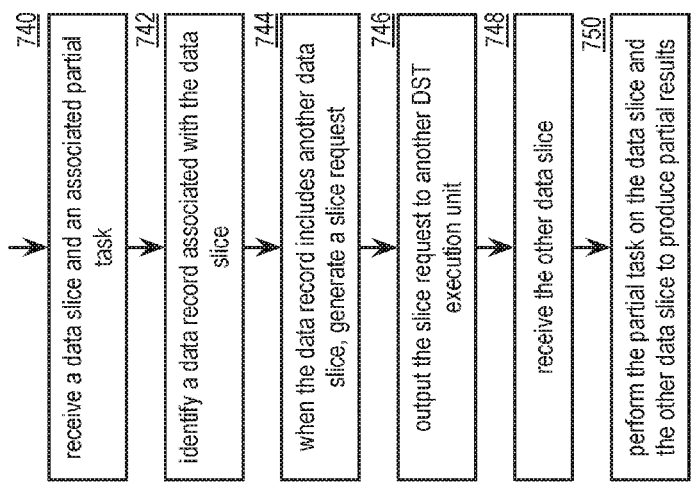
FIG. 48B is a flowchart illustrating an example of obtaining a data record in accordance with the present invention.

FIG. 48B is a flowchart illustrating an example of obtaining a data record. The method begins at step 740 where a processing module (e.g., of a distributed task (DT) execution module) receives a data slice and an associated partial task. The method continues at step 742 where the processing module identifies a data record associated with the data slice. The identifying may be based on one or more obtaining a slice name of the data slice, performing a data record identifier lookup in a slice name to data list, and extracting a data record identifier from the data slice. When the data record includes another data slice, the method continues at step 744 where the processing module generates a slice request. The processing module may determine whether the data record includes the other data slice based on at least one of performing any data record ID to slice name lookup, receiving a list of slice names, and a query. The generating of the slice request includes one or more of identifying a slice name associated with the other data slice, identifying another distributed storage and task (DST) execution unit associated with the other data source, generating a partial task field entry that includes at least a portion of the associated partial task, and generating a credential field entry that includes a signature.

The method continues at step 746 where the processing module outputs the slice request to the other DST execution unit. The method continues at step 748 where the processing module receives the other data slice from the other DST execution unit. The method continues at step 750 where the processing module performs the partial task on the data slice and the other data slice to produce partial results. The performing may include one or more of aggregating at least a portion of the data slice and at least a portion of the other data slice to produce the data record and executing at least a portion of the associated partial task on the data record to produce the partial results.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A computing device comprising:
    an interface configured to interface and communicate with a dispersed or distributed storage network (DSN);
    memory that stores operational instructions; and
    a processing module operably coupled to the interface and to the memory, wherein the processing module, when operable within the computing device based on the operational instructions, is configured to:
        receive, via the interface and from a first other computing device, a first partial task of a set of partial tasks and a first portion of data, wherein the first partial task of the set of partial tasks includes a common task and a first unique partial sub-task;
        execute the common task on the first portion of the data to produce a first preliminary partial result of a set of preliminary partial results;
        generate first interim data based on at least some of the set of preliminary partial results;
        execute the first unique partial sub-task on at least one of the first portion of the data or the first interim data to produce a first partial result;
        generate first partial redundancy data based on the first interim data;
        transmit, via the interface and to a second other computing device, the first partial redundancy data to be processed based on decoding by the second other computing device in accordance with a dispersed storage error coding function to produce redundancy data; and
        transmit, via the interface and to at least one of the second other computing device or a third other computing device, the first partial result to be processed by the at least one of the second other computing device or the third other computing device to produce a result corresponding to at least one of the set of partial tasks performed on the data.

2. The computing device of claim 1, wherein the processing module, when operable within the computing device based on the operational instructions, is further configured to:
    execute the common task on the first portion of the data in cooperation with at least one other computing device executing the common task on at least one other portion of the data to produce the set of preliminary partial results, wherein the at least one other computing device producing at least one other preliminary partial result of the set of preliminary partial results.

3. The computing device of claim 2, wherein the processing module, when operable within the computing device based on the operational instructions, is further configured to:
  generate the first interim data based on the first preliminary partial result of the set of preliminary partial results and one or more of the at least one other preliminary partial result of the set of preliminary partial results.

4. The computing device of claim 1, wherein the processing module, when operable within the computing device based on the operational instructions, is further configured to:
  receive the first partial task of the set of partial tasks and the first portion of the data in cooperation with at least one other computing device configured to receive a second partial task of the set of partial tasks and a second portion of the data.

5. The computing device of claim 4, wherein the data is allocated into the first portion of the data and the second portion of the data based on at least one of a time parameter, a geographic parameter, or a source parameter.

6. The computing device of claim 1, wherein:
  the common task corresponding to a function to identify a common characteristic of portions of the data including the first portion of the data; and
  the first unique partial sub-task corresponding to a function to categorize uniquely the common characteristic of the portions of the data based on a unique parameter.

7. The computing device of claim 1 further comprising:
  a wireless smart phone, a laptop, a tablet, a personal computers (PC), a work station, or a video game device.

8. The computing device of claim 1, wherein the DSN includes at least one of a wireless communication system, a wire lined communication system, a non-public intranet system, a public internet system, a local area network (LAN), or a wide area network (WAN).

9. A computing device comprising:
  an interface configured to interface and communicate with a dispersed or distributed storage network (DSN);
  memory that stores operational instructions; and
  a processing module operably coupled to the interface and to the memory, wherein the processing module, when operable within the computing device based on the operational instructions, is configured to:
    receive, via the interface and from a first other computing device, a first partial task of a set of partial tasks and a first portion of data in cooperation with at least one other computing device configured to receive a second partial task of the set of partial tasks and a second portion of the data, wherein the first partial task of the set of partial tasks includes a common task and a first unique partial sub-task, and wherein the second partial task of the set of partial tasks includes the common task and a second unique partial sub-task;
    execute the common task on the first portion of the data to produce a first preliminary partial result of a set of preliminary partial results in cooperation with at least one other computing device executing the common task on at least one other portion of the data to produce the set of preliminary partial results, wherein the at least one other computing device producing at least one other preliminary partial result of the set of preliminary partial results;
    generate first interim data based on at least some of the set of preliminary partial results;
    execute the first unique partial sub-task on at least one of the first portion of the data or the first interim data to produce a first partial result;
    generate first partial redundancy data based on the first interim data;
    transmit, via the interface and to a second other computing device, the first partial redundancy data processed based on decoding by the second other computing device in accordance with a dispersed storage error coding function to produce redundancy data; and
    transmit, via the interface and to at least one of the second other computing device or a third other computing device, the first partial result to be processed by the at least one of the second other computing device or the third other computing device to produce a result corresponding to at least one of the set of partial tasks performed on the data.

10. The computing device of claim 9, wherein the processing module, when operable within the computing device based on the operational instructions, is further configured to:
  generate the first interim data based on the first preliminary partial result of the set of preliminary partial results and one or more of the at least one other preliminary partial result of the set of preliminary partial results.

11. The computing device of claim 9, wherein:
  the data is allocated into the first portion of the data and the second portion of the data based on at least one of a time parameter, a geographic parameter, or a source parameter;
  the common task corresponding to a function to identify a common characteristic of portions of the data including the first portion of the data; and
  the first unique partial sub-task corresponding to a function to categorize uniquely the common characteristic of the portions of the data based on a unique parameter.

12. The computing device of claim 9 further comprising:
  a wireless smart phone, a laptop, a tablet, a personal computers (PC), a work station, or a video game device.

13. The computing device of claim 9, wherein the DSN includes at least one of a wireless communication system, a wire lined communication system, a non-public intranet system, a public internet system, a local area network (LAN), or a wide area network (WAN).

14. A method for execution by a computing device, the method comprising:
  receiving, via an interface of the computing device that is configured to interface and communicate with a dispersed or distributed storage network (DSN) and from a first other computing device, a first partial task of a set of partial tasks and a first portion of data, wherein the first partial task of the set of partial tasks includes a common task and a first unique partial sub-task;
  executing the common task on the first portion of the data to produce a first preliminary partial result of a set of preliminary partial results;
  generating first interim data based on at least some of the set of preliminary partial results;
  executing the first unique partial sub-task on at least one of the first portion of the data or the first interim data to produce a first partial result;

generating first partial redundancy data based on the first interim data;

transmitting, via the interface and to a second other computing device, the first partial redundancy data processed based on decoding by the second other computing device in accordance with a dispersed storage error coding function to produce redundancy data; and transmitting, via the interface, the first partial result to at least one of the second other computing device or a third other computing device to be processed by the at least one of the second other computing device or the third other computing device to produce a result corresponding to at least one of the set of partial tasks performed on the data.

15. The method of claim 14 further comprising:

executing the common task on the first portion of the data in cooperation with at least one other computing device executing the common task on at least one other portion of the data to produce the set of preliminary partial results, wherein the at least one other computing device producing at least one other preliminary partial result of the set of preliminary partial results.

16. The method of claim 15 further comprising:

generating the first interim data based on the first preliminary partial result of the set of preliminary partial results and one or more of the at least one other preliminary partial result of the set of preliminary partial results.

17. The method of claim 14 further comprising:

receiving, via the interface, the first partial task of the set of partial tasks and the first portion of the data in cooperation with at least one other computing device configured to receive a second partial task of the set of partial tasks and a second portion of the data, wherein the data is allocated into the first portion of the data and the second portion of the data based on at least one of a time parameter, a geographic parameter, or a source parameter.

18. The method of claim 14, wherein:

the common task corresponding to a function to identify a common characteristic of portions of the data including the first portion of the data; and the first unique partial sub-task corresponding to a function to categorize uniquely the common characteristic of the portions of the data based on a unique parameter.

19. The method of claim 14, wherein the computing device includes a wireless smart phone, a laptop, a tablet, a personal computers (PC), a work station, or a video game device.

20. The method of claim 14, wherein the DSN includes at least one of a wireless communication system, a wire lined communication system, a non-public intranet system, a public internet system, a local area network (LAN), or a wide area network (WAN).

* * * * *